(12) United States Patent
der Quaeler et al.

(10) Patent No.: US 7,805,673 B2
(45) Date of Patent: Sep. 28, 2010

(54) METHOD AND APPARATUS TO PROVIDE A UNIFIED REDACTION SYSTEM

(76) Inventors: Loki der Quaeler, 9014 Old Georgetown Rd., Bethesda, MD (US) 20814; Elizabeth Charnock, 818 Balboa La., Foster City, CA (US) 94404; Neji Dhakouani, 3921 Harrison St., #105, Oakland, CA (US) 94611

(*) Notice: Subject to any disclaimer, the term of this patent is extended or adjusted under 35 U.S.C. 154(b) by 1094 days.

(21) Appl. No.: 11/497,470

(22) Filed: Jul. 31, 2006

(65) Prior Publication Data
US 2007/0030528 A1    Feb. 8, 2007

Related U.S. Application Data

(60) Provisional application No. 60/704,037, filed on Jul. 29, 2005.

(51) Int. Cl.
 *G06F 17/21* (2006.01)
(52) U.S. Cl. .................................................. 715/255
(58) Field of Classification Search ............... 715/271, 715/255
See application file for complete search history.

(56) References Cited

U.S. PATENT DOCUMENTS

| | | | | |
|---|---|---|---|---|
| 4,692,758 A | * | 9/1987 | Fawcett et al. | 345/471 |
| 5,181,255 A | * | 1/1993 | Bloomberg | 382/176 |
| 5,371,807 A | * | 12/1994 | Register et al. | 382/159 |
| 5,388,197 A | * | 2/1995 | Rayner | 715/723 |
| 5,517,586 A | * | 5/1996 | Knowlton | 382/292 |
| 5,579,466 A | | 11/1996 | Habib et al. | |
| 5,581,682 A | * | 12/1996 | Anderson et al. | 715/236 |
| 5,619,592 A | * | 4/1997 | Bloomberg et al. | 382/175 |
| 5,903,646 A | * | 5/1999 | Rackman | 705/51 |
| 5,991,709 A | * | 11/1999 | Schoen | 704/1 |
| 6,064,968 A | * | 5/2000 | Schanz | 705/1 |
| 6,311,194 B1 | | 10/2001 | Sheth et al. | |
| 6,469,711 B2 | | 10/2002 | Foreman et al. | |
| 6,556,982 B1 | * | 4/2003 | McGaffey et al. | 706/50 |
| 6,567,830 B1 | | 5/2003 | Madduri | |
| 6,598,046 B1 | | 7/2003 | Goldberg et al. | |
| 7,325,199 B1 | * | 1/2008 | Reid | 715/723 |
| 7,428,701 B1 | * | 9/2008 | Gavin et al. | 715/243 |
| 7,634,455 B1 | * | 12/2009 | Keene et al. | 707/2 |

(Continued)

FOREIGN PATENT DOCUMENTS

WO    WO 00/67159    11/2000

(Continued)

OTHER PUBLICATIONS

Henseler, Records Management and Full-Text Retrieval—White Paper, Mar. 16, 2005, ZyLab Technologies B.V., pp. 1-17.*

(Continued)

*Primary Examiner*—Doug Hutton
*Assistant Examiner*—Frank D Mills
(74) *Attorney, Agent, or Firm*—Haynes and Boone, LLP

(57) ABSTRACT

A method comprising enabling a user to define a redaction of a part of a document in a corpus of documents, the redaction definition including a scope defining a range of documents in the corpus to which the redaction applies.

58 Claims, 45 Drawing Sheets

U.S. PATENT DOCUMENTS

| | | | |
|---|---|---|---|
| 2001/0018698 A1 | 8/2001 | Uchino | |
| 2002/0010679 A1* | 1/2002 | Felsher | 705/51 |
| 2002/0083079 A1* | 6/2002 | Meier et al. | 707/104.1 |
| 2002/0161788 A1* | 10/2002 | McDonald | 707/203 |
| 2003/0020671 A1* | 1/2003 | Santoro et al. | 345/1.3 |
| 2003/0152277 A1* | 8/2003 | Hall et al. | 382/229 |
| 2003/0182310 A1* | 9/2003 | Charnock et al. | 707/104.1 |
| 2004/0044894 A1* | 3/2004 | Lofgren et al. | 713/176 |
| 2004/0088313 A1* | 5/2004 | Torres | 707/101 |
| 2004/0146272 A1* | 7/2004 | Kessel et al. | 386/46 |
| 2004/0230576 A1* | 11/2004 | Hillberg et al. | 707/6 |
| 2005/0004922 A1* | 1/2005 | Zernik | 707/100 |
| 2005/0004951 A1* | 1/2005 | Ciaramitaro et al. | 707/104.1 |
| 2005/0015600 A1* | 1/2005 | Miyazaki et al. | 713/176 |
| 2005/0132070 A1* | 6/2005 | Redlich et al. | 709/228 |
| 2005/0138109 A1* | 6/2005 | Redlich et al. | 709/201 |
| 2005/0138110 A1* | 6/2005 | Redlich et al. | 709/201 |
| 2005/0180569 A1* | 8/2005 | Kevenaar et al. | 380/213 |
| 2006/0005017 A1* | 1/2006 | Black et al. | 713/165 |
| 2006/0062453 A1* | 3/2006 | Schacht | 382/164 |
| 2006/0143459 A1* | 6/2006 | Villaron et al. | 713/176 |
| 2006/0184549 A1* | 8/2006 | Rowney et al. | 707/100 |
| 2006/0218149 A1* | 9/2006 | Patrick | 707/9 |
| 2006/0242558 A1* | 10/2006 | Racovolis et al. | 715/511 |
| 2006/0259614 A1* | 11/2006 | Patrick | 709/224 |
| 2006/0259954 A1* | 11/2006 | Patrick | 726/2 |
| 2006/0259977 A1* | 11/2006 | Patrick | 726/26 |
| 2006/0259983 A1* | 11/2006 | Sperry | 726/28 |
| 2006/0277220 A1* | 12/2006 | Patrick et al. | 707/200 |
| 2009/0070664 A1* | 3/2009 | Gavin et al. | 715/234 |

FOREIGN PATENT DOCUMENTS

| | | |
|---|---|---|
| WO | WO 01/53995 A1 | 7/2001 |
| WO | WO 01/57633 A1 | 8/2001 |
| WO | WO 01/69428 A1 | 9/2001 |

OTHER PUBLICATIONS

Paley, Encyclopedia of Computer Science—Legal Aspects of Computing, 2003, John Wiley and Sons Ltd., 4th Ed., pp. 964-968.*

Song, W.W. et al, "A Semantic Similarity Approach to electronic document modeling and integration", Web Information Systems Engineering, 2000Proceedings of the First International Conference on Hong Kong, China Jun. 19-21, 2000, Los Alamitos, CA, USA, IEEE Comput. Soc., US, vol. 1, Jun. 19, 2000, pp. 116-124, XP010521844 ISBN: 0-7695-0577-5.

Varlamis, I. et al. "Web document searching using enhanced flyperlink semantics based on xml" Database Engineering & Applications, 2001 International Symposium on Jul. 16-18, 2001, Piscataway, NJ, USA, IEEE, pp. 34-44, XP010554365.

Dunkel B. et al, "Customized metadata for Internet Information" Knowledge-Based Intelligent Electronic Systems, 1997. KES '97. Proceedings., 1997 First International COnference on Adelaide, SA Australia May 21-23, 1997, New York, NY, USA, IEEE US, vol. 2, May 21, 1997, pp. 508-516, XP010242741, ISBN: 0-7803-3755-7.

Smith M A et al Association for Computing Machinery: "Visualization Components for Persistent Conversations" Chi 2001 Conference Proceedings. Conference on Human Factors in Computing Systems. Seattle, Wa, Mar. 31-Apr. 5, 2001, Chi Conference Proceedings. Human Factors in Computing Systems, NewYork, Ny : Ieee,US, Mar. 31, 2001, pp. 136-143, Isbn: 1-58113-327-8 Abstract; Figures 3-6 p. 141-p. 143.

Warren Sack: "Conversation Map: A Content-Based Newsgroup Browser" Proceedings of the 5th International Conference on Intelligent User Interfaces, [Onl Ine] 2000, pp. 233-240, New Orleans, Usa Isbn: 1-58113-134-8 Retrieved From the Internet: Url: Http://Portal .Acm. Abstract* p. 234 [Retrieved p. 237 on Feb. 14, 2008].

Donath J et al: "Visualizing Conversation" Systems Sciences, 1999. Hicss-32. Proceedings of the 32nd Annual Hawaii International Conference on Maui, Hi, Usa Jan. 5-8, 1999, Los Alamitos, Ca, Usa, Ieee Comput. Soc, Us, Jan. 5, 1999, pp. 1-9.

PCT/US06/30274, International Search Report, 2 pages.

PCT/US06/30274, Notification of Transmittal of the International Search Report and the Written Opinion of the International Searching Authority, 6 pages.

PCT/US06/30284, Notification of Transmittal of the International Search Report and the Writtne Opinion of the International Searching Authority, or the Declaration (1 page).

PCT/US06/30284, International Search Report (2 pages).

Written Opinion of the International Searching Authority (5 pages).

Katashi Nagao; Akito Sakurai et al, "Discussion Mining: Knowledge Discovery from Semantically Annotated Discussion Content"; New Frontiers in Artificial Intelligence. JSAI 2003 and JSAI 2004 conferences and workshops, Niigata, Japan, Jun. 23-27, 2003 and Kanazawa, Japan, May 31-Jun. 4, 2004. Revised selected papers. Lecture notes in Computer Science; Lecture Notes in Artificial Intelligence; LNCS, Springer Berlin Heidelberg, BE, vol. 3609, 1900, pp. 158-168 (2007), XP019055847; ISBN: 978-3-540-71008-0.

* cited by examiner

Figure: 35

Threndazine ⊕  =

METHOD AND APPARATUS TO PROVIDE A UNIFIED REDACTION SYSTEM

RELATED CASES

This application claims priority to Provisional Patent Application Ser. No. 60/704,037, filed Jul. 29, 2005.

FIELD OF THE INVENTION

The present invention relates to data analysis, and more particularly, to utilizing the relationship between documents to provide insight.

BACKGROUND

The collection of electronic documents with intent to organize, categorize, and process for a better understanding to their content also has an extension which allows for the specification of portions of, or complete, documents to be redacted. There are many forms of text redaction, however the most commonly accepted is the placing of black boxes over the redacted text regions; additionally, if the document type contains embedded raster image data, and some or all of that image data has been specified for redaction, it is important that this receives the same appearance of redaction covering.

Prior to the handling of this process in the electronic realm, the physical world version of this would feature a person using a black magic marker, or pasting black paper, over the redacted regions of a reproduced (by photocopy, or similar technology) version of the document, and then submitting that altered document to another reproduction (by similar technology means).

Note that in the electronic realm, simply deleting text isn't good enough as it a) changes spacing and appearance and even page breaks, which can be considered as legally unacceptable modification of the evidence, b) it becomes difficult to discern where text has been removed, which makes it difficult to accurately review and record in a redaction log.

Nor is simply replacing text with "X"'s or some other character generally good enough for the same reasons, as no matter what character is selected, there is at least some chance of a natural occurrence of a large number of them appearing contiguously.

SUMMARY OF THE INVENTION

A method comprising enabling a user to define a redaction of a part of a document in a corpus of documents, the redaction definition including a scope defining a range of documents in the corpus to which the redaction applies.

DETAILED DESCRIPTION OF THE INVENTION

The present invention discusses a method and apparatus to provide redaction for documents of various sorts. Redaction is defined as the removal, obliteration or obscuring of part, or in some cases, all of a document. For the purposes of this application, the term document is broadly defined to be any type of information that has been committed to a permanent electronic medium.

Introduction

Definition of a Redaction

Figure 1:
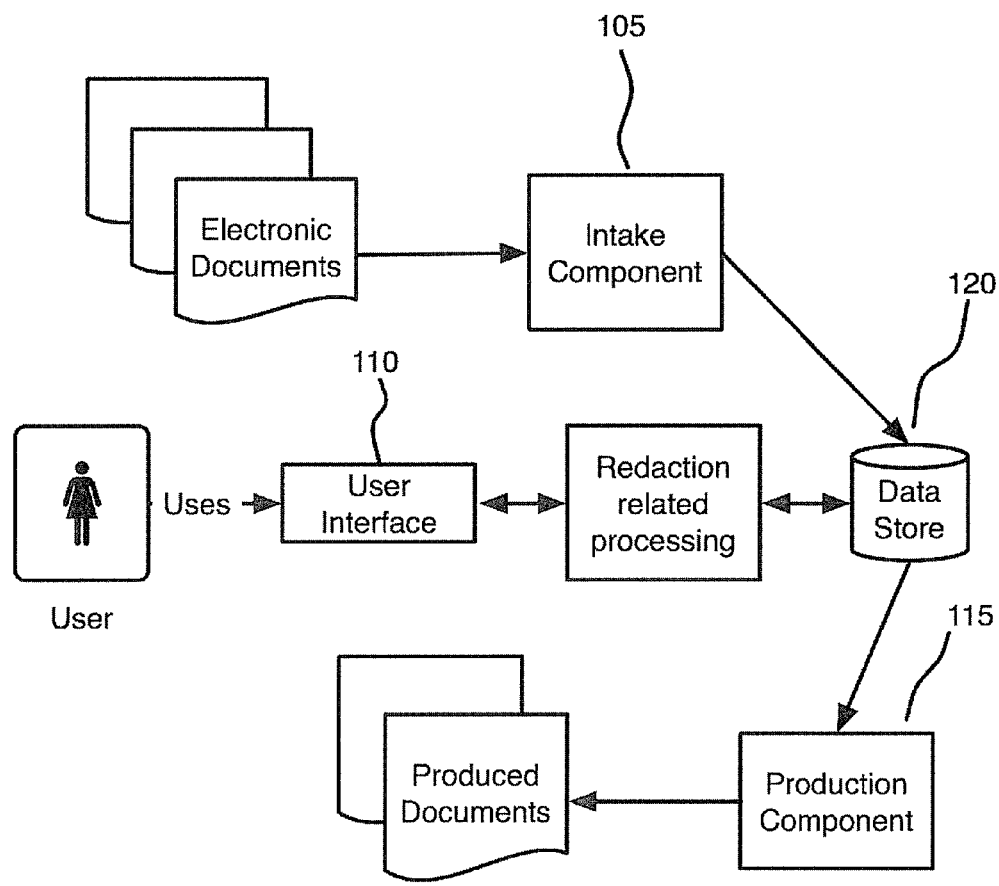
FIG. 1 is a block diagram displaying one embodiment of high level system overview.
Figure 2:
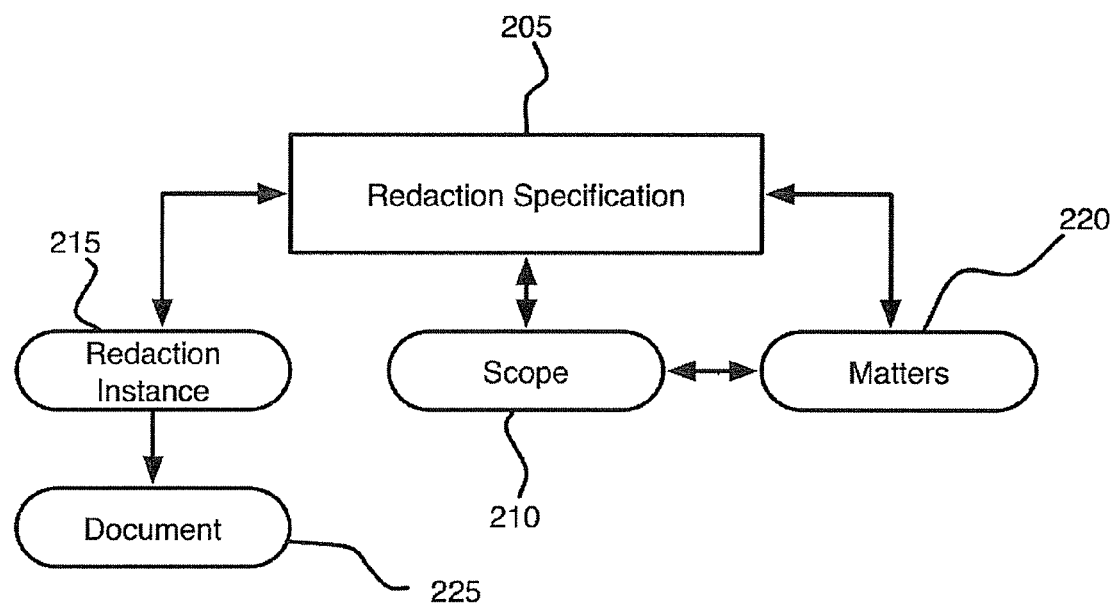
FIG. 2 is a flowchart displaying one embodiment of the relationship between main object types.
Figure 3:
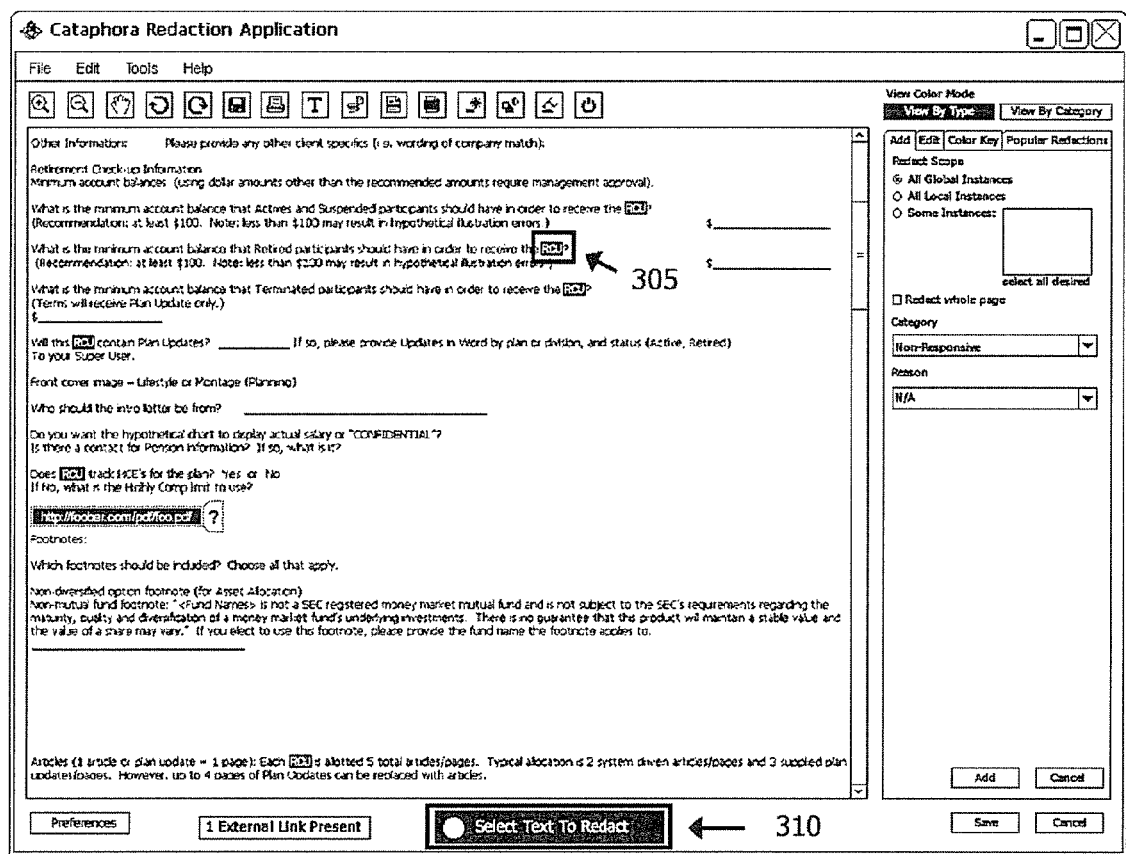
FIG. 3 is a screen shot displaying an exemplary redaction.
Figure 4:
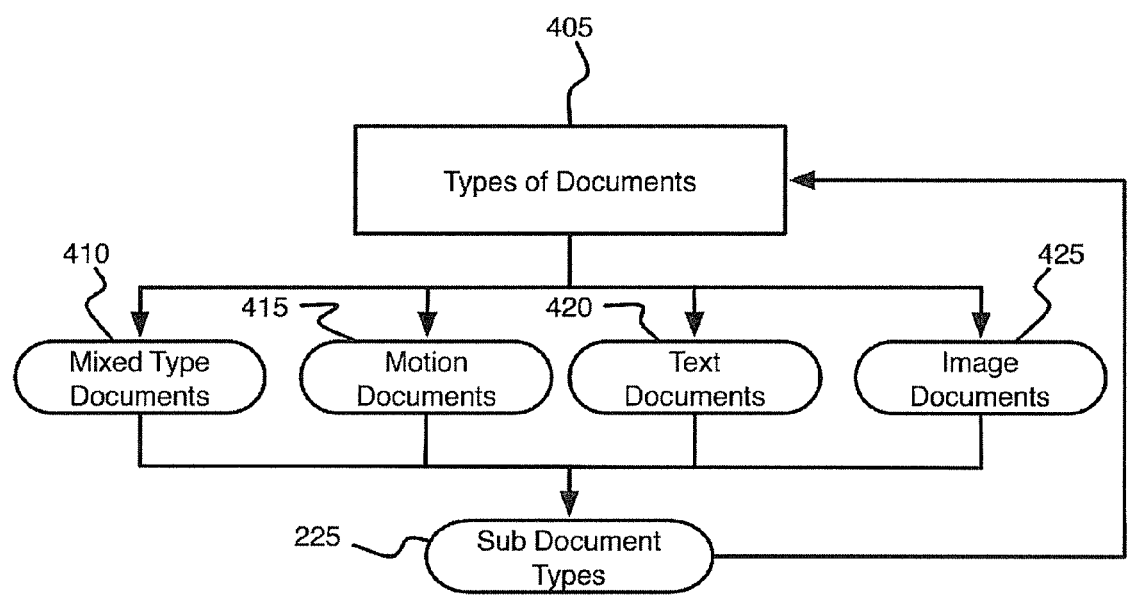
FIG. 4 is a diagram displaying exemplary types of documents.

In the context of the present application, a redaction [305] is an abstract specification [205] to redact certain defined types of information wherever they occur within a given scope [210] as illustrated in FIG. 2. Thus, unlike traditional hand-implemented redactions, a single redaction [215] may be implemented an arbitrarily large number of times on an arbitrarily large number of documents. For the purposes of this application, the term document [225] is broadly defined to be any type of information that has been committed to a permanent electronic medium. Further, a redaction [305] may be transferred from one matter [220] to the next. For example, it may be desirable in all matters [220] to automatically redact all patient social security numbers. The redaction [305] may then be transferred to all documents [225] automatically.

In one embodiment, all attributes of the abstract redaction specification [205] and its relation to specific instances of physical redactions [215] are stored in a permanent database [120] that is internal to the system. In one embodiment, each individual instance of a redaction [305] is stored in an internal database [910], and its storage is associated to a document [225] by a key unique to that document [225]. Information pertaining to the exact location within the document [225] of the redaction [305] is dependent on the type of document [225] (image, text, motion/sound, mixed type).

Figure 8:
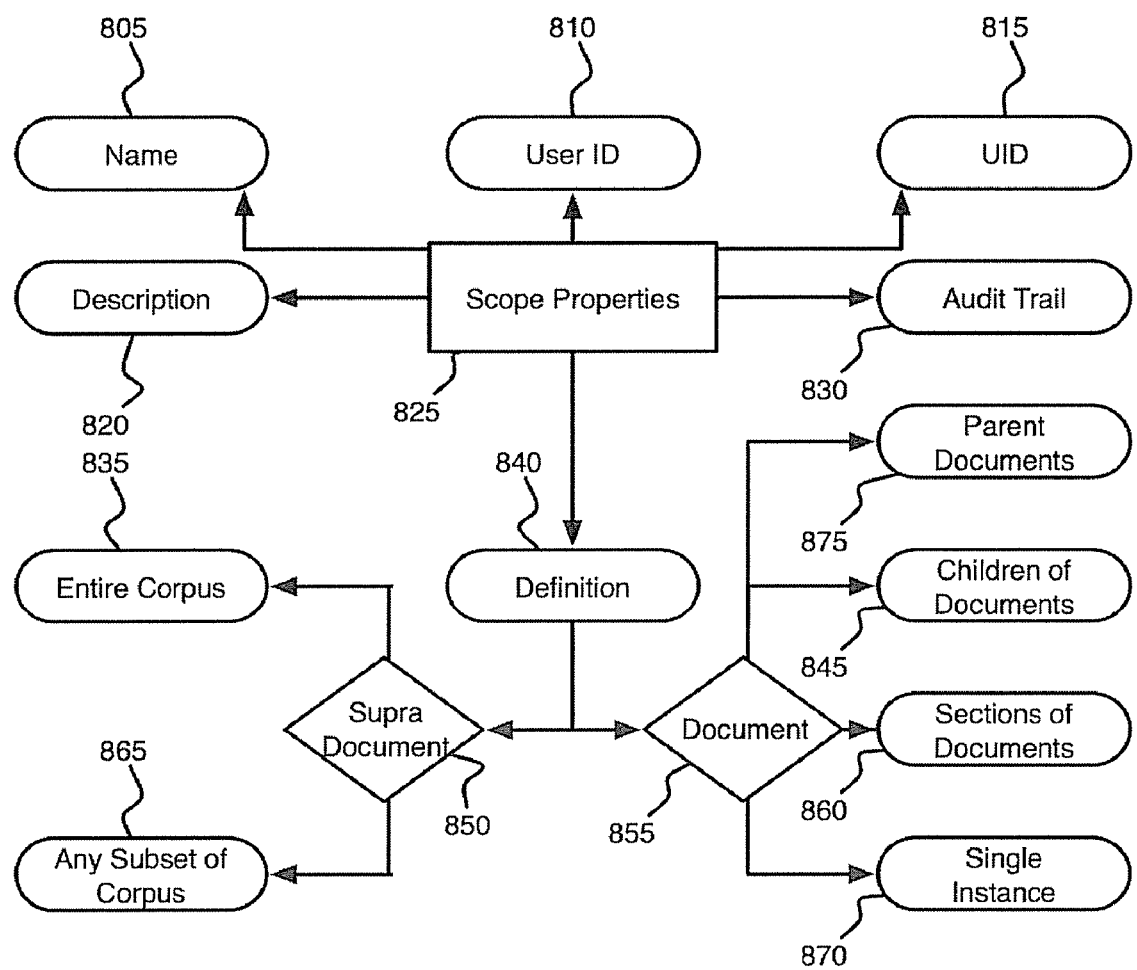
FIG. 8 is a diagram of one embodiment of displaying scope properties.
Figure 9:
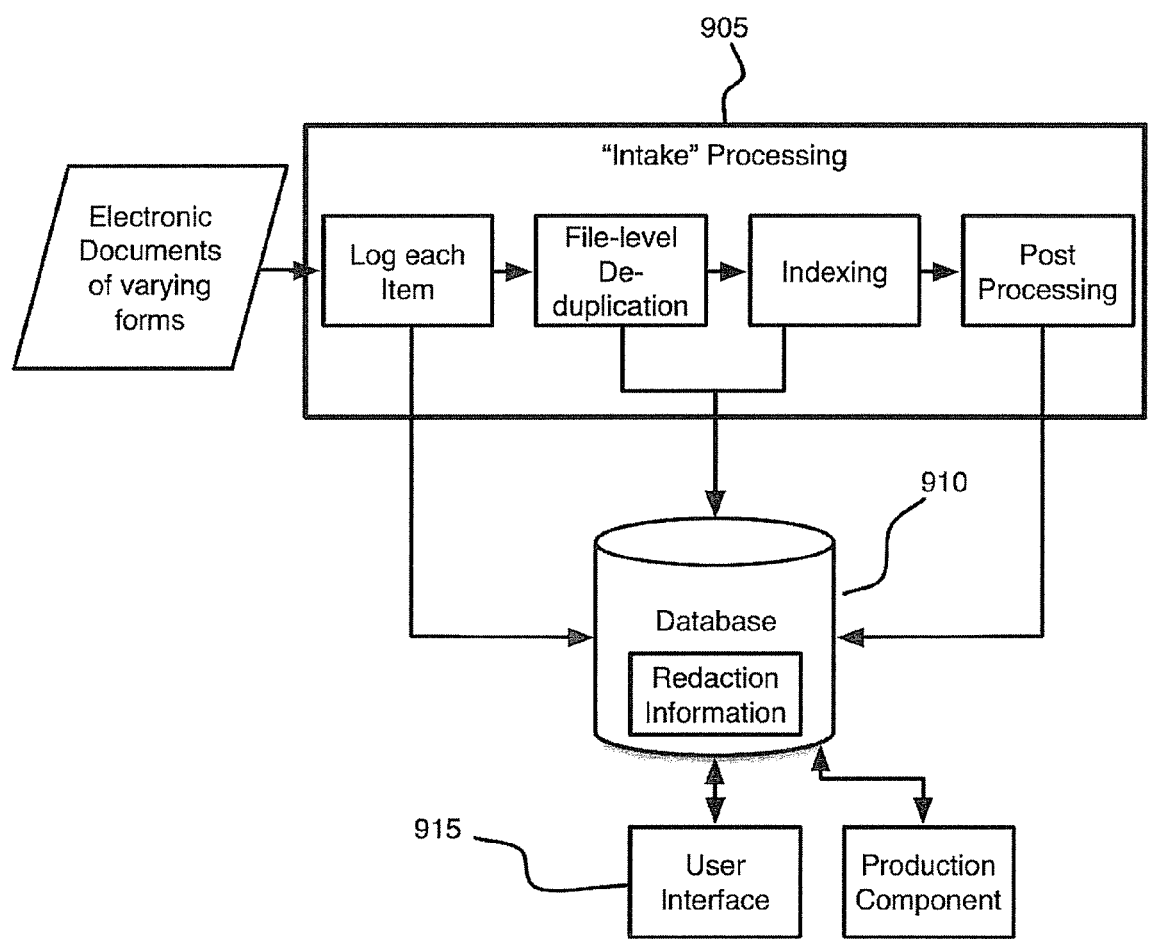
FIG. 9 is a block diagram of one embodiment of the system components.

In one embodiment, redactions [305] possess attributes ([805], [810], [815], [820], [825], [830], [835], [840], [845], [850], [855], [860], [865], [870], and [875]) as illustrated in FIG. 8, which include but are not limited to the following (unless otherwise indicated, the redaction specification [205] and its instances share the same attributes and attribute values):

Name: This is optional, and if defined, is used mostly for presentation purposes in internal reports (rather than more externally oriented redaction logs). It may be specified by the user, left blank, or filled in automatically, for example, with the first N characters of the text span being redacted (if a text redaction [305]).

UID: The unique system ID to identify this redaction specification [205] or instance. In one embodiment, the UID of a individual redaction instance caused by a redaction specification is related to the UID of that redaction specification.

Category: There is a system-wide notion of redaction "category" [510]. In one embodiment, categories [510] are defined by the user, but some common examples of categories [510] include: "Privileged", "Trade Secret", "Patient Data". In one embodiment, the system described herein puts no limitation on the number of categories [510], nor their naming. Note that some categories [510] may be made available for one matter [220], but not another.

Figure 5:
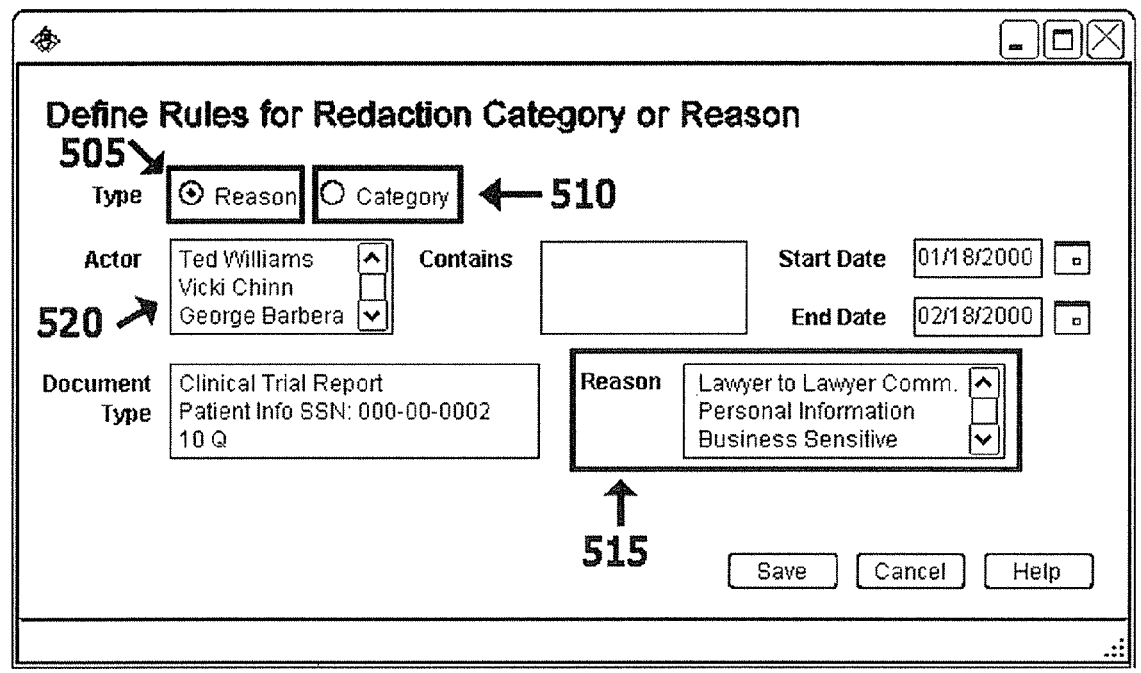
FIG. 5 is a screen shot displaying one embodiment of a user interface for automated rules to define redaction reason or category.

Reason: For some or all categories [510] defined by the user, in one embodiment, there may be a "reason" [505] provided for the category choice, as shown in FIG. 5. These reasons [505], too, are often defined by the user [715]; an example of a reason [505] for a category [510] of "Privileged" may be "Lawyer to Lawyer Communication". In one embodiment, the system may assign the category [510] or the reason [505] via a set of user-supplied rules. For example, if there is an email from an actor who is known to be a doctor and an actor who is know to be a patient of that doctor, a "physician to patient" reason could be automatically assigned, and, where need be, be subsequently corrected by the user. The system allows the user to set a configuration specifying whether a particular category [510] can, or needs to have a reason [505]. In one embodiment, the system puts no limitation on the number of reasons [505] per category [510], nor their naming. Note that this too may be set up to vary from one matter [220] to the next, as different governing jurisdictions may have different rules in this regard.

Description: For some categories [510] defined by the user, a freeform text "description" [820] of the redaction [305] may be provided. The system described herein allows the configuration of whether a particular category can have, or requires, a description [820], and puts no internal limitation on the character length for any given description [820]. Some embodiments may permit an automatically generated description [820]; for example, programmatically filling in a template of the form "[DOCUMENT TYPE] from/written by [ACTOR] [520] regarding [SUBJECT]."

Scope [605]: In one embodiment, there is the notion of a redaction's "scope" [210] for redaction specifications [205] as illustrated in FIG. 2. This defines the scope [210] of implementation of the redaction [305]. This may range from just the one particular instance created by the user to redact a specific bit of data in a unique location, to literally the entire corpus [610] of available documents, [225]. Redaction scopes [210] may also be limited to sections [710] within the current document [225]; for example, the current worksheet in a spreadsheet, the whole "simple" document [225] or the whole "compound" document [225]. In this last case, this may be defined to extend to child documents [625] of the current document [305] such as attachments to an email or embedded objects within the document [225]. Similarly, in one embodiment, redaction scopes [210] may also be specified by first selecting some specific content to redact, and then extending the redaction [215] so as to contain the whole phrase, sentence, paragraph, or document section that contains the currently selected content. The users may define other supra-document redaction scopes [210] as well. These can be any well-defined subset of the corpus [620]. Examples [715] include, but are not limited to: all documents [225] in the same discussion [715], in related discussions [715], in the same cluster [1310], associated with the same actor [520], associated with an actor [520] clique/circle of trust, documents [225] of the same ancestral lineage, documents [225] containing evidence of particular topics [720], documents [225] of particular formats, or that fall within certain date ranges, etc. An example of the defined subsets of the corpus, and ancestral lineage derivation, is provided in co-pending U.S. patent application Ser. No. 10/358,759, filed Jan. 4, 2003, entitled "A Method and Apparatus for Sociological Data Mining," incorporated herein by reference, and hereinafter referred to as the Sociological Data Mining Application. For the purposes of this application, redactions [305] that are defined to impact more than one document [225] will be referred to as "supra-document." [850] Note that individual redaction instances [215] are by definition of singleton scope.

Timestamp: Indicates when the redaction [305] was created. In one embodiment, timestamps for different instances of the same redaction specification [205] may vary slightly, depending on when exactly the system performed the redaction [305] highlighting on the document [225].

User ID: [810] Unique ID in the system for the user who originally created the redaction [305]. If a supra-document scope redaction [850], the ID of the user who created the redaction specification [205] will be used.

Permissions: A permissions system which specifies to what degree different users are able to view and/or modify the redaction [305]. In one embodiment the permissions system is similar to a Unix file system permissions model.

Audit Trail [830]: A record of all non-ephemeral system and user interactions with the redaction [305]. Non-ephemeral interactions include changes to any aspects of the redaction that are saved. The audit trail [830] data for a redaction specification in one embodiment also includes audit information regarding its instances.

Contents: Specifies what was redacted. This depends on the content type of the document [225]. If a supra-document image specification, in one embodiment the ID or hash value used to represent the image. If a single document [225] scope in an image-related document [225], in one embodiment, a page number within the document [225], a layer number within that page in the document [225], and a closed path defining a polygonal region within the page's layer's pixel space is stored. For text redactions [305], in one embodiment, the text specification at the redaction specification [205] level and further document [225] specific information for verification purposes at the instance level, as described below is part of the content. A "data type" attribute is inferable from the value of this property.

Associated Documents [855]: List of the documents [225] currently associated with this redaction specification [205]. A related attribute captures this information with respect to documents [225] that have already been produced, that is to say, made available to the other side and the court in static form as evidence at least once with this redaction [305].

Produced Count: an internal-use process flag specifying how many times the redaction [305] has been produced for a particular matter [220].

Status: One of active, deleted, or disabled. In one embodiment, for purposes of clear auditability, a redaction [305] may not be deleted once even a single document [225] has been produced with it. However, in this event it may be disabled in order to prevent it from being executed going forward.

Matters: List of associated matters [220], or matters [220] in which instances of this redaction [215] have been produced or are pending.

Stage: This varies by redaction [305] type. Values include, but are not limited to: pending execution (if execution is asynchronous), pending approval, pending production, not yet saved.

Redaction Scope Definition

As noted above, a redaction specification [205] includes a scope [210] and the scope of implementation for the redaction specification [205]. In one embodiment, the properties of redaction scopes [825] include but are not limited to: name (optional) [805], description (optional) [820], user ID [810], definition [840], UID [815], audit trail [830], as well as derived attributes, such as the redactions [305], matters [220], and documents [225] it is associated with, and the users who are able to see and use this scope [210] to create redactions [305] as illustrated in FIG. 8.

Figure 6:
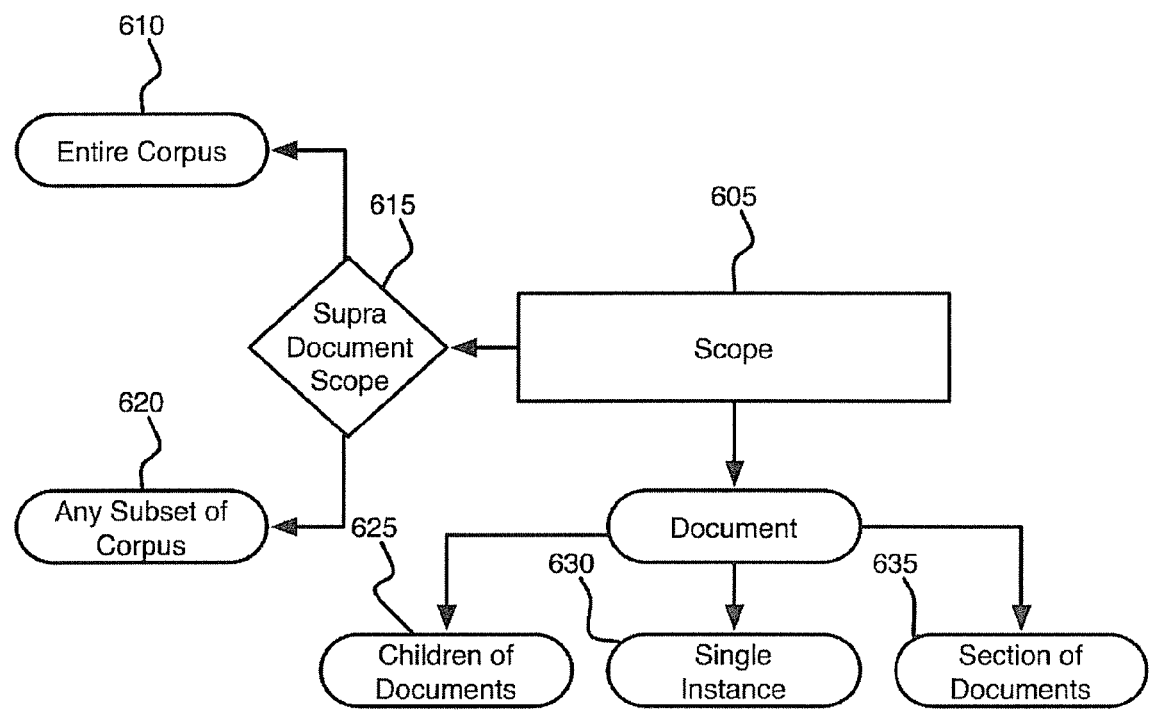
FIG. 6 is a diagram displaying one embodiment of the relationship of scope to other objects.
Figure 7:
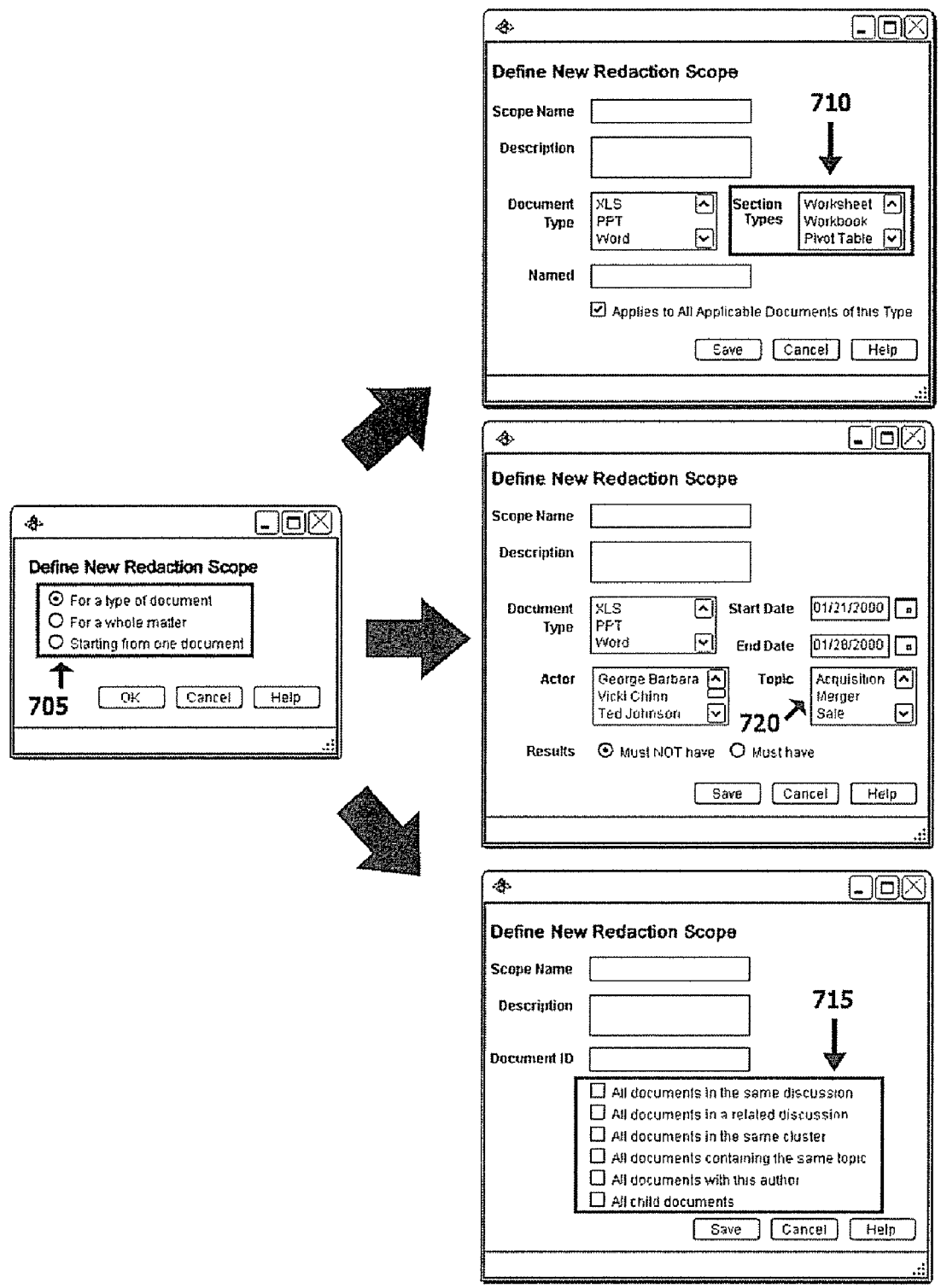
FIG. 7 is a screen shot of one embodiment of a user interface to define scope.

The present invention provides a system and a process for the redaction [305] of documents [225] in an electronic medium as illustrated in FIG. 6. The system includes an intake component [105], which is responsible for indexing, storing, and organizing of the documents [225] within the corpus. One embodiment of the intake, component [105] is described in the Sociological Data Mining Application. The system further includes an internal representation of a redaction, an application component [110] allowing a user to specify and manage redactions of varying scopes [205], and finally a production component [115] that allows the production of documents [225] with different kinds of redactions [305].

Definitions:

From the standpoint of the components involved in the redaction [305] process, the corpus may contain four types of documents [405]: image [425], text [420], motion, [415] and mixed type [410].

An image document [425] either contains no detectable meaningful text spans, or is a document [225] of an image file type (such as GIF, JPG, TIFF) and for user specified, or other reasons, no successful attempts at optical character recognition were made during the intake process [905].

A text document [420] contains only character data; this includes both documents [225] that have no text styling and those that do have text styling (such as the usage of more than one font, or bolding/italicizing/underlining, or similar); this also includes spreadsheet and other kinds of fielded or structured documents [225] that do not contain any image data.

A motion document [415] is a classification applied to any document [225] whose presentation is a stream of data delivered to the user over a fixed amount of time. In present technology, examples include two-dimensional video content, audio content, vector graphics-based animation programs, or any other stream of data generally viewed as a continuous stream, any resolution and encoding. The method of redaction [305] for motion documents [415] as described below can be extended in a straightforward manner to any future motion reproductions which project into a space of dimensionality greater than two. Similarly, any motion documents [415] containing representations of the electromagnetic spectrum which fall outside of what is commonly accepted to be detected by unaided human senses would fall into this category.

A mixed type document [410] may contain two or more of image data, text data, and/or "motion" data. This is commonly the case because of an object embedded in the document [225] or attached to it (for example, a graphic of a flowchart in a Microsoft Word document, or a wav file attached to an email).

The System

Figure 45:
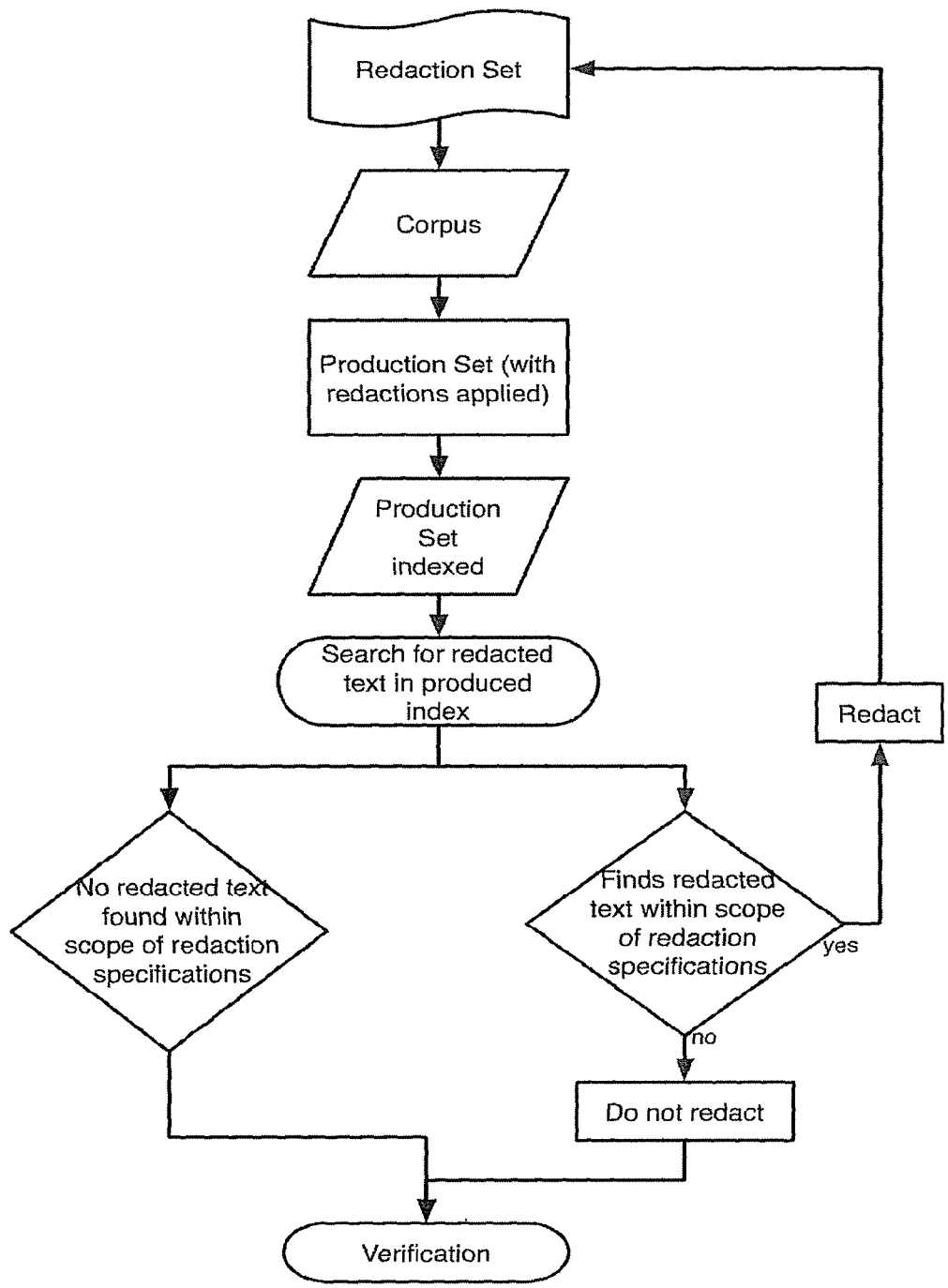
FIG. 45 is a flowchart of one embodiment of the process of verification of produced documents.

FIG. 45 illustrates one embodiment of a redaction system. The redaction system is designed to interact with a corpus of documents. Although the corpus of documents are shown here as part of the system, they may be external, stored on a separate device, or distributed over multiple devices. In one embodiment, the corpus of documents is not particular to the redaction system. In one embodiment, the corpus of documents is stored in a distributed database structure. In one embodiment, the corpus of documents includes various types of documents, including but not limited to: text documents, image documents, motion documents, and mixed-type documents.

The system includes a user interface. The user interface is an integrated user interface which enables to redaction of various types of documents. In one embodiment, the user interface may be a client application, thick interface, which distributes many of these functionalities to the user's system. In another embodiment, the user interface may be a server-based application with a thin interface. In one embodiment, the thin interface is available through a web browser application.

The user utilizes redaction definition logic to define a redaction. In one embodiment, the obscuration of the data is performed in such a way that the document still denotes that data once existed in the redacted region, but assures that there exists no way in which to recover the original data. In one embodiment, the redaction maintains the format of the original document. In one embodiment, a redaction may have a scope outside of the single document. In that case, the user utilizes a pre-defined redaction scope, from the available redaction scopes, to perform a redaction beyond the single document. In one embodiment, an authorized user may define redaction scopes, and add them to the available redaction scopes.

An automatic pre-redaction system is applied to the corpus of documents, in one embodiment. This system performs analysis on the documents to determine potentially applicable redactions prior to the documents being made available to the user. Depending on the settings of the automatic pre-redaction system, these redactions may be suggested to the user through the user interface, or applied automatically to the document without prior user intervention.

In one embodiment, the system further includes a jurisdictional database, which includes the redaction rules for one or more jurisdictions. A user, through user interface indicates the jurisdiction(s) applicable to the matter. In one embodiment, jurisdictional rules are used by automatic pre-redaction system. In one embodiment, jurisdictional rules are also used by redaction application logic, to create redacted documents in accordance with local rules.

Some or all of the redactions, in one embodiment, are applied to the document(s) immediately. In one embodiment, redaction application logic applies the redaction to all documents in the corpus, including documents currently being edited by others.

In one embodiment, production tracker interacts with redaction application logic to ensure that new redactions are not applied to data that has been previously produced. The production tracker is not particular to the redaction system. If a redaction is being applied to/removed from previously-produced data, in one embodiment, the production tracker alerts an administrator or other authorized user. The authorized user can apply the redaction forward going, apply a clawback to attempt to retrieve the errant documents and replace them with corrected versions, or refuse to apply the suggested redaction.

In one embodiment, watermarking logic adds a watermark to produced documents. The watermark may include Bates numbers, redaction reasoning, etc.

Redaction log tracks each redaction added by a user, as well as each redaction applied automatically due to the configuration of the automatic pre-redaction system. In one embodiment, redactions which are later rescinded, deleted, or not implemented, are also tracked in redaction log. Redaction log enables an administrator to review redactions. This may be used to evaluate the efficiency and correctness of redactions by various reviewers.

In one embodiment, audit trail tracks each interaction with the corpus of documents, not just redactions; as such, audit trail is not particular to the redaction system. Audit trail may also be used to evaluate reviewers and reverse decisions.

In one embodiment, de-duplication logic is used to remove duplicate documents from the corpus. In one embodiment, a pointer to the original copy of the document remains, when the duplicate is removed. The de-duplication ensures that each identical copy of a document is handled the same way. The de-duplication system is not particular to the redaction system.

In one embodiment, the corpus of documents may include embedded documents. Embedded documents are references to other documents which may be outside the corpus itself. Embedded document handler handles such embedded documents in various ways, as described in more detail below.

In one embodiment, the system enables a user to migrate a corpus, or subset of a corpus, to create a new corpus. Migration logic handles this migration. However, certain redactions may have settings which do not permit migration, or certain types of redaction reasons may not apply to the migrated corpus. Migration logic flags these instances, in one embodiment, for the attention of an administrator.

The Process

With respect to preparing the document [225] for the usage in the redaction component, the intake component [105] of the process system builds an index. One embodiment of how the index is built is described in the Sociological Data Mining Application. The building of indexes is commonly understood in the field of Information Retrieval.

Documents [225] which do not present themselves in an electronic format are converted to an electronic format. In one embodiment, text documents [420] are converted to an electronic image via conventional means of document scanning. The scanned documents are then processed into text using any type of OCR technology. Image data is scanned as well. Motion data is converted via conventional means to a digital format.

One embodiment of the processing component is described in Sociological Data Mining Application.

Documents [225] may contain textual information which is not otherwise displayed during their viewing by regular applications; we will refer to this information as metadata [2115]. Most document formats have metadata [2115]; for example:

a field defining the author's name, user comments (as found in document editors), speaker notes (as found in presentation tools), and the related notion of tracked changes within a document [225] (as found in editors). The intake component [105] creates and maintains a reference to this metadata [2115] in the index, including its type, thus allowing it to be available for redaction [305] even if not part of the normally visible part of the document [225]. In one embodiment, all such metadata [2115] is redactable.

For text documents [420], in one embodiment, the range of redaction [305] of text within the document [225] is specified in three manners. It is specified in three different manners to allow for redundant checks of data integrity. The three manners are: token range, as derived from the text tokenizer; character range, which takes into account the character encoding of the document [225]; and byte range, which defines the range over the raw bytes of the document [225]. In one embodiment, in the event that any of these three methods disagree with each other, the redaction [305] fails, and an error notification is sent to the administrator(s).

For motion documents [415], in one embodiment, redaction [305] ranges are specified by the starting and ending timestamp of the interval to be redacted.

For image documents [425] a page number within the document, a layer number within that page, and a closed path defining a polygonal region within the page's layer's pixel space is stored.

Figure 10:
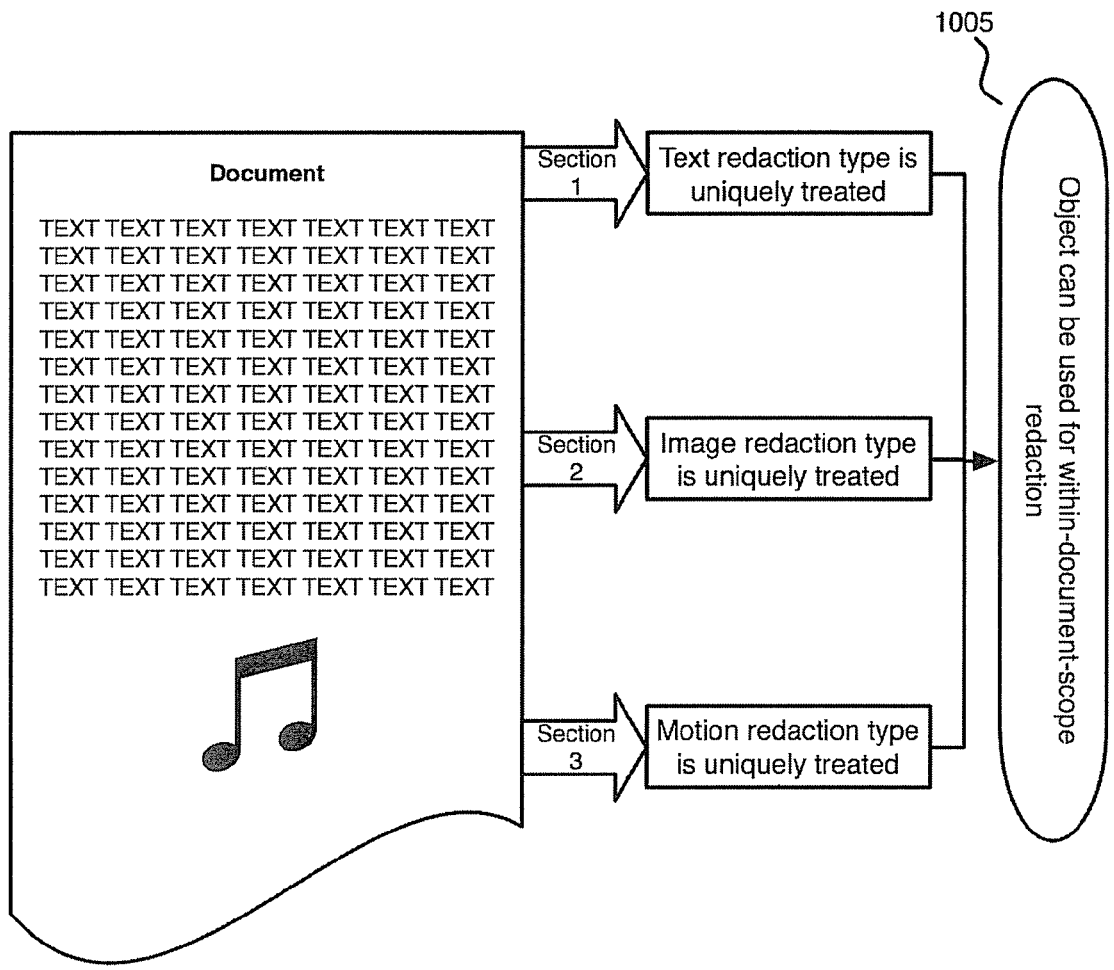
FIG. 10 is a diagram of one embodiment of the breakdown of a document into homogenous data slices.

For mixed type documents [410] illustrated in FIG. 10, storage of the redaction [305] depends upon which type of data is being redacted within the document [225]. From a document [225] representation perspective, the sections [860] of the document [225] which are contiguous text and contiguous image (or motion) data are identified uniquely and distinctly, and are stored for subsequent use [1005]. The basic image and text redaction [305] storage types are augmented with information stating to which document section [860] they pertain. These distinct contiguous elements can be the basis for a within-document-scope redaction [305]. In one embodiment, each data type in a mixed type document becomes a distinct child entity, since it is displayed using different components, and produced in a different manner.

Document De-Duplication and the Impact of this on Redactions and Production

It is common that multiple copies of the same document [225] are present in the corpus. The recognition of the equivalence of two instances of a document [225] as the same document [225], and noting of such in the built index, is referred to as "de-duplication"; this can be done by any number of well known means, including the use of MD5 hashes. One embodiment of de-duplication is described in the Sociological Data Mining Application.

In one embodiment, redactions [305] are performed on the corpus subsequent to the de-duplication process being performed. In one embodiment, if one copy of a particular document [225] is redacted, all copies are redacted, in the event they are ever produced (and presuming that the redaction [305] has not been deleted or disabled).

A concrete example of the implications of this is shown in the following example. Given a document [225], referred to as 'A', and two different emails, 'B' and 'C', each of which have 'A' as an attachment, a user redacts text spans within 'A'. Note that it is immaterial how the user arrived at the process of redacting 'A': whether they were reviewing 'A' directly and chose to redact, or were reviewing 'B' and chose to redact 'B's attachment 'A', or some other route of review. Should the user later choose to produce 'B' and 'C', both of these emails will be produced with their attachment, 'A', redacted. In one embodiment, individual copies of documents [225] can be excluded from being redacted, should there ever be any situation in which this is necessary or desirable. In one embodiment, such exclusion may only be specified by an administrator, or designated user.

Some embodiments may indicate redaction metadata [2115]; including but not limited to the name of the user who performed the redaction [305], when it was performed, and for what matter [220]. This ensures, for example, that if a user sees a pre-redacted document (that is, one that has been redacted by the system due to a supra-document scope redaction prior to the first user review), he or she can determine the user and reasoning for that redaction. In one embodiment, if the user does not change the pre-redacted document his or her name is not attached to that redaction. In another embodiment, his or her name is attached to the redaction, to indicate that another reviewer has seen the redaction and agreed with it.

Documents with Dynamic Content

One important complicating factor in the redaction [305] of native electronic documents [225] is the fact that some documents [225] may contain dynamic, or variable, content. Examples of dynamic content include, but are not limited to, formulas in spreadsheets which reference the content of other cells, current date or document [225] modification date in word processing, OLE objects, and external documents [1105] linked within a document [225].

Figure 11:
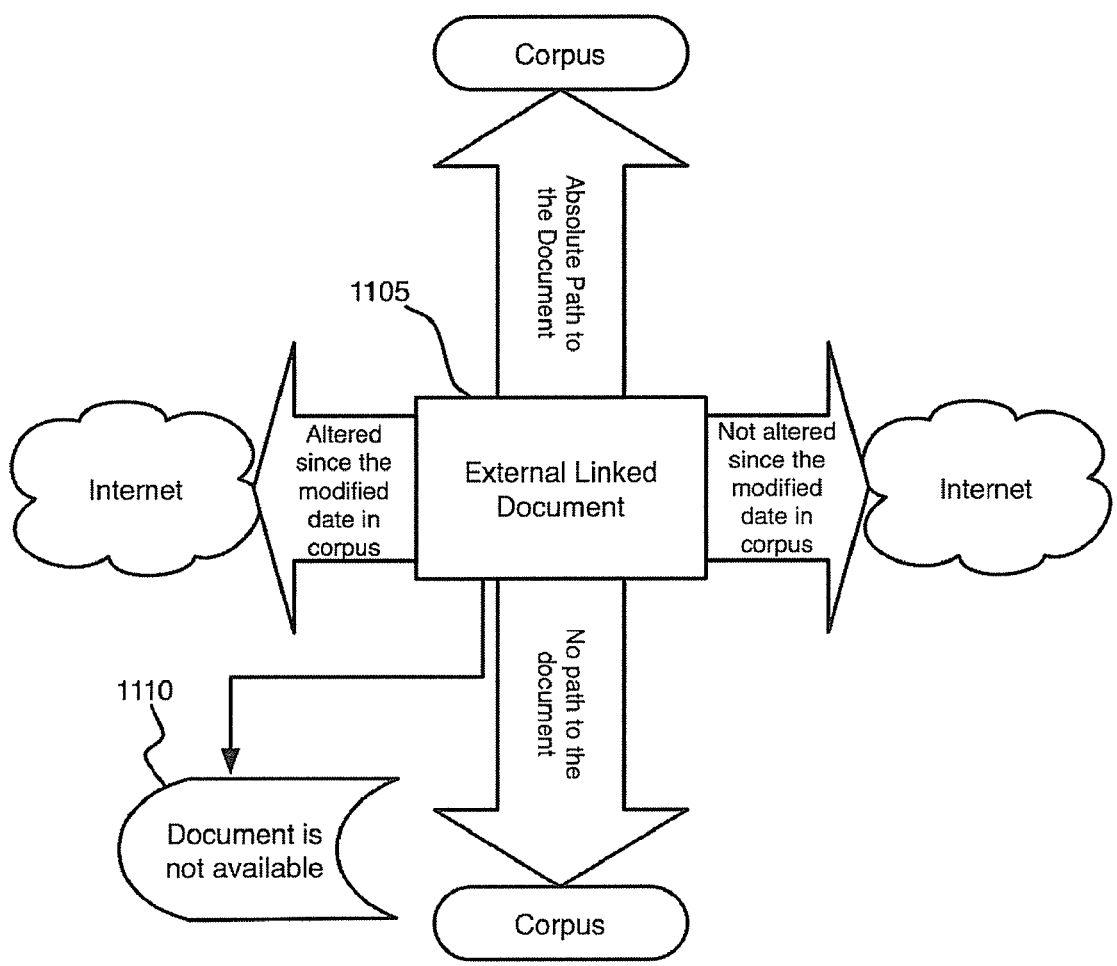
FIG. 11 is a flowchart of one embodiment of subtypes of embedded or linked documents.

The case of embedded or linked documents [225]: External documents [1105] linked to a document [225] undergoing intake can be defined by one of the following categories. 1) The external document [1105] is present in the collected corpus currently undergoing intake [905] and can still be easily located via an absolute or relative path. 2) The document [225] is in the corpus, but requires additional effort to locate. 3) The external document [1105] is not present in the collected corpus, but is still accessible and presumably static; for example: a PDF file found publicly available on the Washington Post web site. 4) The external document [1105] is not present in the collected corpus, but is still accessible, but some of the document's [225] content may have been altered since the last modification of the containing document [225] 5) The external document [1105] is not able to be located [1110], whether because it is not present in the collected corpus, or because it refers to a publicly available location but is no longer at that location. These cases are illustrated in FIG. 11

In one embodiment, documents [225] which are external [1105] to the corpus but are still extant are automatically downloaded by the system and indexed. If they are publicly available documents [225], in one embodiment, they are considered not available for redaction [305]. Unless it can be ascertained that the content of the document [225] is unchanged from its state at the time of its original inclusion in the parent document [875], in one embodiment, a visual stamp or other indication will appear to remind the user that there is no guarantee that the content is the same as, or even similar to, what it was at that time.

Figure 13:
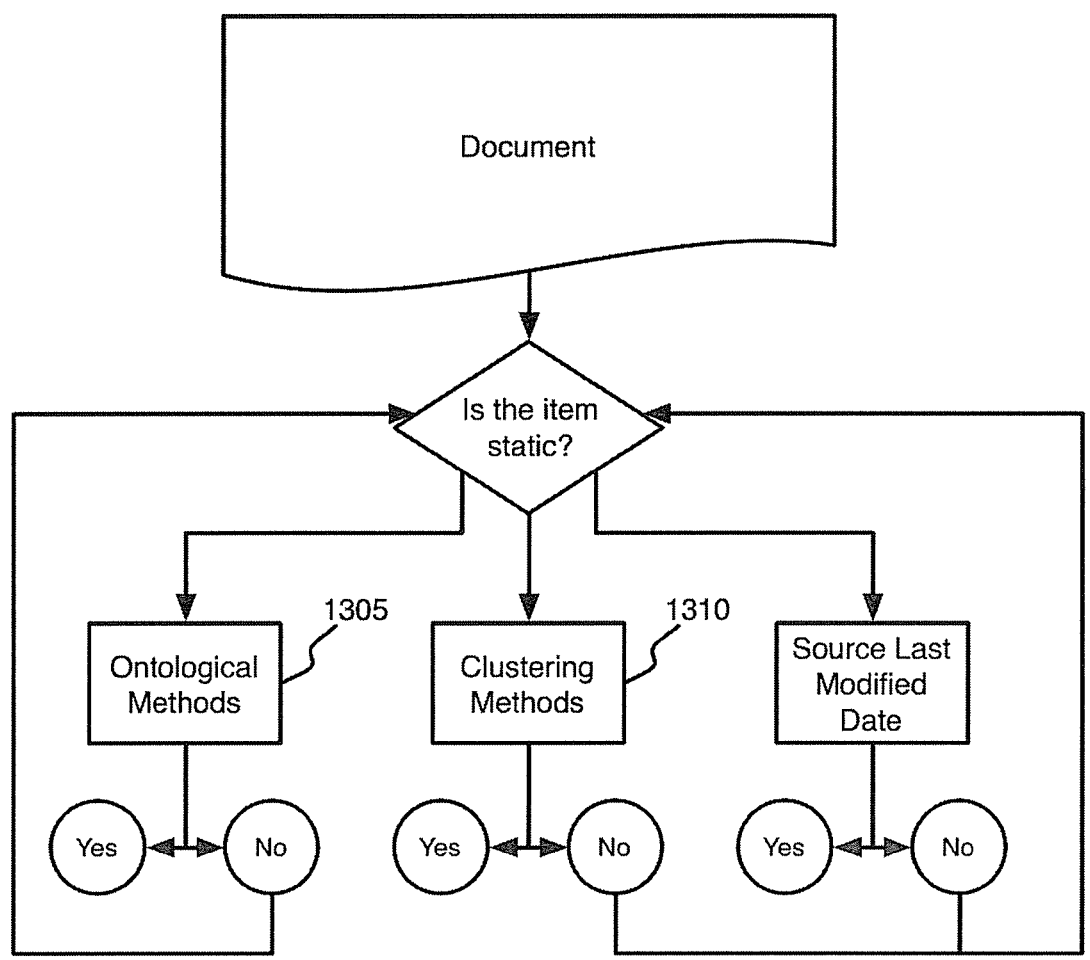
FIG. 13 is a flowchart of one embodiment of determining dynamic token content.

Means of ascertaining whether or not the document [225] content is static include, but are not limited to, ontological [1305] or clustering-related [1310] approaches to identify the document [225] content type as static (for example, a form that has been filed with the SEC), rule-based knowledge that indicates documents [225] on a certain site are static, or the source last modified date. This is described in FIG. 13. Documents [225] which are simply no longer available will be so noted in production logs.

Figure 14:
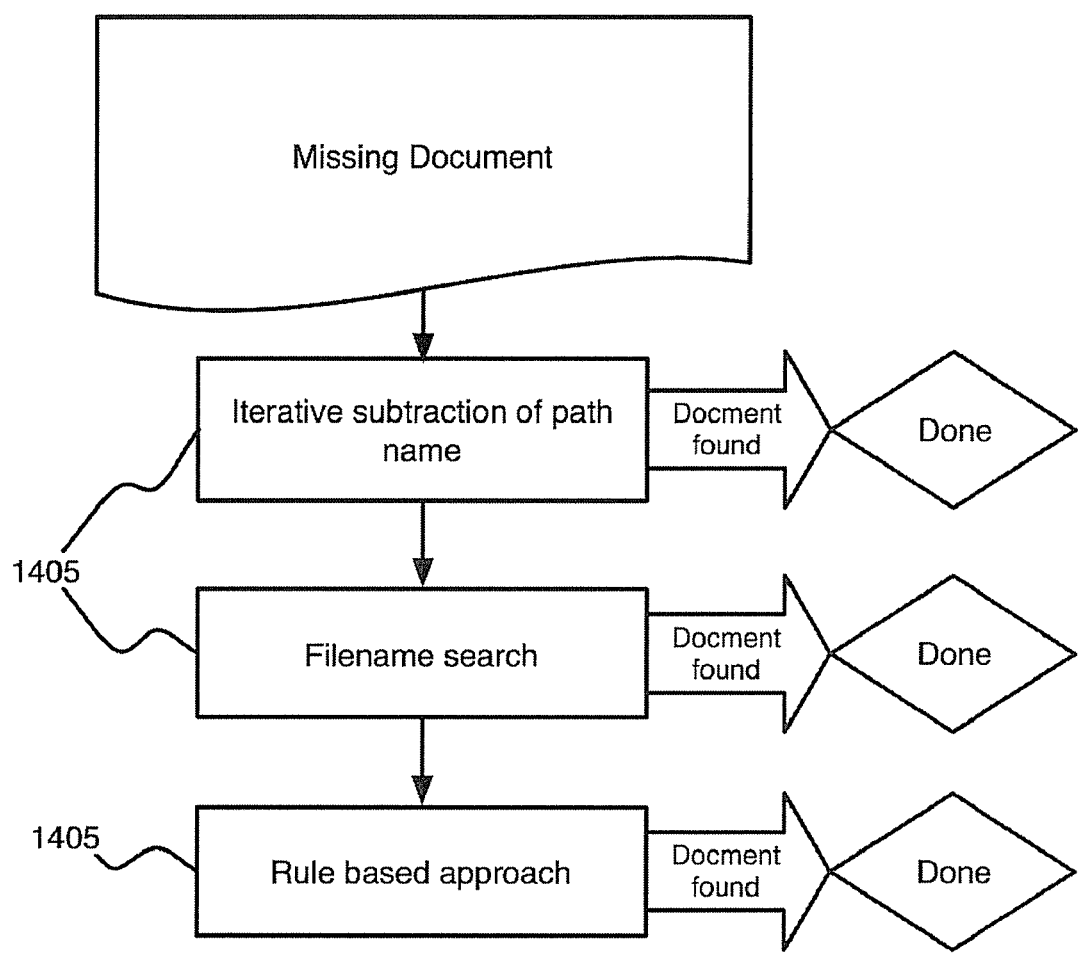
FIG. 14 is a flowchart of one embodiment of locating missing documents.

In one embodiment, automated attempts may be made to search the corpus for internal documents [225] whose linked path is for some reason no longer correct. These attempts may include, but are not limited to: searching for the document [225] by continually subtracting components of the path/filename combination [1405]; searching for files having the document [225] name (including temporary cache files and auto-saved backups); rule-based approaches [1410] that indicate where to look for certain kinds of documents [225], and allowing the user to specify a directory mapping where appropriate. In one embodiment, the paths of missing internal documents [225] are noted and compiled into a report with the aim of identifying missing directories or file shares that still must be collected, or which was deleted. This is illustrated in FIG. 14.

Figure 12:
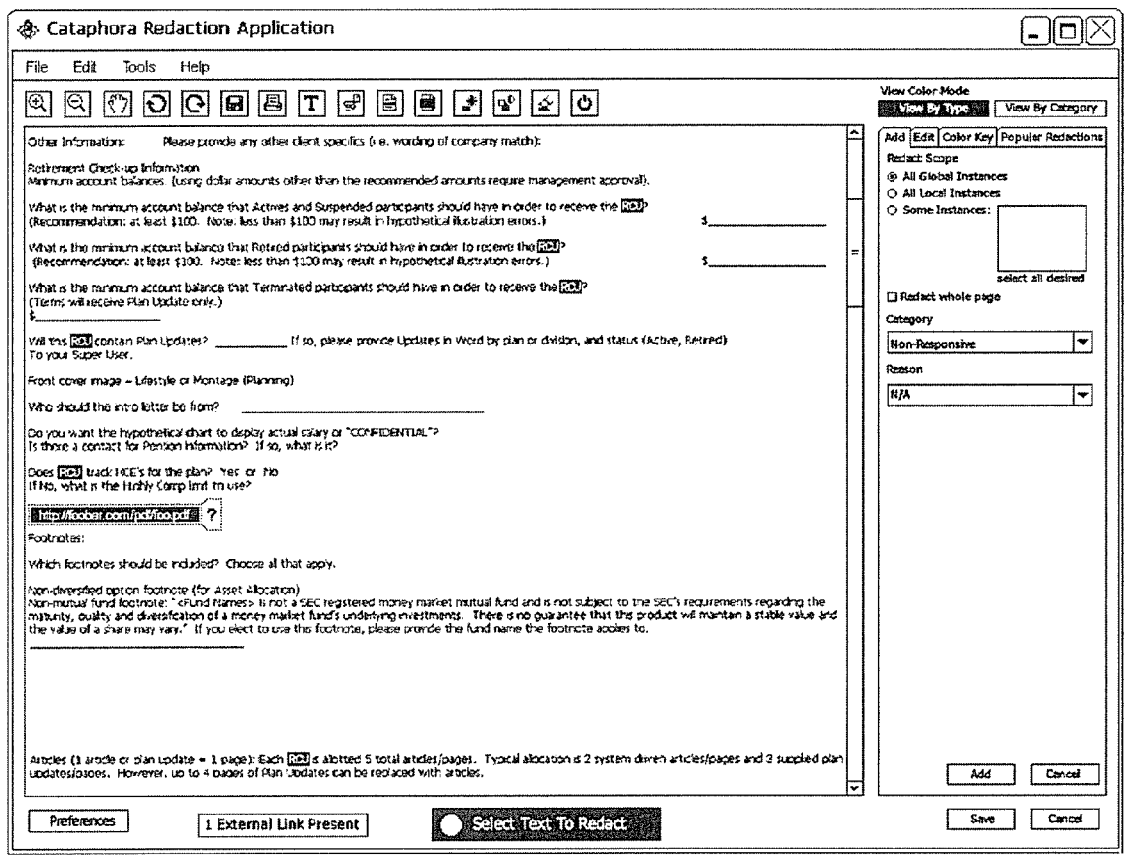
FIG. 12 is screen shot of one embodiment of identifying the exact contemporaneous content of a document.

In one embodiment, the user can access the quasi-metadata [2115] of such documents [225] in order to view information. By "quasi-metadata", we mean metadata that is added to the item by the system in order to characterize it properly for visualization and other purposes. Such quasi-metadata may include, but is not limited to: whether or not it is known to be the exact contemporaneous content, or is being presumed to be—and if so, why—whether it came from within the corpus or was accessed from some public source and if so, which source. In one embodiment, this is depicted in FIG. 12. The exact implementation of accessing this in the user interface [110] may vary with the embodiment.

Figure 16:
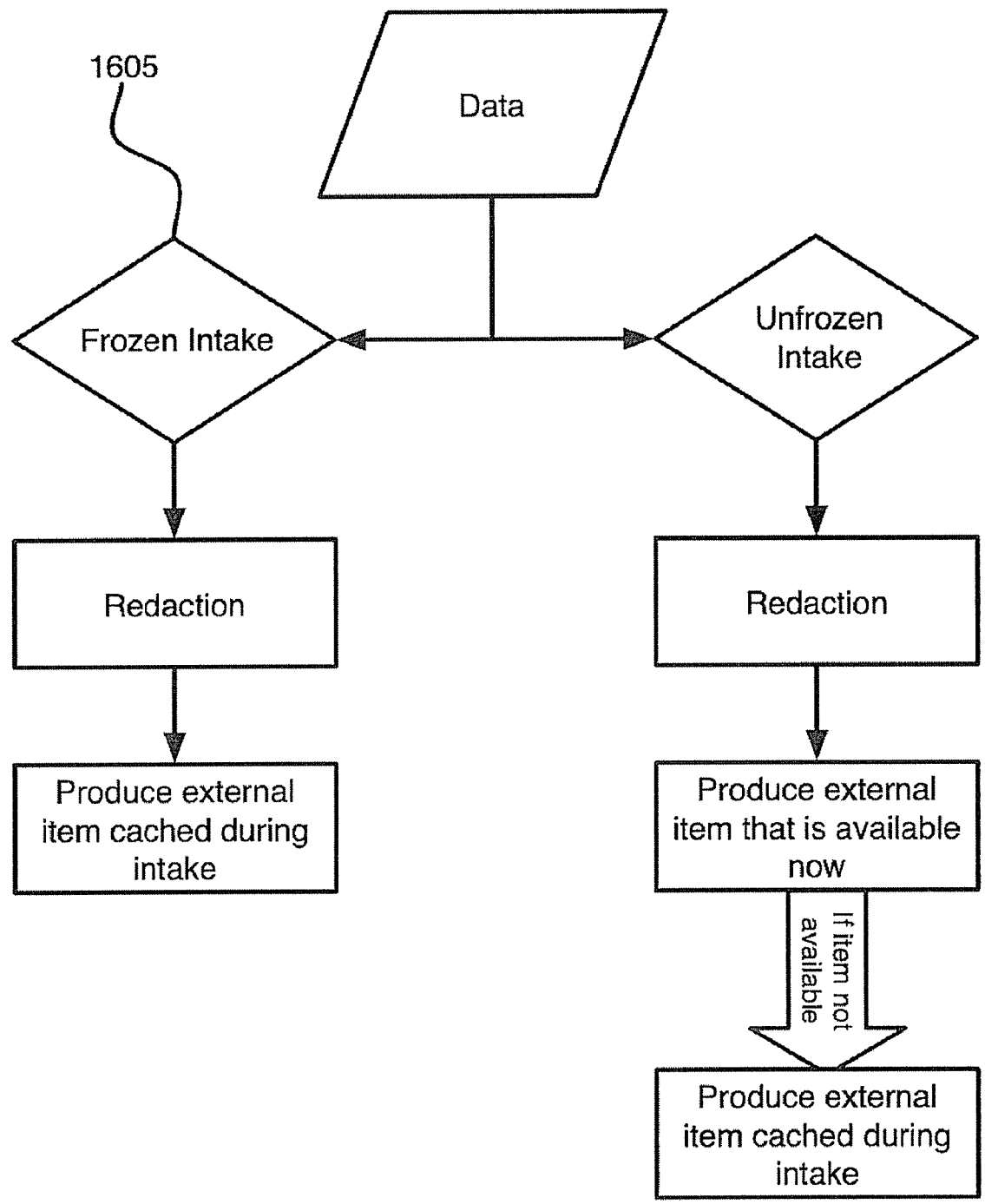
FIG. 16 is a flowchart of one embodiment of handling of linked documents at production time.

Subsequently, at production time, various options exist to deal with the linked documents [225]. This is illustrated in FIG. 16. In one approach, a document [225] undergoes 'freezing', or is 'frozen', on intake for purposes of redaction [1605]. This means that all linked documents [225] which are present in documents [225] are made static at the moment of intake [905]. If the user has chosen frozen intakes, the production component [115] will produce the version of the external document [1105] cached during intake [905]. If the user has chosen not to freeze intakes, then the production component [115] will give preference to producing the version of the external document [1105] which is available at the time of production; should it no longer be available, the version cached during intake [905] will be used.

Case of variable data: Variable data includes all dynamic content which may change over time, such as formulas in spreadsheets which reference the content of other cells, current date or document [225] modification date in word processing documents and OLE objects.

Different embodiments may take somewhat different approaches to it. In one embodiment, the system requires prior knowledge of the existence of the different possible types of dynamically updating objects associated with that document format, while others will (optionally) automatically take snapshots of any non-ASCII, non-image-based document on subsequent days or varying certain likely variables and compare them, with the aim of automatically identifying anything that changed, and hence must be dynamically updating in nature.

Figure 17:
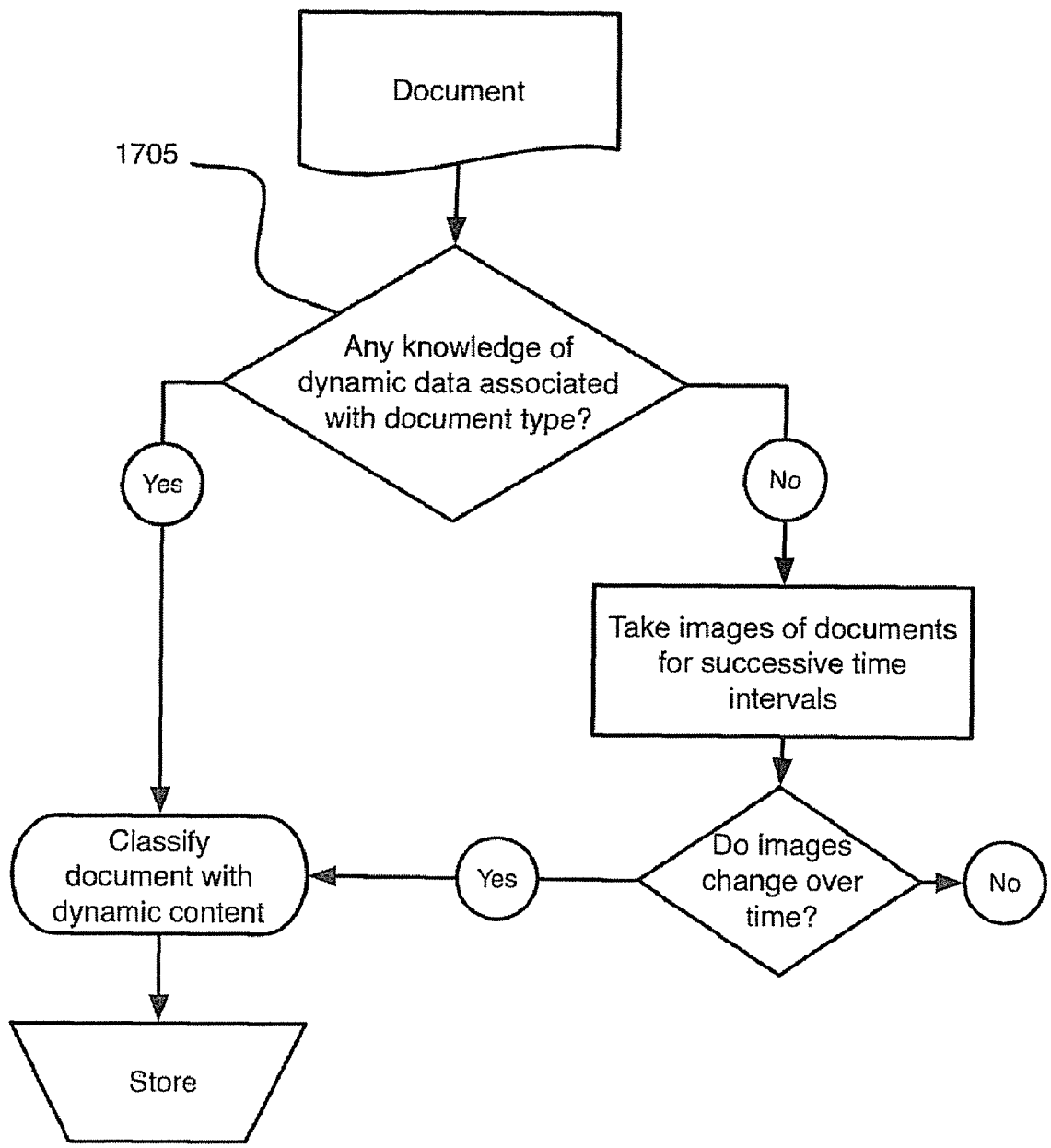
FIG. 17 is a flowchart of one embodiment of determining dynamic token content.
Figure 18:
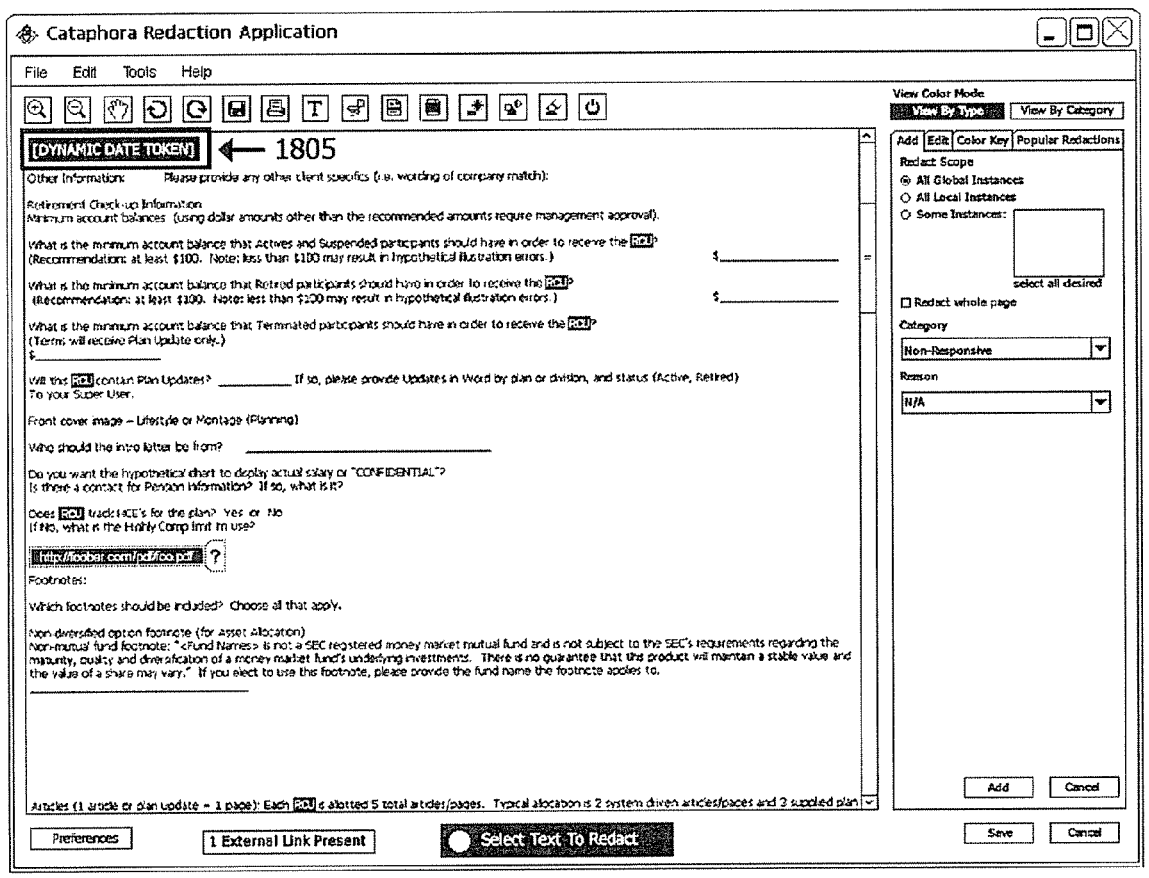
FIG. 18 is a screen shot of one embodiment of a user interface for displaying dynamic token content.

Documents [225] with dynamic content encountered during intake [905] will have that content classified as such, and its existence stored as part of the data compiled while building the index during intake [905], as shown in FIG. 17. The recognition of such dynamic [1705] content is highly application-dependent; it is well known that certain applications support specific kinds of dynamic content. Some common examples of this include, but are not limited to: a spreadsheet cell that is calculated based on an operation involving the content of two other cells (in one embodiment, the cell has that calculation performed during intake [905] and its contents replaced with that concrete resultant value); a text span representing the last modification time stamp for a Microsoft Word document (in one embodiment, such a time stamp is captured, its underlying variable definition is deleted, and the text of the captured date is inserted in the deleted space). When the user then reviews a frozen document [225] for redaction [305], they are presented with a document [225] of completely static text. In one embodiment, such documents [225] will be annotated with a visual indicator when viewed within the system to inform the user that "freezing" occurred.

Figure 15:
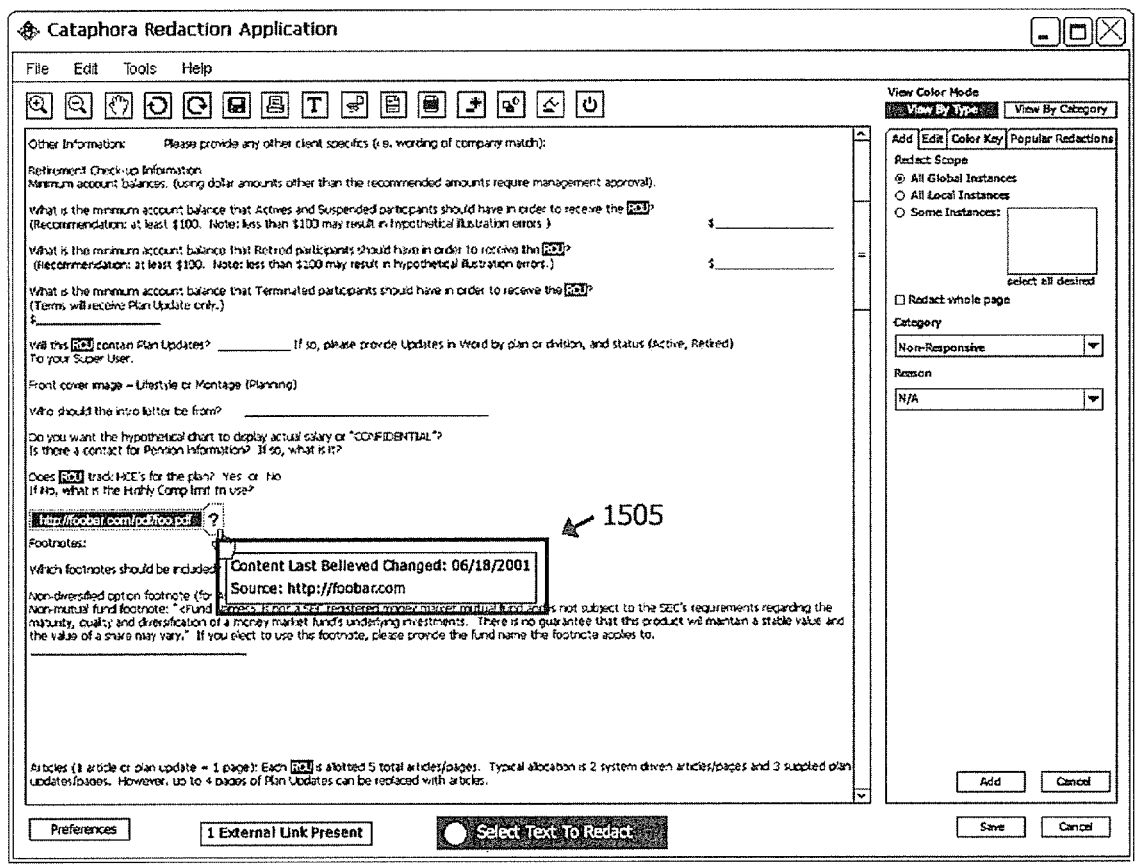
FIG. 15 is a screen shot of one embodiment of visually indicating the presence of dynamic variable markup.

In another approach the underlying dynamic variable markup is not removed from the document [225] as shown in FIG. 15. When a user then reviews such a document [225], they are presented with indicators [1505] in the user interface [110] that denote the presence of an underlying dynamic variable. The user is allowed to redact the actual variable markup itself. In the case of a formula in a spreadsheet, the redaction [305] of a formula will naturally break its calculation at production time. In one embodiment, the application warns the user of this, and gives them the opportunity to proceed despite this, cancel, specify a single value, or individual values to fill in the appropriate cells, or use a system-provided mechanism to indicate that the cells have also been redacted. In yet another approach, the dynamic token is replaced by its name; for example, "[DYNAMIC DATE TOKEN]" [1805] instead of a specific date in the case of a dynamically updating date token.

User Interface—End User

Redaction User Interface

The system provides a user interface through which, amongst other things, users may view, review, and redact documents [225] in a corpus. One embodiment of such a user interface is described in the Sociological Data Mining Application. One embodiment of such a user interface is described in concurrently filed patent application Ser. No. 11/497,199, entitled "An Improved Method And Apparatus For Sociological Data Analysis," filed on the same date as the present application. Through a user interface [110], the user is able to define redactions [305] both on an individual instance basis and against any broader scope [210] defined or selected by the user [705] (depending on the level of permissions granted to that particular user.)

In addition to providing the ability to automatically redact an arbitrarily large number of documents [225] with a single redaction specification [205], the user interface [110] combines different kinds of redaction [305] (e.g. pixel-based vs. character-based) not just within the same system, but within the same window. This provides an ease of use benefit for the user, and makes the process more efficient, especially in the case of documents [225] that are of mixed content type.

In one embodiment, the user interface has three different interaction modes with the user. This is in part to help avoid user information and visual overload by having too many tools active or visible at the same time.

"Add" mode. In this mode, which in one embodiment is the default, the user is able to view the document [225] and its current redactions [305] as well as define new redactions [305]

"Add-review mode". After a selection has been made for redaction [305] in the add mode, the user interface enters "add-review mode". This is the mode in which the user is editing a new redaction [305] having just been created in the Add mode, and it allows for the editing of all redaction [305] attributes that that user has permission to edit. This is also the mode in which individual instances of a redaction [630] may be overridden by the user.

"Edit mode". The last mode type is the edit mode; in this mode, the user is able to select existing editable redactions [305] and modify or delete them.

The user interface [110] displays redacted regions [2025] as colored areas of possibly varying degrees of translucency, depending on the current configuration settings. In one embodiment, the color of these areas corresponds to either the category [510] of the redaction [305], or the redaction reason [505], depending on a user preference. However, in other embodiments, the color can also be used to represent other dimensions, including but not limited to: indicating the author of the text or the scope [210] of redaction [305]. In other embodiments, borders around the redaction [305] (for example, varying line thicknesses, patterns, and colors) are used in a similar manner, allowing two meta-data properties of the redactions [305] to be visible concurrently. In one embodiment, how many dimensions to use concurrently can be configured, since use of too many visual cues in a small area of the screen can be very distracting to the user, and may not be advisable in certain lighting and other conditions. Still other embodiments allow the font color of the text to also be used as an indicator. In one embodiment, the user interface [110] provides user-configurable preferences which allows the user to define whether the redacted regions [2025] should be rendered as translucent (showing the underlying document [225] information) or opaque (not showing the underlying document [225] information), or some intermediate setting for editing purposes. For motion documents [415], the redacted regions [2025] are rendered over the timeline view [2715] for the document [225].

In one embodiment, the user interface [110] features include:
- A tear-away panel. This panel may be optionally separated from the main window and in one embodiment may automatically be separated depending on the available screen real-estate.
- Certain individual controls, including but not limited to: a button which brings up the system preferences panel for that user, an indicator that displays the current "edit" or interaction mode, an "exit" button, and a button to save the current redactions [305]. (Note that some embodiments have an auto-save feature; however, in most of these embodiments, it is up to the administrator whether or not to enable this feature.)
- Attributes Button which brings up a panel to allow the user to change which redaction [305] attributes are visualized, as well as how they are visualized (for example, that all redactions [305] of a particular category [510] will show up with a green fill). In one embodiment, this panel will contain a legend which dynamically updates. Some embodiments may also feature "quick toggle" buttons, so that with a single click, display an alternate attribute which have been pre-configured by the user.
- Redaction [305] editing controls: these depend on document [225] content type and are detailed further on. These allow for all types of redaction [305] editing that the current user is permitted, including multiple selections, and redactions of supra-document scope [615]. These controls also permit the editing of existing redactions [305] including their scope. [210]
- Controls to view or hide different kinds or all available document [225] meta-data.

Figure 21:
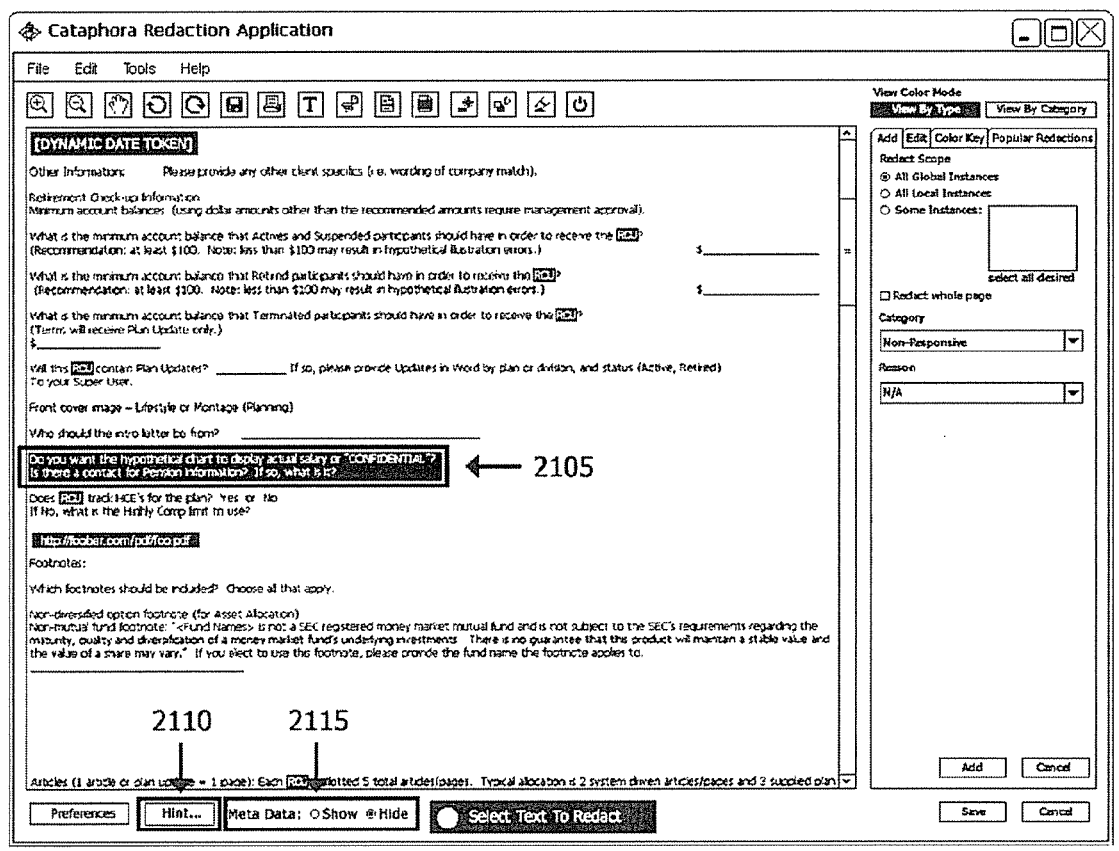
FIG. 21 is a screen shot of one embodiment of an end user interface for handling text document redaction.

In one embodiment, a "hint" button [2110], which when clicked provides the user with information about any content [2105] within the current document [225] (or if applicable, one of its sub-documents [430]) that might be a likely candidate for redaction [305]. In one embodiment, this is a two-state button, where one state indicates that such content exists within the document [225] and the other indicates that no such content exists as shown in FIG. 21.

Figure 19:
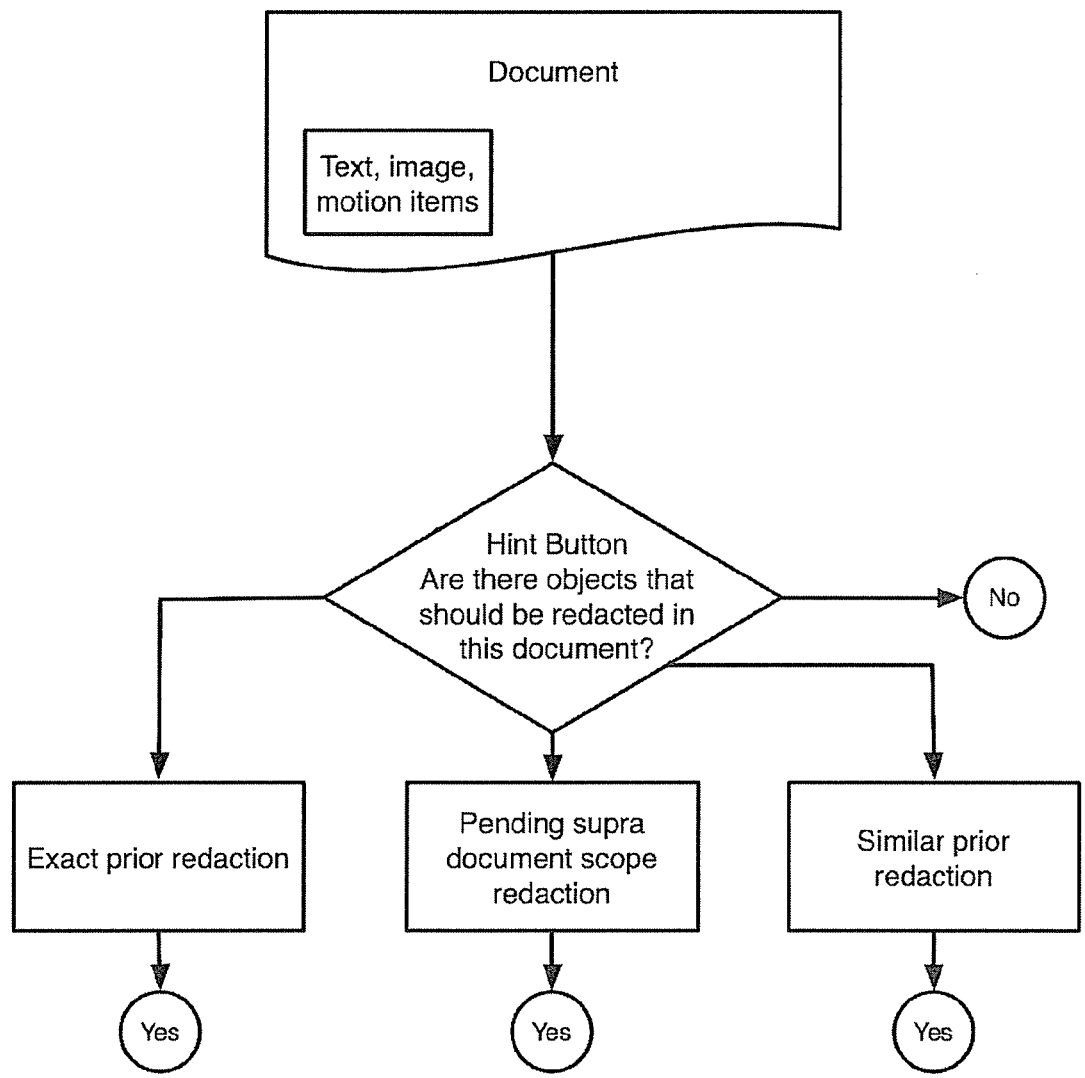
FIG. 19 is a flowchart of one embodiment of the process of determining candidates for redaction.

Methods of identifying likely candidates for redaction [305] as illustrated in FIG. 19 include, but are not limited to: text spans or images that have elsewhere been redacted by users (past some threshold, or at all), or are slight variations (as determined by Levenshtein edit distance or otherwise) on such redactions [305], or are pending redaction [305] by a redaction [305] request of supra-document scope [615]. In one embodiment, controls are provided which allow the user to see all or part of documents [225] in which such previous redactions [305] have occurred.

There are other user interface [110] behaviors which are present in one embodiment, and are not specific to a particular document [225] format.

In one embodiment, the selection of existing redactions [305] involves switching to the edit mode and then clicking on one or more redactions [305]. In other embodiment, clicking on an existing redaction instance [305] is sufficient to change the mode to "edit." The selection mechanism logic allows the selection of a redaction [305] by clicking on the redaction [305], the selection of multiple redactions [305] by holding down the shift key while selecting redactions [305], and the de-selection of all currently selected redactions [305] by clicking on space that has either no redaction instance [305] in it or a not-currently-selected redaction instance [305] in it—in this latter case, the formerly not-currently-selected redaction instance [305] then becomes selected. Alternative mappings of such selection types may be used.

In one embodiment, holding the mouse over an existing redaction [305] will display a floating box which lists the redaction category [510], and reason [505] and/or description [820], if they exist. In one embodiment, the user may specify other redaction [305] attributes to appear in the mouseover. Some embodiments may also provide button alternatives, or display alternatives, as well.

An entire page, in the case of image documents [425], or an entire document [225], in the case of text and mixed type documents [410], may be selected for redaction [305] by the editing industry standard Ctrl-a key press. Some embodiments may also provide button alternatives as well.

Further, most document [225] types have the notion of granularity of a 'section'[860]; for example, a worksheet in a spreadsheet, a slide in a presentation, a paragraph or any kind of structured element in a text document [420] or a page in a multiple page image document [425]. In one embodiment, when the user is working with a document [225] which has multiple sections [860], an entire section [860] may be selected for redaction [305] by Alt-clicking in that section [860], by selecting a button provided for this purpose, or by another method. Such sections [860] may be used as redaction scopes [210], both within the current document [225], and also in a supra-document scope [615] context.

Working with Image Documents

Figure 20:
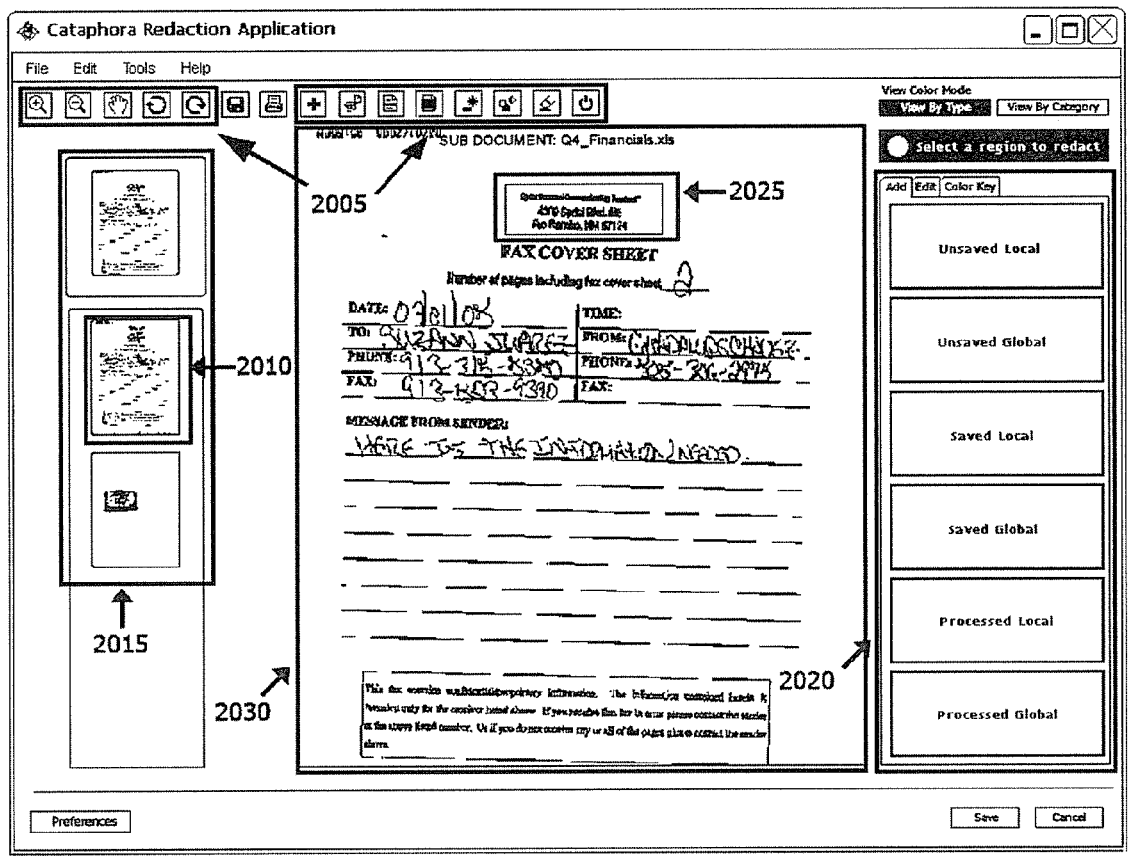
FIG. 20 is a screen shot of one embodiment of an end user interface for handling image document redaction.

When working with an image document [425], or a document [225] which contains one or more images, in one embodiment the user interface [110] automatically appears with image manipulation tools [2005], as illustrated in FIG. 20 including but not limited to bi-directional zoom and drag, a redaction [305] tool which allows polygonal region definition, and action tools (including but not limited to: rotate image, select-whole-area of the current page, and select-whole-area of all pages within the document [225]).

The following description applies only to image-related redaction [305]. In one embodiment the user interface [110] features a main image viewing area which displays the current page within the image document [425]. In one embodiment, the default initial zoom on to the image is 100%. It is in this central viewing [2030] area which the tools can act. In one embodiment, the user interface features a scrollable display of "thumbnails" [2010] (scaled down versions of an image) for every page within the image document. [2015]. In one embodiment, if the page has more than one image layer, the thumbnail is the composite of layers rendered in the correct Z-order for the page.

In one embodiment the user interface [110] features a display of the thumbnail [2010] of the current page being manipulated [2020]. In one embodiment, this thumbnail display presents the user with a possibly translucent colored rectangular region representing the region of the image currently viewed in the main viewing area [2030].

In one embodiment, when the user chooses to rotate a page within the image document [425], that rotational display is mirrored in the thumbnails [2010] of the image within the user interface [110]. In one embodiment, if the page has more than one image layer, the rotation is applied to all layers on that page.

In one embodiment, when the user chooses to rotate a page within the image document [425], and the main image viewing area is displaying a subsection of that page, the view of that subsection is maintained through the rotation. If the exact view is mathematically unable to be maintained due to unequal width and height of the viewing area and the subsection displaying certain border areas of the image, the closest overlapping region will be maintained.

The administrator may request that the ability to define supra-document redactions [615] for image documents [425] be enabled for some or all users, or groups of users. In one embodiment, the actual process that applies the redaction [305] to all documents [225] across the corpus will be performed asynchronously. However, in another embodiment, it is immediate, or as requested by the user. In one embodiment, until all redaction instances [215] have been performed, documents [225] that will have the redaction [305] that are being viewed by any users of the system have the redaction(s) [305] rendered on the fly, thereby changing the reviewer's view. In one embodiment, a notation of why this redaction was made is displayed to a reviewer whose current view is changed through the on-the-fly redaction. Note that prior to the context of actual production, "applying the redaction [305]" means modifying the representation of document [225] that will be shown in the user interface such that in future it will appear with the redactions [305] visually represented as specified in the current configuration. When actually produced, the documents [225] will be truly redacted, which is to say that the redacted portions are completely obscured. However, since this is rarely desirable prior to the production, redactions [305] are usually depicted in a manner that still allows the user to see the "redacted" content.

In one embodiment, supra-document scope redactions [615] on images are supported by hashing the image. Hashing images in order to match identical documents is known in the art. Alternative image identification schemes may be used.

In one embodiment the user is able to define a redaction region [2025] that overlaps a pre-existing redaction region [2025]. This is necessary in some instances; for example, redactions [305] with different underlying reasons [505] could overlap somewhat with one another, and in such instances, attorneys often prefer to maintain the logical span of each redaction [305] as well as the double redaction [305]. This may also be useful if in certain productions, one or more of the redaction reasons [505] do not apply.

Working with Text Documents

The following section pertains to working with documents [225] that contain text content only.

When working with a text document [420] user interface [110] similarly features a main text panel view area, as illustrated in FIG. 21. In one embodiment, this main text panel view area may have different rendering displays of the text depending on the file type of the original text document [420]. For each supported file type, an effort is made to mirror the normal or native user experience and format. For example:

If the file type of the original text document [420] is a spreadsheet or other structured document, this view area replicates the standard view of the spreadsheet as a two-dimensional grid of cells containing text content.

If the file type of the original text document [420] is a plain presentation document [225], this view area replicates the slide's layout and ornamental character usage.

Note that in one embodiment, the user interface [110] instead utilizes the WINDOWS OPERATING SYSTEM technology of COMPONENT OBJECT MODEL (COM) to embed a MICROSOFT OFFICE application, such as WORD or EXCEL, within the user interface [110] itself. A copy of the original document [225] received on intake is loaded inside the relevant application; in conjunction with the appropriate template code, the user is able to redact the information in the truly original format of the document [225].

In one embodiment, the user selects a text span to redact by click-drag selecting document text [420] with their mouse. This action is designed to replicate the selection process which a user would experience in many commonly used text-centric applications used by office workers. Alternative modes of selection may be used.

Figure 22:
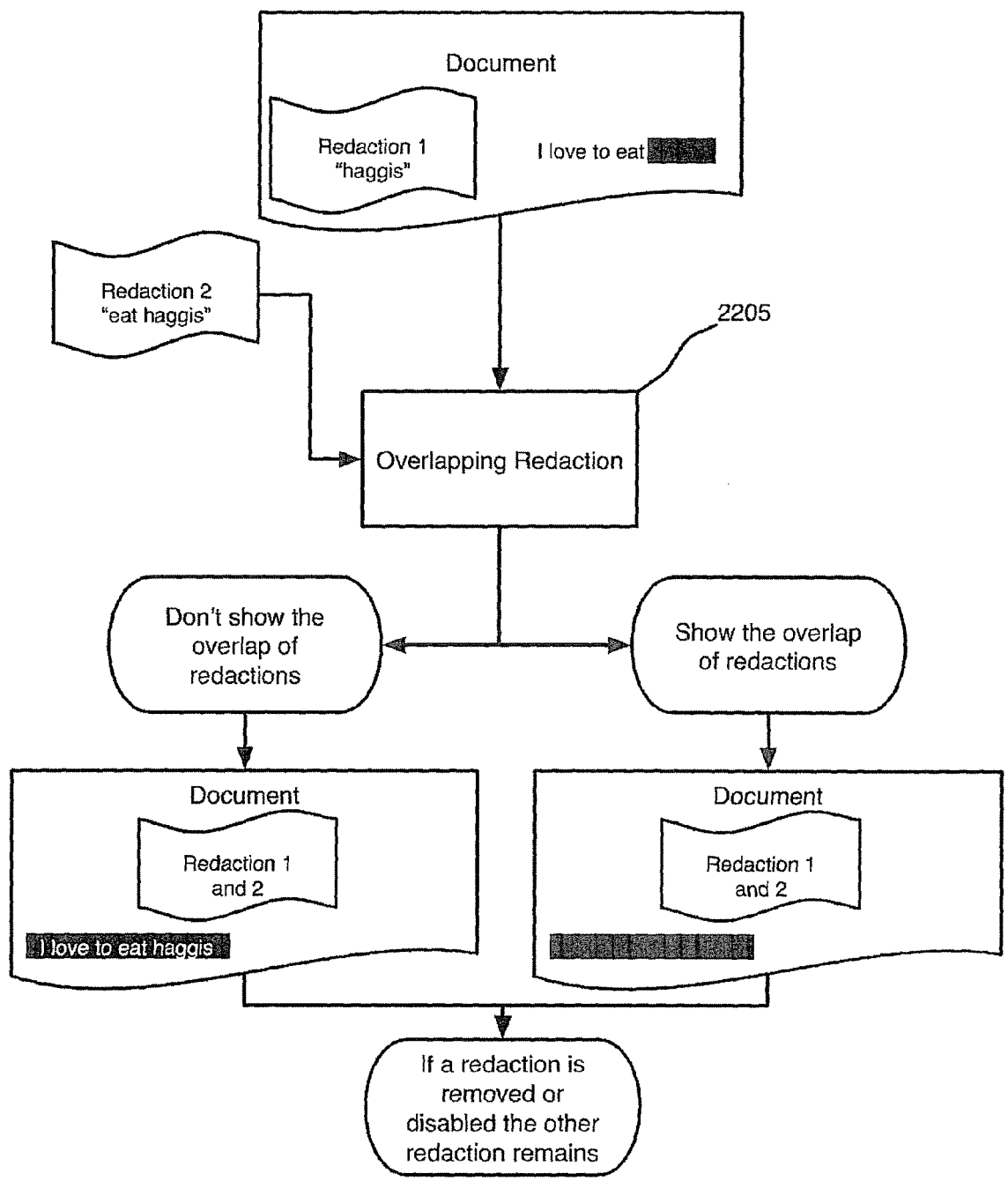
FIG. 22 is a flowchart of one embodiment of handling redaction overlap.

In one embodiment, when adding a new redaction [305], a redacted span of text is not allowed to overlap, neither partially nor entirely, with a span of text which already has any kind of redaction [305] defined for it. For example, in the sentence "I love to eat haggis", if "haggis" already has a redaction [305] defined for it, a user will not be able to redact "eat haggis" FIG. 22. In situations where a user wishes to be able to specify more than one category [510], and/or reason [505], and/or description [820] per redaction [305] in these embodiments, the system can be configured to allow the specification of multiple redaction [305] reasons [505] in order to provide this functionality. In another embodiment, such overlap is allowed. In one embodiment, when a document [225] with overlapping redactions [2205] is produced, the overlap will not be visually evident; by default, the last redaction [305] applied will appear to be in effect. If one of the redactions [305] is subsequently deleted or disabled, the portion redacted by the second (or Nth) redaction [305] would remain redacted. In another embodiment, the overlap in the produced document [225] may be indicated with a separate joint reason [505] code, or else a change in color or fill pattern of the redaction [305]. Likewise, in the user interface [110], some embodiments will visually make clear the overlap while others will not.

Once the click-drag selecting process has finished (when the user releases their mouse button), in one embodiment, the system automatically searches the entire document [225] for all instances of the selected text span, or other specification. In one embodiment, the search may utilize a wildcard, or a fuzzy match. It then highlights, in the main text panel view area, all found instances with a user-specified highlighting color, and changes the interaction mode to add-review mode. In one embodiment, the display has a "navigate to next instance" button. Some embodiments may require the user to specify a "whole document" or greater scope [210] for the redaction [305] for any additional instances of the text span to be highlighted; in others, whether or not to do this is a global user preference. If the redaction scope [210] selected is greater than whole document [225] in one embodiment, a job will be added to a queue to be performed asynchronously, at a system-determined time. However, in other embodiments, it may begin immediately, or when requested by the user.

Figure 23:
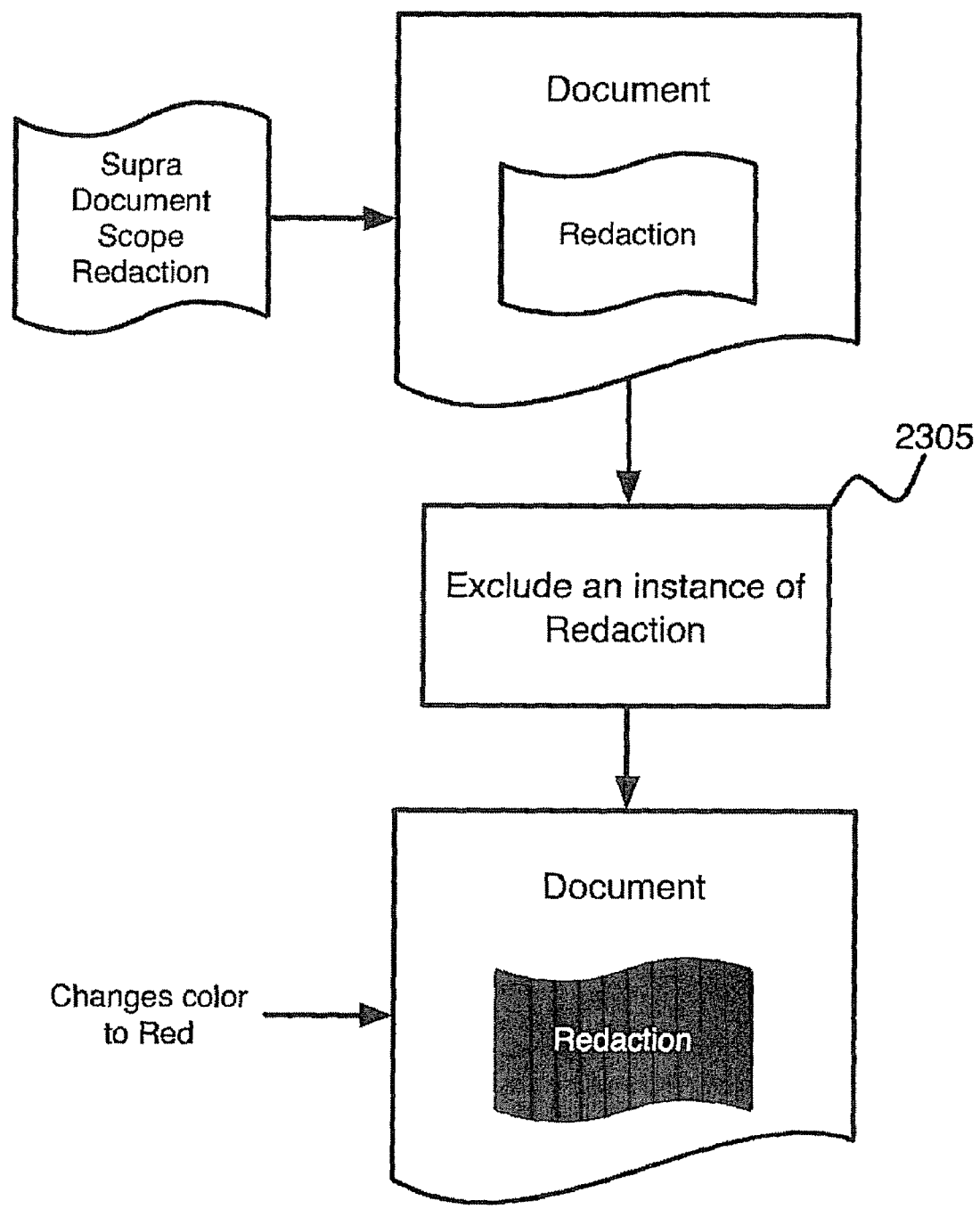
FIG. 23 is a flowchart of one embodiment of excluding individual redactions from a scoped redaction.

When the user is presented with the instances of the redactions [215] in add-review mode, she may choose to exclude one or more instances from being redacted [2305]. The excluded status is represented visually by the background of the excluded instance changing to a different color; in one embodiment, the default color used is red to help denote that a redaction [305] action is being stopped, as shown in FIG. 23. The user may re-include the instance [215] by clicking on it again, with the visual indication being the background changing back to its original color.

In one embodiment, in add-review mode, the normal background of the text viewing area (often white) changes to a different user-specified color to remind the user that the add review mode is on.

When adding a new redaction [305], or editing a pre-existing redaction [305], the user may (depending upon their level of permissions) be able to specify a redaction [305] of whole document [225], or of supra-document, scope [615]. In one embodiment, only administrator users can define new scopes [210] which are arbitrary sets of documents [225]. However, in one embodiment, all scopes [210] defined by the administrator become available for use by all users with the correct permissions to see and use them. In one embodiment, some or all scopes [210] may only be available for redactions [305] with certain properties. In the event of a supra-document scope redaction [615] specification by the user, in one embodiment the system will automatically query the data repository in order to provide the user with a count of the number of documents [225] that would be impacted by this action.

In one embodiment, should conflicts arise, such as an instance of the supra-document redaction [615] overlapping a pre-existing redaction [305] in a given document [225], and overlapping redactions [2205] are not allowed for the matter [220] at hand, a detailed notification will be sent to the pre-configured administrator(s). In one embodiment, the user is warned prior to sending the notification, so to give the user a chance to modify the redaction [305] to remove the problem.

In one embodiment when selecting redactions [305], all redactions [305] of the same text-category [510]-reason [505] triplet may be selected by Alt-clicking on a single redaction [630] instance of that type; in other embodiments, other behaviors may be configured instead. Some embodiments may also offer buttons that select different combinations of redactions [305].

In edit mode, the normal background color of the text viewing area may change to a user-specified color as a visual cue that the interaction mode has changed.

In edit mode, the user may also override any redactions [305] of supra-scope that have impacted the current document [225] one or more times, presuming that the user has the permissions to do so.

In some embodiments, controls are provided which allows the user to extend a redaction [215] so as to cover the whole phrase, sentence, paragraph or section of the document [635].

Text Documents that are Spreadsheets

Figure 24:
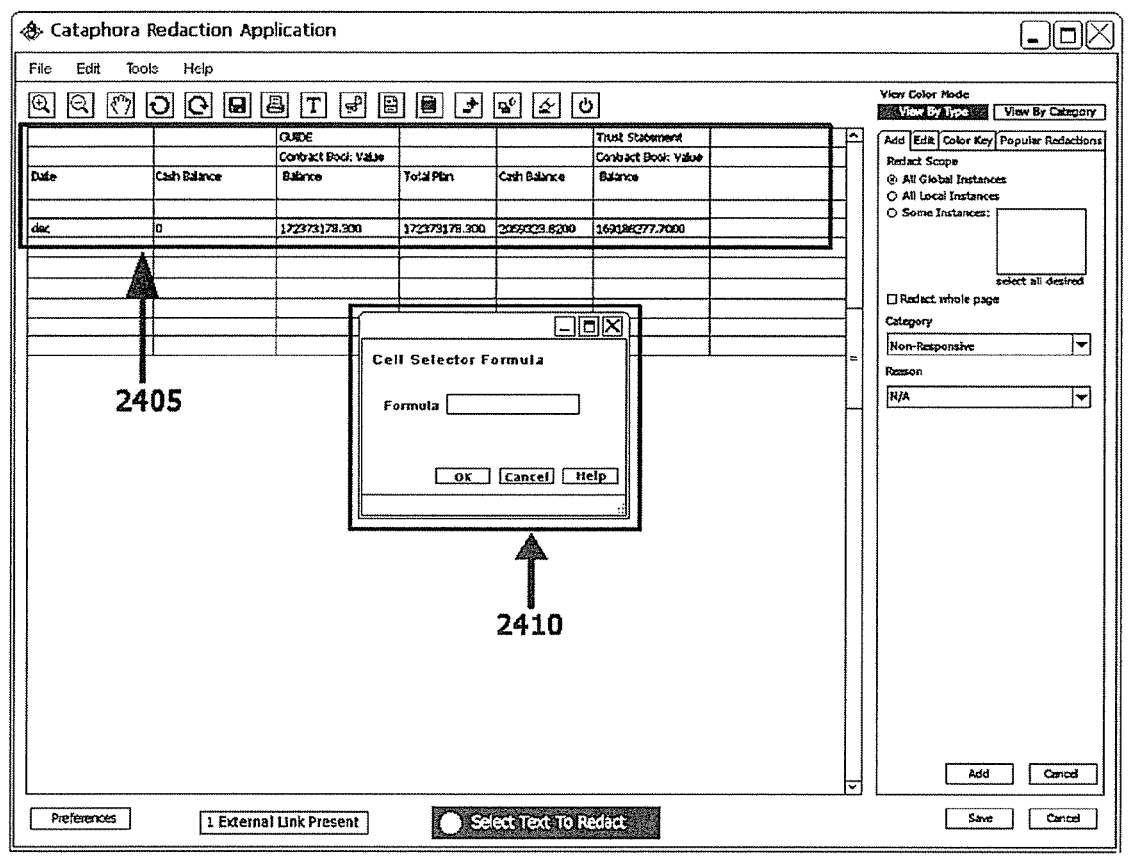
FIG. 24 is a screen shot of one embodiment of a user interface for selecting spreadsheet cells for redaction.

Selection of text for redaction [305] can consist of a subset or the entirety of a single cell's text contents FIG. 24. In one embodiment, a part of a cell's contents may be redacted.

Selection of text [310] for redaction [305] can also consist of a continuous series of cells, where continuity is defined by laying out the two dimensional grid of cells as a one dimensional series of cells, by concatenating row by row, examining the rows left to right and the grid top to bottom [2405]. The first and last cell of a multiple-cell selection may contain a subset of those cell's text contents, as long as the inclusion of the subsets obey the continuity. In one embodiment, the cells to redact may also be specified by properties other than relative location, including but not limited to: cell format or other styling characteristics, worksheet, and controlling formula. To help support this last feature, some embodiments support the automatic highlighting of all cells that are wholly or partially influenced by a currently selected formula [2410]. Note that in one embodiment, formulas are treated as are other types of metadata [2115] and quasi-metadata [2115], which is to say that they may be redacted at any scope [210] desired. Since such a redaction [305] may have unwanted consequences, the system, in one embodiment, indicates such consequences to the user. In one embodiment, the system may require acknowledgement of the consequences prior to accepting the redaction [305].

Spreadsheets created by certain applications, for example MICROSOFT EXCEL, can contain hidden cells, columns, and sheets. The presence of these within a given document [225] is noted by the document intake process [905], and is therefore known by the user interface. In one embodiment the previously hidden data is rendered in a user-configured style differing from the style of the normal spreadsheet rendering so as to alert the user to its meaning.

"Constructed" Text Documents

It is often necessary to extract data from an application that is not end-user in nature. Some common examples of such systems include but are not limited to: HR records systems, expense reporting systems, and database applications that contain customer or product information. Such applications do not inherently have the notion of a "document", as this is an end-user concept. Nevertheless, courts (and others) often demand data from such sources, and some of this data may need to be redacted.

Figure 25:
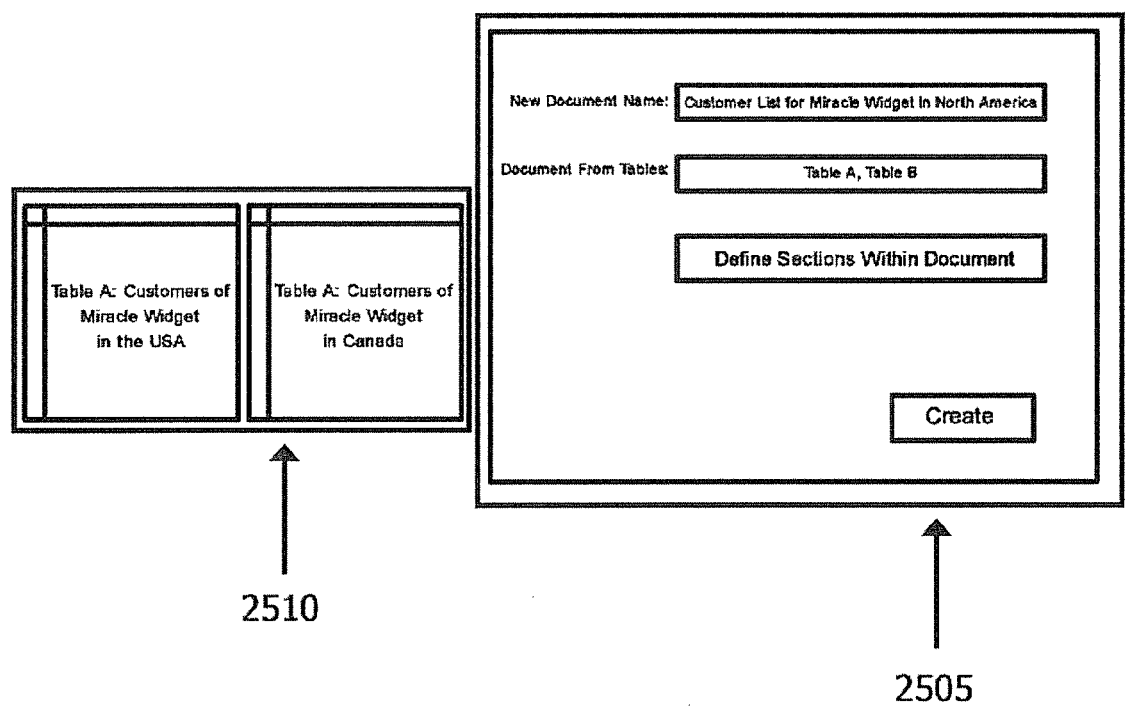
FIG. 25 is a diagram of one embodiment of dealing with constructed documents.

Because the system supports the notion of scoped redactions [210], all scope [210]-related information is determined for such data prior to it being available for redaction [305]. If scope [210] related data cannot be determined, in one embodiment only individually performed redactions [215] are allowed. "Scope-related information" means defining the boundaries of a document, and defining any potential subsections of a document. For example, one can decide that the data extracted from 2 different database tables [2510] should be merged to create a single virtual "document" [2505] but that records with a certain attribute ought to be considered to be in a separate section [860] of this document for purposes of defining redaction [305] scopes as shown in FIG. 25.

Instant Messages and Other No-Boundary Cases

Instant Messages (IM's) represent a different type of situation in which no neat or a priori obvious document boundaries exist. An instant message conversation occurs between a user and a destination party. That destination party consists of one or more users, where most instant messaging programs refer to a conversation with a single user destination party as a 'chat', and a conversation in which the destination party is more than one user as a 'group chat'.

Most client-side instant messaging programs allow the functionality of saving the text of conversations as transcripts. Depending upon the specific instant messaging program, these transcripts of conversations with a specific destination party may consist of one file, or many files separated in whatever way that particular program happens to determine what a session is. Further, such behavior might in some instances be arbitrarily determined by the user, in terms of what he or she chooses to save versus not. Additionally, there are enterprise products which log and archive all instant messages within a corporation. These products likewise may make different file or session boundaries from one another. Since some sessions may be saved—and in inconsistent ways—by more than one system or method, one embodiment of the system will de-duplicate content of this format text block by text block. One example of such de-duplication [2610] is described in the Sociological Data Mining Application.

Figure 26:
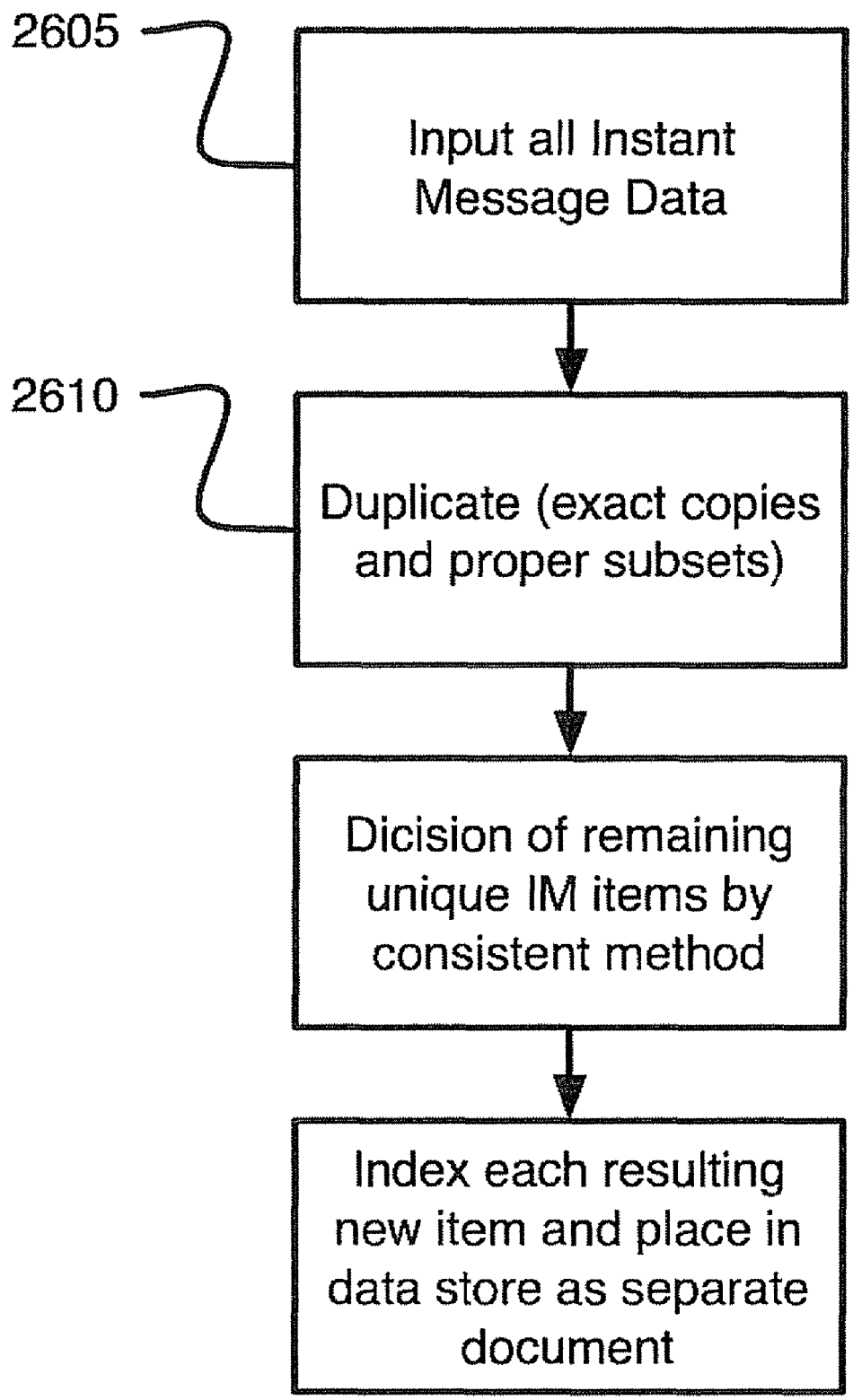
FIG. 26 is a flowchart of one embodiment of determining boundaries in Instant Messages.

In order to deal with external inconsistencies in the treatment of instant messages [2605], in one embodiment all files or records which relate to conversational format data types which lack clear beginning and end boundaries are reprocessed by the sociological processing engine. One embodiment of this reprocessing is described in the Sociological Data Mining Application. In other embodiments, other session splitting techniques may be applied. These include, but are not limited to different types of clustering approaches that could factor in the time stamps between each communication, pragmatic tagging indicators, topic [720] topic drift analysis, division by date boundary, division by user-selection period of "dead time" between subsequent communications, and the addition or dropping off of participants in a group chat session. The system ensures that a consistent approach is taken to determining boundaries so that meaningful and consistent redaction scopes [210] for this kind of data format can be defined as shown in FIG. 26.

Working with Motion Documents

By their nature, motion documents [415] can be thought of as a mapping of some kind of data to a finite length time frame. Most commonly, this time frame is considered to start at a relativized time zero. This commonality between motion document [415] types which is the mapping of data to time allows the control of the presentation of motion documents [415] to be governed by a time transport device, for example the basic "play", "rewind", "fast forward", "pause" and "stop" controls on a VCR. These types of controls provide a user with some way to navigate to a specific instant in time contained within the finite length time frame, and to begin rendering of the data for the user's experience, as well as a way to stop and/or pause that rendering. This shown in FIG. 27.

Figure 27:
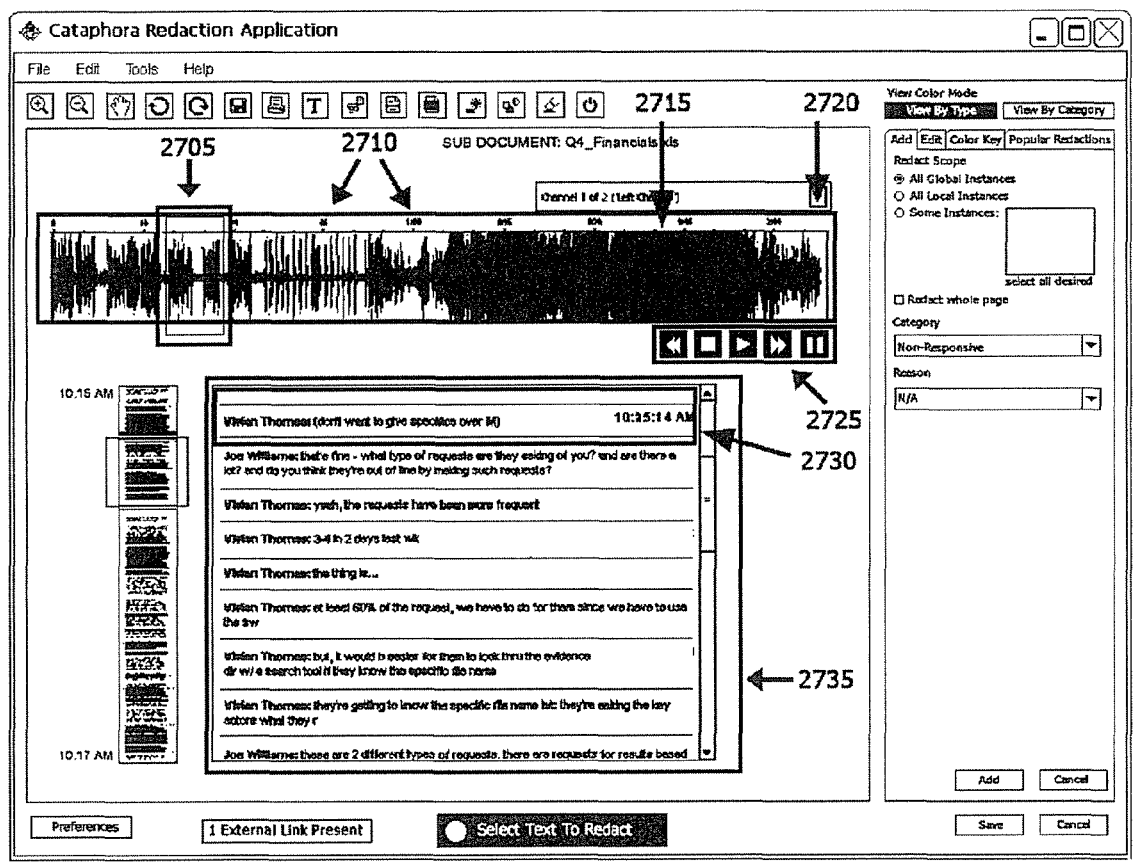
FIG. 27 is a screen shot of one embodiment of user interface for displaying audio content accompanied by speech to text content.

When working with motion documents [415], in one embodiment the user interface presents the user with a timeline view, [2715], FIG. 27. The timeline view [2715] features a linear scale representation of the time frame which the motion document's [415] data spans. For example, if the motion document [415] contains only audio data, the data representation is shown as rendered waveforms; if the motion document [415] contains video and audio data, the data representation shown is a video playback window, similar to what a user of a personal computer would expect to see when playing video files [2720]. In some embodiments, both a view for the rendered waveforms and a video playback window would be provided, utilizing the same x-axis of time.

In one embodiment, where audio content is involved that can be converted from speech to text [2730], the user interface [110] offers a transcript-style view [2735] of the text with selectable or "hot" vertically placed time markers [2710] indicating time span [2715].

In some embodiments, all of the different available views of the data, for example, speech to text transcript, rendered waveform and video, have a model-view-controller (MVC) relationship to one another. So, for example, navigating to a particular point in time in one of these views will cause all of the other views to reset themselves to viewing the selected point in time.

In one embodiment, the timeline view [2720] is the user's main point of interaction to define and select redactions [305]. Further, in one embodiment:

In add mode, the user is able to select regions for redaction [305] by click-dragging across a time span which they wish to redact. The region is considered selected, and the user interface [110] is placed into add-review mode.

In add-review mode: the user may specify any relevant attributes for the new redaction including but not limited to style of redaction.

In edit mode, the user is able to click on a pre-existing redacted [305] region's representation in the timeline view [2720]; once clicked on, that region is considered selected [2705].

When a region is selected, the user is then able to render (often referred to in common language as 'play' with most common motion document [415] types) the data by clicking on the "play" button [2725]; the user may stop rendering by clicking on the "stop" or "pause" button [2725]. In one embodiment, when there is no particular region, nor time marker, selected, the user may start the rendering of the entire motion document from the earliest data point by clicking on the "play" button, and may stop the rendering by clicking on the "stop" or "pause" button.

In one embodiment, the timeline view [2720] has a concept of 'time markers' [2710] which may be selected and positioned by the user to demarcate key intervals of interest. In one embodiment, a starting time marker [2710] represents the place within the data from which rendering would start were the user to click on the "Play" [2725] button with no regions selected.

The user is able to place the starting time marker [2710] anywhere within the document's [225] time frame by dragging it to the desired location. Other time markers [2710] may be used for other purposes, such as highlighting intervals of interest for others users.

Figure 28:
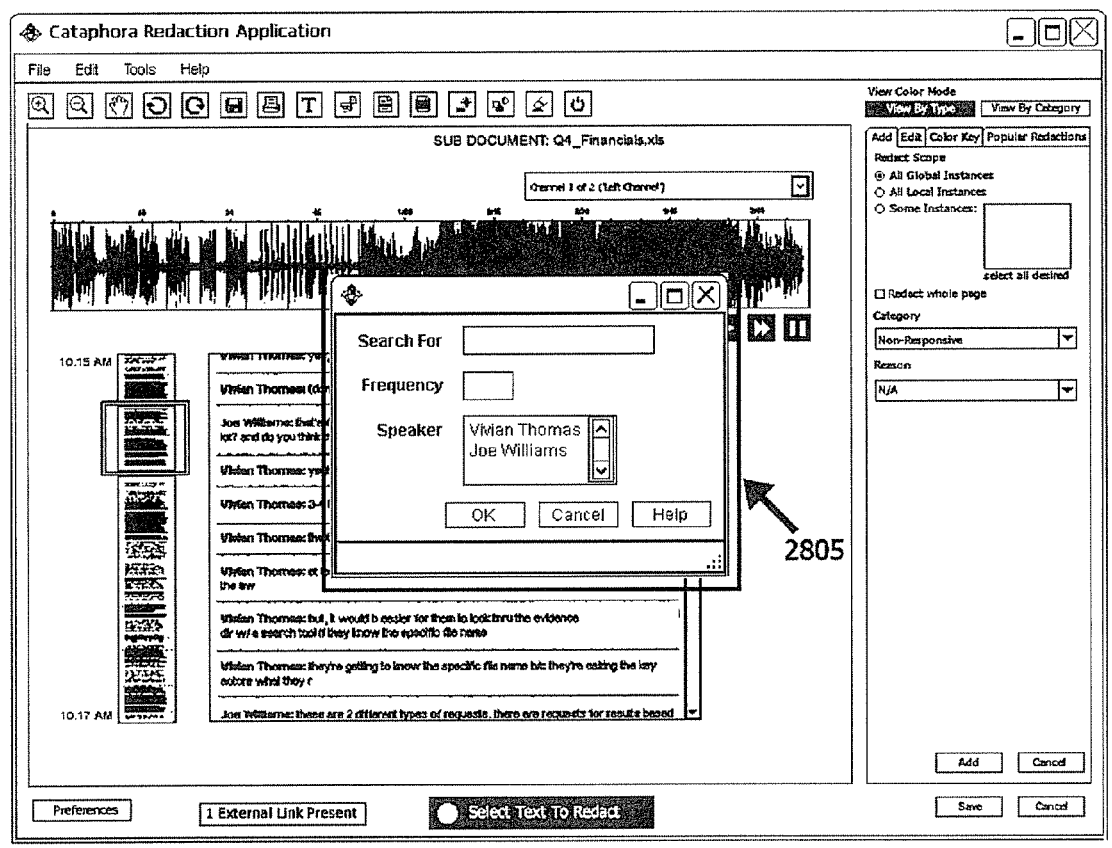
FIG. 28 is a screen shot of one embodiment of user interface for searching in motion documents with speech to text content.

If the motion document [415] has speech content, in one embodiment the system will perform a speech to text transformation and index the results in a manner such that the linkage of the utterances to time is preserved [2730]. Similarly, motion data may be originally inputted to the system with an accompanying speech to text transcription that has been performed by another system. If speech-to-text transformation is performed, the user interface [110] can offer the user the ability to search within the text [2805], as shown in FIG. 28. In one embodiment, the result of the search, should one or more spans be found containing the search items, is the user interface [110] being placed into add-review mode, and some portion(s) of the document [225] rendered as potential redactions [305]. Which portions depend on the embodiment; different embodiments will exhibit different behaviors, including but not limited to: presuming the whole stream/layer should be redacted, presuming that everything from that round of the person speaking that contained the to-be-redacted items should be redacted, and presuming that anything within the same sentence (if sentence boundaries are detectable) should be redacted. In one embodiment, the result of a search is the placement of a time marker [2710] at each location where the search terms are identified. The user then may select a redaction [305].

In the event that it is certain tones or frequencies that should be redacted, some embodiments allow the direct input of which frequencies or tones are to be redacted. In one embodiment, the user can specify a still image, either by selection from within the motion document, or by importing the image from a separate document or stand alone file, and the system will try to match all individual frames within the motion document to the still image for purposes of defining one or more redactions.

Styles of Redaction

There are several supported styles of redaction [2915] on a motion document [415]. The style used on any given matter is chosen by the user. In one embodiment, for document [225] production in litigation, the available redaction [2110] styles may take into consideration the rules in the relevant jurisdiction.

Figure 29:
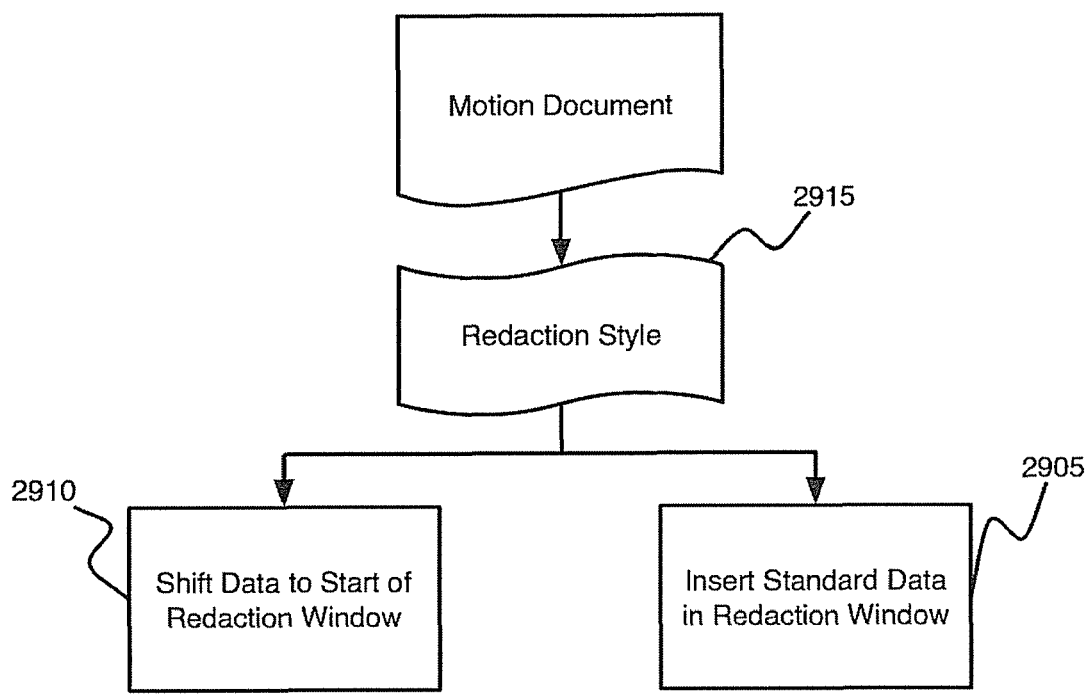
FIG. 29 is a diagram of one embodiment of handling different styles of redaction in motion documents.

Supported styles include FIG. 29, but are not limited to the following.

- Removal of the to-be-redacted data, which results in the data following the redaction [2910] being shifted in time to the beginning of the redacted window.
- Removal of the data, but followed by the insertion of a standardized segment of data for the appropriate length of time, repeating or being truncated as necessary to fill the necessary interval of time. Alternately, the data following the redacted [2905] data may be shifted in time to immediately follow in the inserted segment, if the segment is only to be inserted once—or if it exceeds the length of the redacted interval. The kinds of data appropriate to insert necessarily depends on the motion document [415] type. For example, for an audio document, a specified tone or a voice recording; for an audio-less video document, a held video frame with a rendering of "Content Redacted".
- Replacement of the data, with 'empty data' the data following the redacted data is not shifted in time. What data constitutes 'empty data' depends on the motion document [415] type. Examples would include: for an audio document, empty data would be zero-frequency, zero-amplitude signals (commonly called "silence"); for an audio-less video document, empty data would be data whose rendering result would be video frames featuring only black pixel data.

Motion Documents Containing Multiple Media Assets

Certain types of motion documents [415], for example a two-dimensional video files of the DIVX format, are able to contain one or more video streams, and one or more audio streams. When the system handles a document [225] of this type, the user interface [110] allows the user to select which streams to view and then potentially edit. In one embodiment by default, the user is presented with the streams that are defined to be "standard" for that data type, but is nonetheless alerted to the presence of any other stream data within the document [225].

Similarly, certain types of motion documents [415] contain separate layers. Some examples of this include: many file formats used by the motion picture industry to feature pre-rendered scene layout; audio data containing two audio tracks (commonly called "stereo"); many file formats used in home theaters and found on modern film home releases, for example on DVDs. Further, file formats containing audio channels of unspecified, higher than two, number are used by the recording and radio industries, as well as the motion picture and television industries. These formats are used to contain many audio tracks prior to final mixing down to a delivery format of smaller channel count and potentially including audio and commentary tracks in multiple languages.

In the case where the system is working with a motion document [415] containing more than one layer of data the user is alerted to the presence of multiple layers of data and the user interface [110] allows them to select which layers to edit. In one embodiment, in which a motion document contains multiple audio channels, changing between audio channels changes the presentation of the transcripted text in documents where the transcription is available; the specific content of this channel transcription is document dependent, but examples from present technology include alternate languages to the main audio track, and commentary about the main audio and/or video track(s).

Working with Mixed Type Documents

Figure 30:
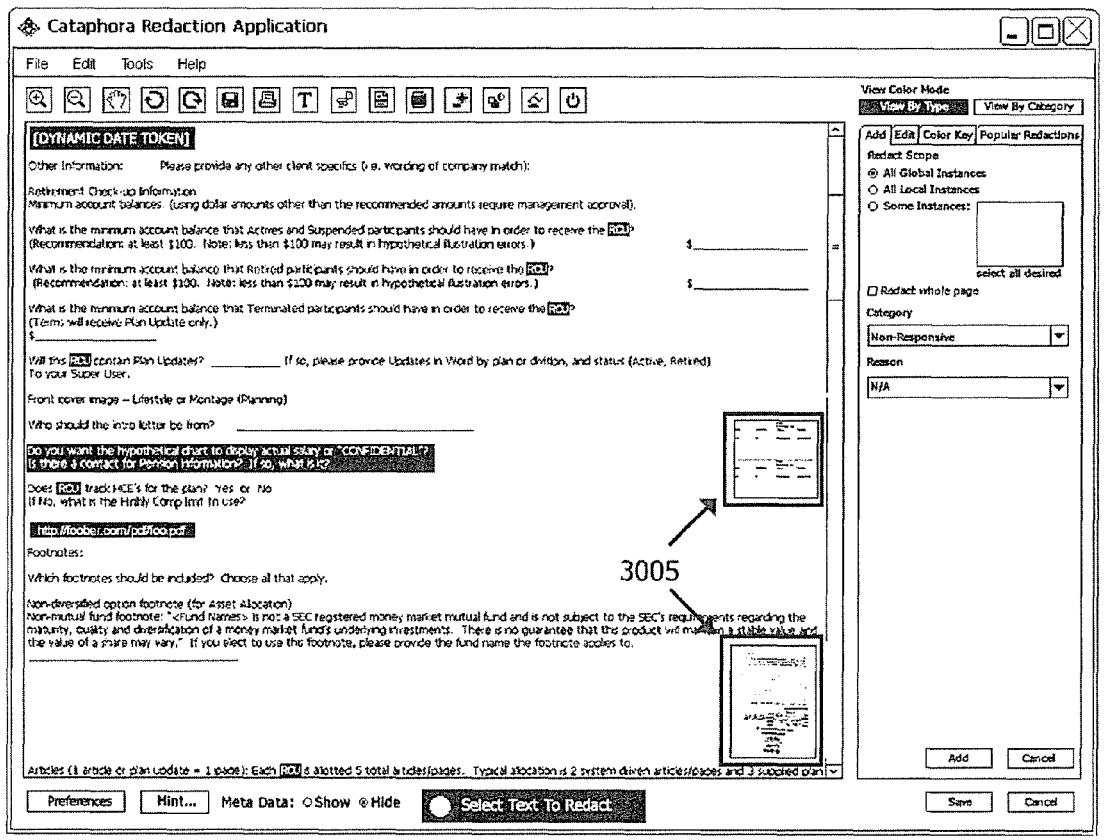
FIG. 30 is a screen shot of one embodiment of different handling of sub-docs in mixed type documents.

When working with a mixed type document [410], the text of the document [225] is displayed along with the custom UI widgets [3005] to represent any embedded or attached sub-documents [430]. An example of a document [225] that has subdocuments is pictured in FIG. 30. Examples of sub-documents [430] include but are not limited to embedded graphic images and attachments referenced by the original document. When the reviewer opens a mixed type document, the main document—the non-archival root document—is rendered first in the main view. Its subdocuments are made visible via buttons as described below.

In one embodiment the custom UI widgets [3005] are rendered to resemble a flat bordered button which contains a thumbnail image of the associated sub-document [430]. If the sub-document [430] is a multi-page attachment, in one embodiment this thumbnail [2010] is of the first page and the number of pages within the document [225] is rendered on the thumbnail [2010]. In one embodiment, mouseovers may display the specific attributes of the subdocument [430].

Figure 31:
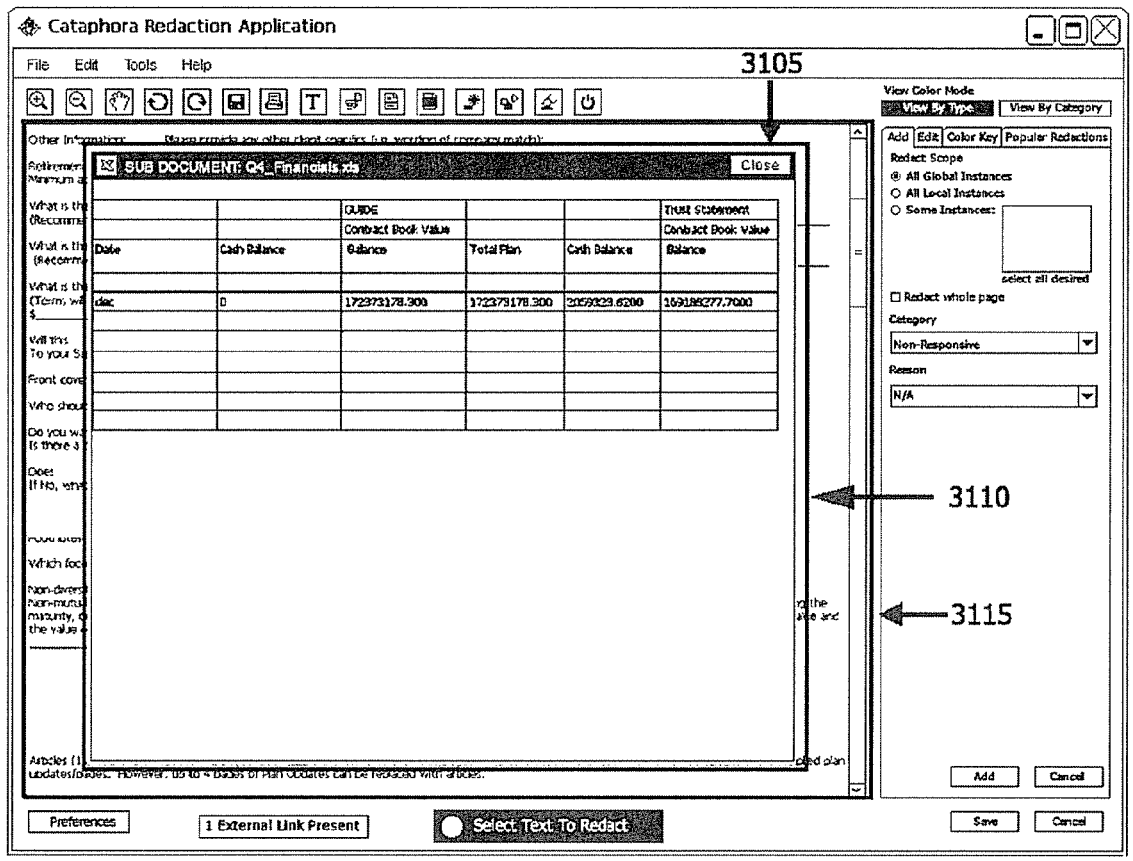
FIG. 31 is a screen shot of one embodiment of a user interface that supports switching from a main view to a view that supports an associated sub-document view.
Figure 32:
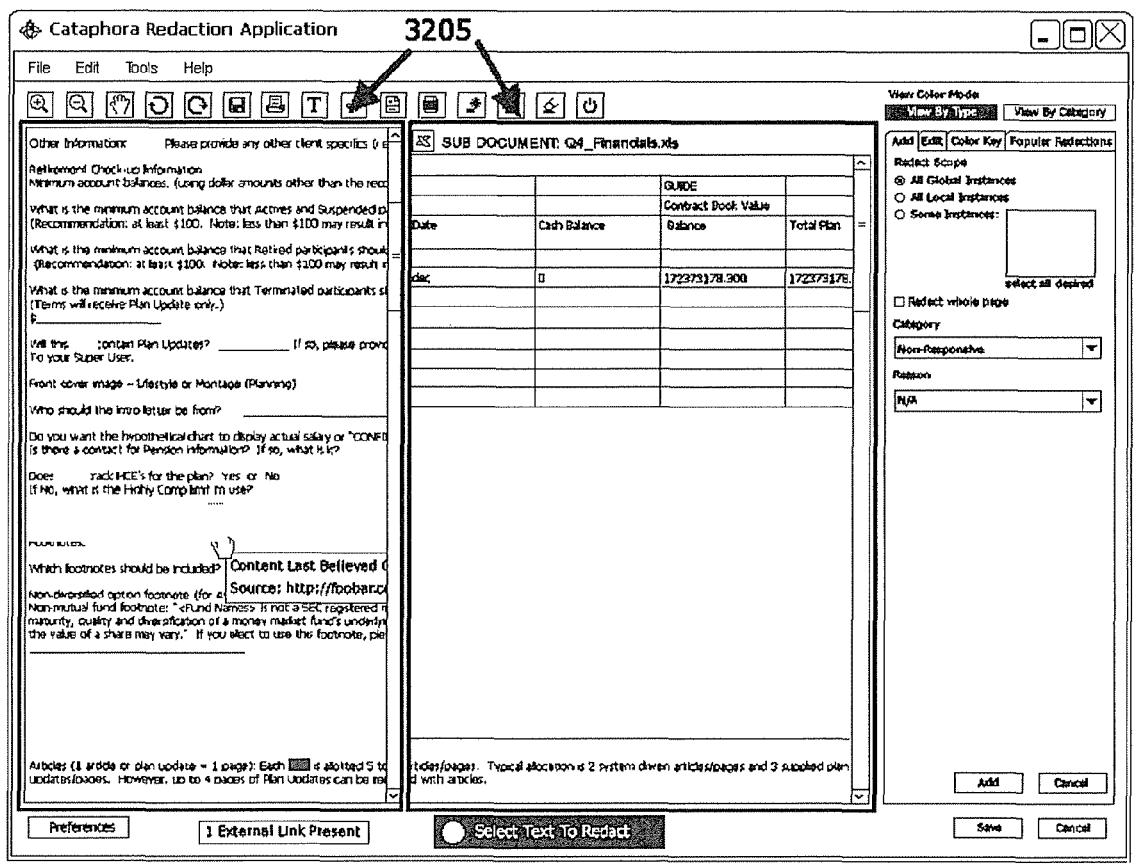
FIG. 32 is a screen shot of one embodiment of a user interface that supports simultaneously viewing some portion of the original main view while viewing the sub-document.
Figure 33:
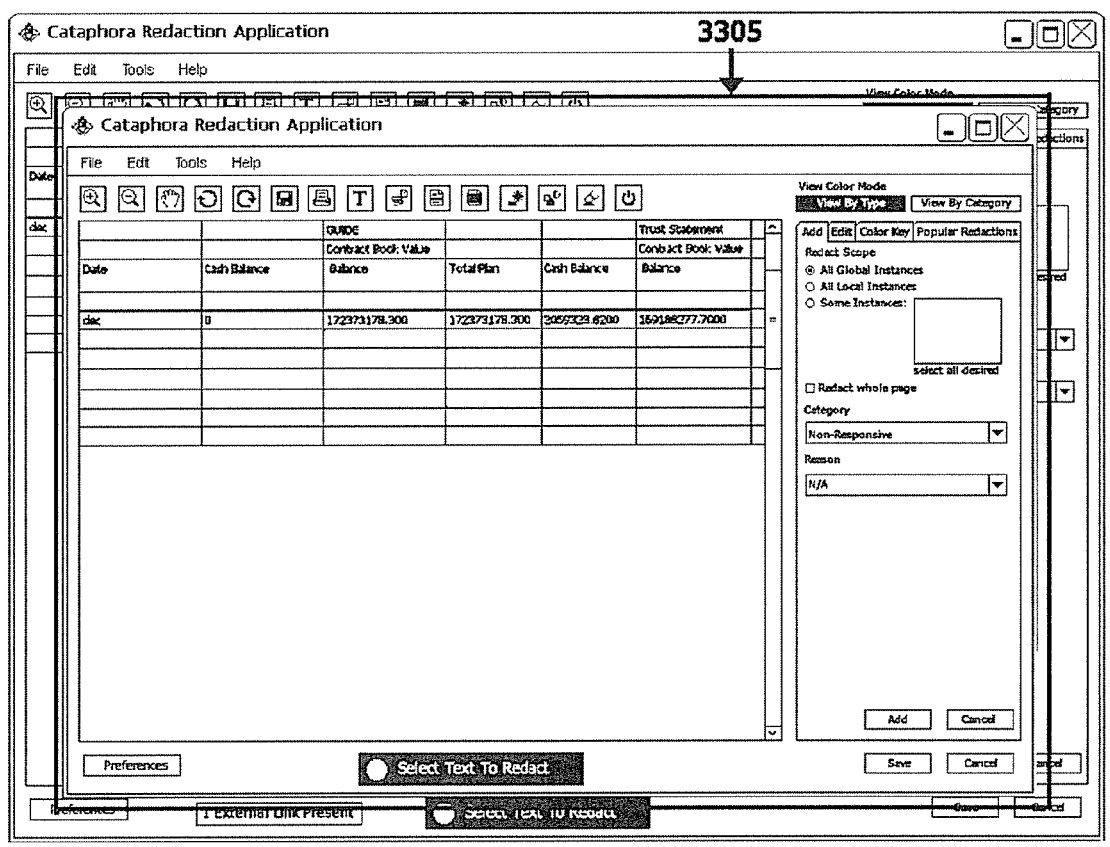
FIG. 33 is a screen shot of one embodiment of a user interface for a view of a sub-document.

In one embodiment, the action of the custom UI widgets [3005] is to switch [3105] the main view [2030] to the view that supports the associated sub-document's [430] document type, as shown in FIG. 31. In one embodiment, a translucent view [3115] of the document containing sub-document is present to the user [3110]. These views contain an additional button, the action of which is to switch back to the original main view. However, in one embodiment, a control is provided which tiles the main viewing area [2030] in order to simultaneously view at least some portion of the original main view [2030], while viewing the sub-document [430] as shown in FIG. 32. In one embodiment, the system may create as many tiles [3205] as necessary to view the requested number of sub-documents [430], and main document, simultaneously, [3205]. In still other embodiments, clicking on one of these buttons will spawn a new window in order to display the correct type of view for the sub-document, FIG. 33, [3305].

The views for sub-documents [430] are virtually identical to the afore-described displays for text and image documents [425]; in one embodiment the two differences are the 'return to original view' button, and the fact that in one embodiment the panel background is rendered as slightly translucent allowing the original document [225] view to be seen underneath the sub-document [3305] view.

Working with Dynamic Content in Text Documents and Mixed Type Documents

Figure 34:
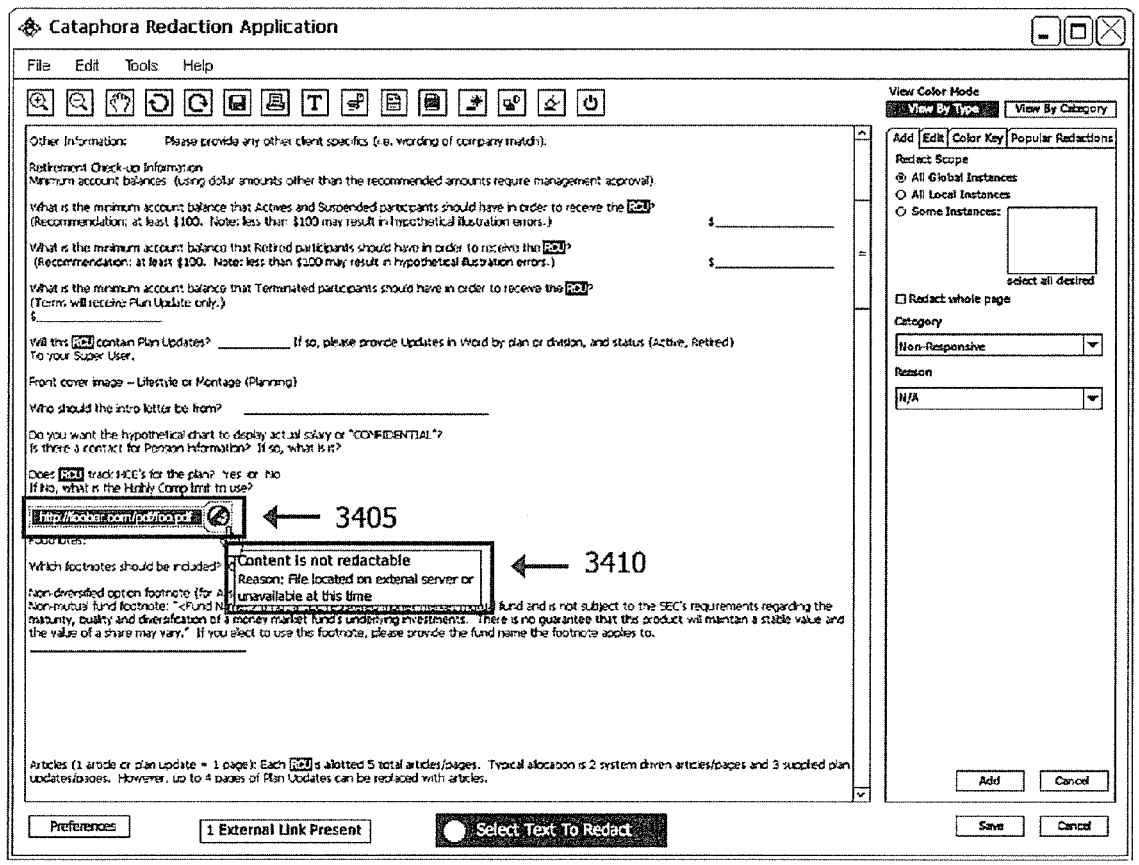
FIG. 34 is a screen shot of one embodiment of a user interface for a visual indication of unredactable content.

In one embodiment, a document [225] which has one or more documents [225] linked externally results in the user interface [110] displaying the document [225] as a mixed type document [410] as shown in FIG. 34. This is due to the fact that the subdocument [430] may have different properties than the parent document [875], even if it is of the same data format. For example, should the external document [1105] not be in the corpus, the subview containing the external document [1105] will not allow redactions [305]. In one embodiment, this fact will be visually indicated by methods including but not limited to: slightly graying out, [3405] that content or its frame, putting an advisory warning message at the top [3410], and/or other indicators.

A document [225] that has dynamic text and which has not been frozen on intake, in one embodiment, features highlighting or some other indicator for any content that is dynamic. The user clicking on this rendering is presented with a panel on which they are able to view and redact the underlying dynamic variable markup.

Assisted Searching in Text Documents and Text Sections of Mixed Type Documents

Figure 35:
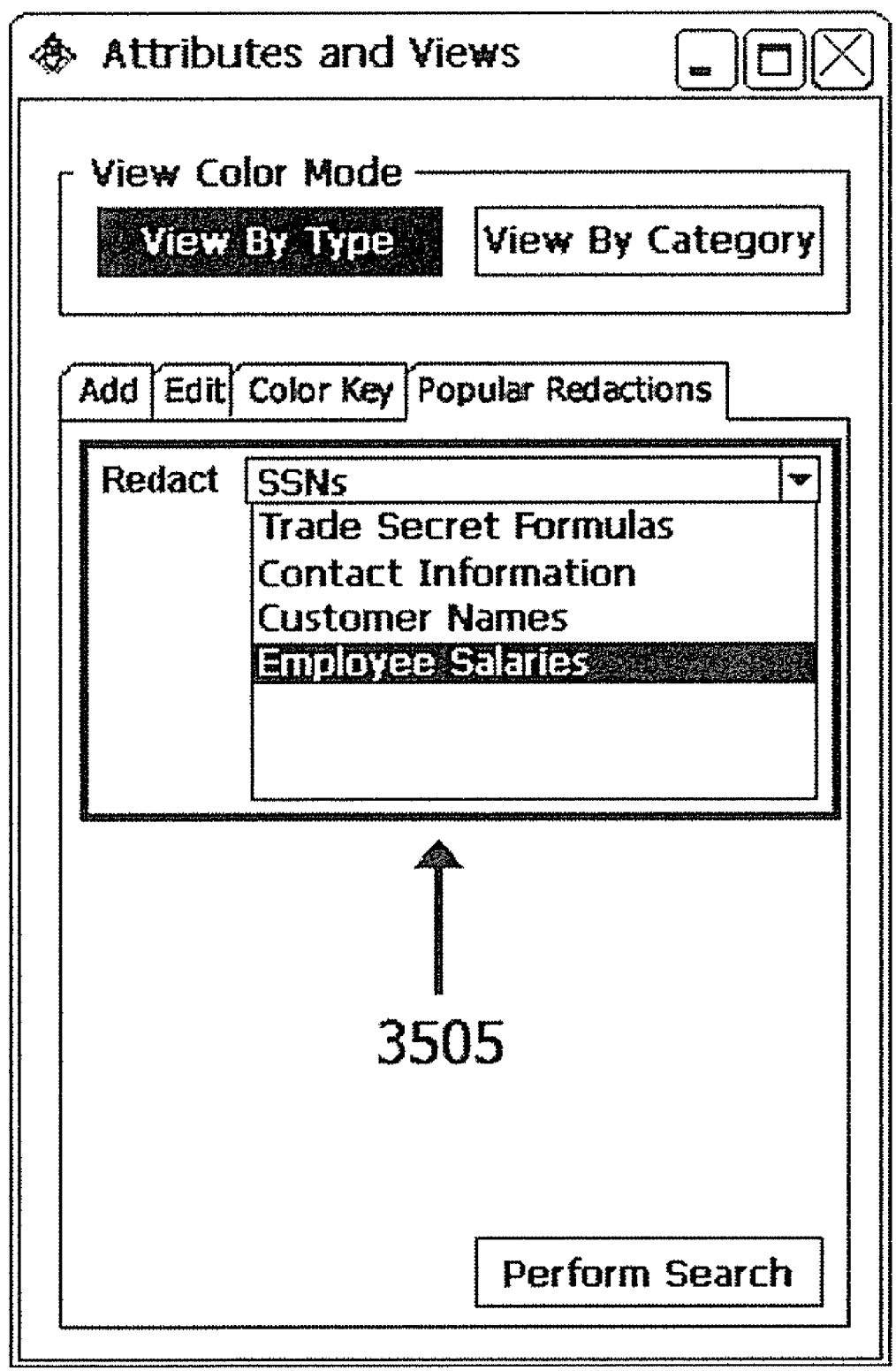
FIG. 35 is a screen shot of one embodiment of a user interface for a sub-panel which offers pre-defined text searches.

In one embodiment a sub-panel is available which offers pre-defined text searches [3505] to the user as shown in FIG. 35. In one embodiment, these searches are based on regular expressions, but are presented to the user with a simple and descriptive name. For example, a pre-defined search may be "Redact all SSNs", which is a very common application due to Health Insurance Portability and Accountability Act (HIPAA) issues. In one embodiment, such pre-defined searches may be user-defined. In one embodiment, these searches may be dynamically loaded with each launch of the system.

A search panel, as shown in FIG. 35, is available to search the present document (and if so configured, concurrently its children or subdocuments) for a particular text run or other specification to redact. In one embodiment this search panel is able to support regular expressions directly for advanced users who wish to avail themselves of this functionality. The system will select all matching text runs in the document and place the user interface [110] into add-review mode. Should the application not be configured to allow overlapping text redactions [2205], the matching process will only select text runs that do not overlap with, nor are contained by, pre-existing redactions [305]. In one embodiment, the user is informed of such pre-existing redactions [305], if the user is authorized to see them. In one embodiment, an appropriate report on redactions [305] that were disallowed for this reason are automatically generated and sent to the appropriate pre-configured user(s), typically an administrative user.

Due to the use of ontologies and other categorization mechanisms, in one embodiment the system is able to provide the user with a set of suggested items for redaction [305] that have not yet been redacted (and have not been overridden, or had redactions [305] disallowed on them.) One embodiment of the ontology and categorization mechanism that makes this possible is described in the Sociological Data Mining Application.

The mechanism used is configuration-dependent, and varies with the type of underlying mechanism being relied upon. For example, if there is a simple ontology of names that all belong in the same category, the user can reasonably ask the system to make an inference that if other users have proposed at least 2 of the names in this list for redaction [305], all names on the list should likewise be proposed for redaction [305]— or simply redacted. If the latter, in one embodiment, an administrator reviews the proposed redactions [305] before approving or rejecting them; rejected redactions [305] will not be executed.

Editing and Deleting Redactions

Figure 36:
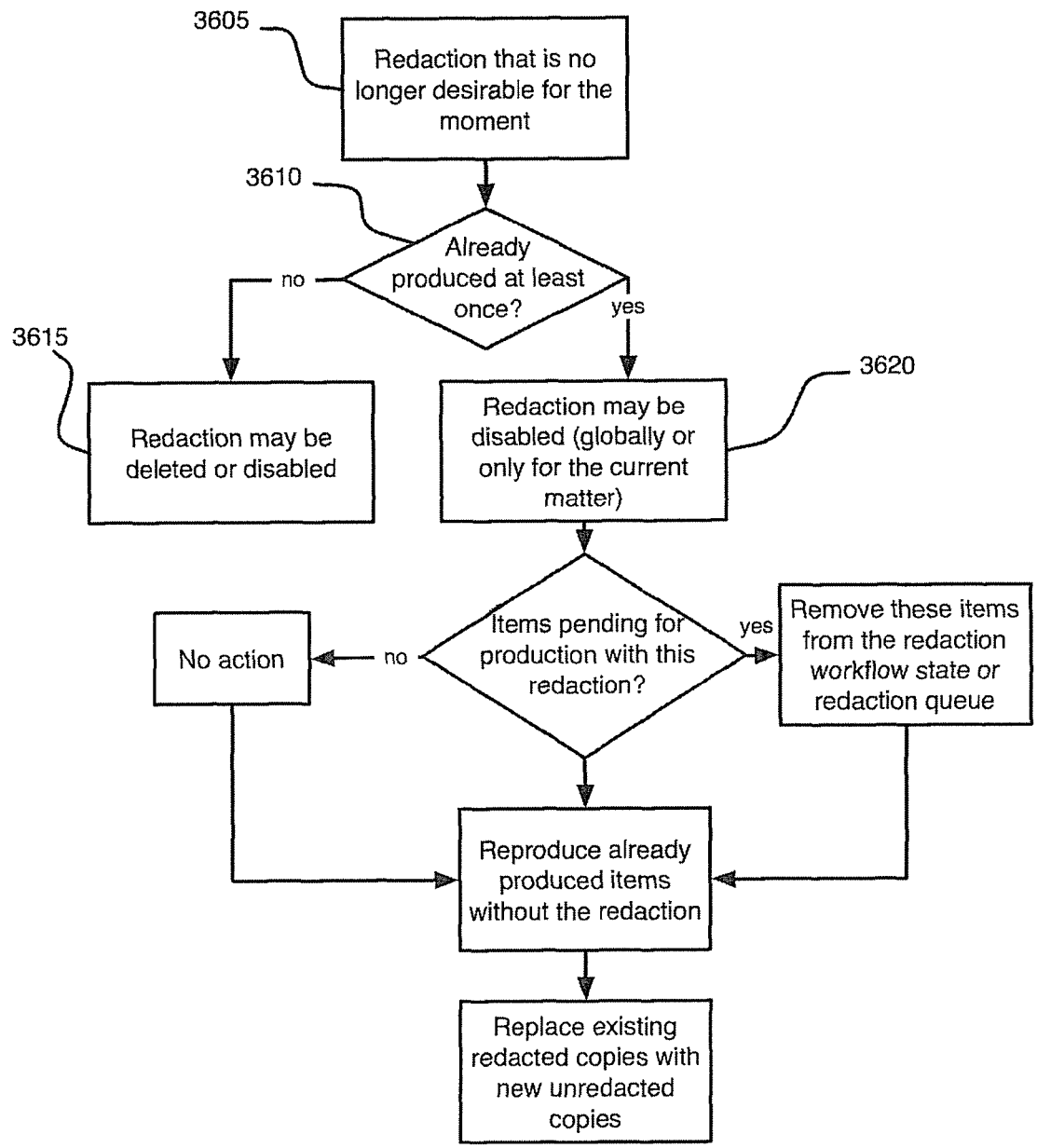
FIG. 36 is a flowchart of one embodiment of handling disabled redactions.

In one embodiment, if a redaction [305] has already been produced at least once, the user will not be able to delete the redaction [3615] as shown in FIG. 36. This is true at both the specification [205] and the instance level—this last, since it is quite possible that multiple copies of the same document [225] will be produced for the same matter [220]. However, if the user wishes, in one embodiment, the redaction [305] may be disabled.

If a user does not have the permission(s) needed to be allowed to modify the redaction [305], the user will not be able to edit the redaction [305].

Redaction Scope of Subdocuments [430]

It is increasingly common that documents in a corpus have subdocuments [430]. Examples of subdocuments [430] include but are not limited to the following: with email documents, these subdocuments [430] are usually attachments to the email; with presentation documents, these subdocuments [430] generally are embedded graphics, or external referenced documents; with text documents [420], these subdocuments [430] are usually embedded data from other applications such as drawing applications or spreadsheet applications.

With documents [225] such as these, it is largely a matter of preference as to how a local or "this document only" redaction [305] is applied to the subdocuments [430] of a document on which the local redaction [305] is defined. Therefore, most embodiments allow the user to specify the desired default behavior for different broad categories of applications. For example, email programs, or word processing ones as well for specific applications such as MICROSOFT OUTLOOK. The more detailed specification will override the more general one in case of a conflict. In one embodiment, individual users may be able to determine their preferences. In another embodiment, an administrative user sets it globally.

User Interface—Administrator

It can be expected in most instances that there will be one or more users of the system who are designated as being administrators. These special users will be responsible for monitoring and correcting the actions of other users, and more powerful actions including but not limited to the performance of global redactions [305] definition of valid redaction scopes [210] for a matter, redaction migrations [3905] between matters, and assigning user permissions may optionally be reserved only for them.

For these reasons, it is very important for such users to have a good overview of the redactions [305] that are pending as well as those that have already been executed.

In one embodiment, the administrative user interface [110] offers the user the ability to search for redactions [305] based on any attribute including but not limited to a) of the user who created the redaction [305], b) the documents that the redaction [305] is associated with, and c) of the redaction [305] itself.

Defining Redaction Scope

One of the most important administrator responsibilities is defining the redaction scopes [210] that will be made available to the users and determining which users may avail themselves of which scopes [210]. An administrator may decide to permit only single instance redactions [215]. This means that each instance of a redaction [215] must be performed manually by the user. An administrator may individually allow, or disallow, any of the standard or generic redaction scopes [210]. These include, but are not limited to: whole available corpus, all documents [225] of a specific type, all documents [225] relating to particular custodian(s) or actor(s), all items in the same discussion [715], all items in related discussions [715], all items that are determined to be of the same category by means of whatever categorization method(s) are in use as described in the Sociological Data Mining Application. Additionally, arbitrarily complex scopes [210] may be defined by the administrator. This may be done by combining some of the above types of specification, as well as other methods, including but not limited to: using the system query language to query for documents [225] that will be defined to be of that scope [210], or directly inputting a list of documents. [225]

It is also important to note that some redaction scopes [210] may be defined to only impact one or more sections [860] of a document [225]. This is especially useful when working with very long documents [225] that are broken up into different clearly designated sections [860]. For this purpose, a section [860] can be anything that is either extractable from the document format, or which can be programmatically defined, including the decomposition of the mixed type documents [410] into different contiguous sections [860] so as to have each section [860] contain only homogeneous content, for example image-only. Note that such within-document scopes may be defined to apply only to the current document, or also to all other documents [225] for which this scope [210] definition exists.

In one embodiment, the administrators have the ability to reserve the use of certain redaction scopes [210] for only certain trusted users or groups of users. The administrator may also determine that redactions of certain scopes [210] require human approval prior to execution. This can be done either as a static attribute of the scope [210] definition itself, or on a global basis; for example, if any of the instances of redactions [215] that are associated with a particular scope [210] impact any documents [225] with properties as specified by the administrator, then either just these particular documents [225], or all redaction instances [215] associated with this scope [210] will similarly require human approval. In this event, a special stage of workflow is implemented for this purpose as described in the Sociological Data Mining Application. Note that administrators could also apply the same requirement to individual or manually performed redactions [305] if they chose to do so.

In one embodiment, the administrator may decide that all redaction instances [215] of a specific redaction scope [210] should be displayed as completely opaque, or in such a fashion as to not allow certain users to see the underlying text. This may be desirable to protect potentially highly sensitive data such as trade secrets from the eyes of untrusted users. In this mode, in some embodiments, users without the appropriate permissions will be able to see no information about the redaction [215] whatsoever. In some embodiments, the redaction instance [215] simply does not appear at all for untrusted users, since selecting content for redaction calls extra attention to it as being potentially important.

Mixed Production States of Redactions

It is very often the case that there is more than one production run during the lifespan of a matter. This can easily create the situation where, for a given supra-document redaction definition [205], some documents which have been affected by the redaction [305] have been produced, while other documents [225] which have not been affected by the same redaction [305] definition have not yet been produced. In addition, there are some circumstances in which more than one copy of the same document [225] is produced for the same matter [220], as well for different matters [220] that might share a full or partial set of redaction [305] instructions.

The user interface [110] offers the administrative user the ability to review all mixed production state redactions [305] (that is, redactions which have already been produced at least once.) From this review mode, the user may specify that the redaction [305] be disabled, which is to say disallowed for one or more of the remaining, not yet produced, documents [225]—or optionally for any copies of already produced documents [225] that might have to be produced again, for example because a complete set of data must now additionally be produced for a new custodian. In one embodiment, when new data is added to the system, a report is automatically generated about the impact of existing supra-document redactions [615] on this new data, presuming that such redactions [305] have been defined.

Viewing the History of Redactions Across the Corpus

Figure 37:
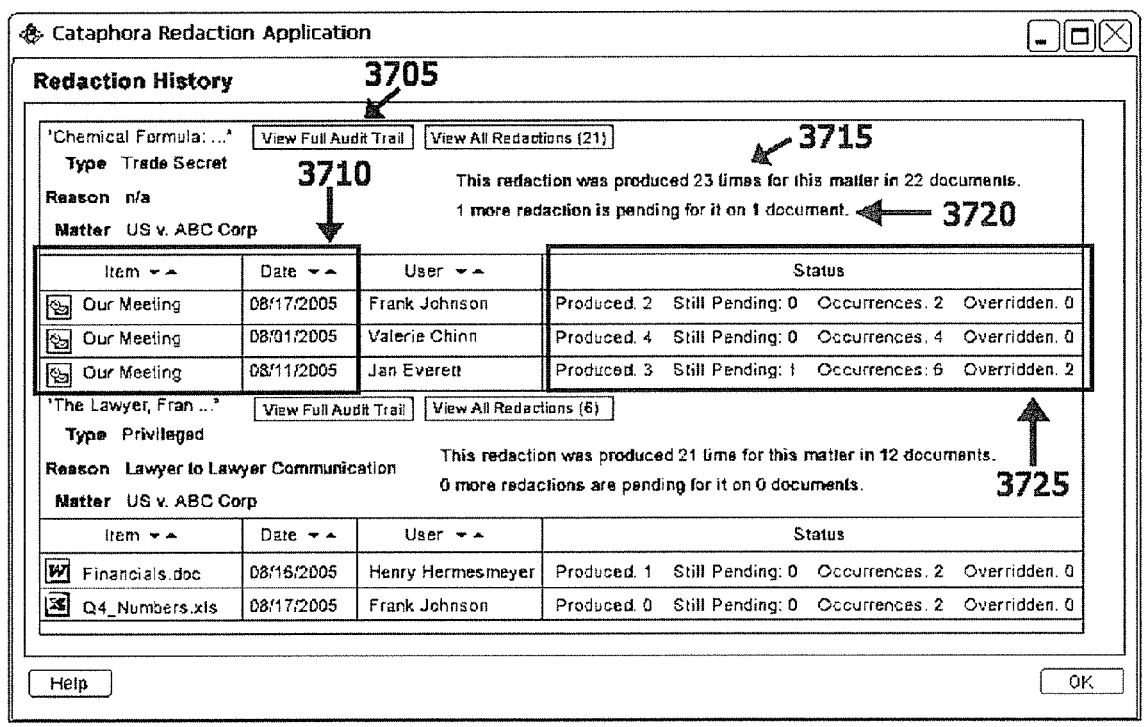
FIG. 37 is a screen shot of one embodiment of a user interface for viewing the history of redactions across a corpus.

The user interface [110] provides the user with a display of the history of each redaction [305] which may be configured to include some or all of the available attributes of a redaction [305] as shown in FIG. 37. This view allows the user to see an audit trail, [3705] for each redaction [305], which consists of a list of sequential actions taken that involve the particular redaction [305], either at the abstract [205] specification or individual instance [630] level.

If a given redaction [305] is of the local document (or lesser) scope [210], the user is presented with information as to whether the associated document has been produced [3725], and if so how many times, for which matters [220], as well as whether the document [225] is scheduled to be produced again. In one embodiment, additional information may be included.

If a given redaction [305] is of any scope [210] greater than 'local' the user is presented with information concerning all documents [225] which have been affected by this redaction [3710], and what their current workflow state(s) are [3715], [3720], including whether or not they have been produced [3725]. (Note that in one embodiment a document may only be in one workflow state, but once in the state of "producible" may be produced as many times as is necessary to meet subpoena or other obligations.) as described in the Sociological Data Mining Application.

If a given redaction [305] is of any scope [210] greater than 'local' the user is presented with information concerning which of the affected documents [225] had the redaction [305] individually overridden on them by the user; that is, the user is presented with information about the action (time, date, and user) which resulted in a global redaction [305] being disabled for a specific document [225]. Analogous information is presented in the case where the document [225] has been produced without the redaction [305] because the redaction [305] has been disabled.

Assisting the Migration of Redactions Between Matters

Figure 38:
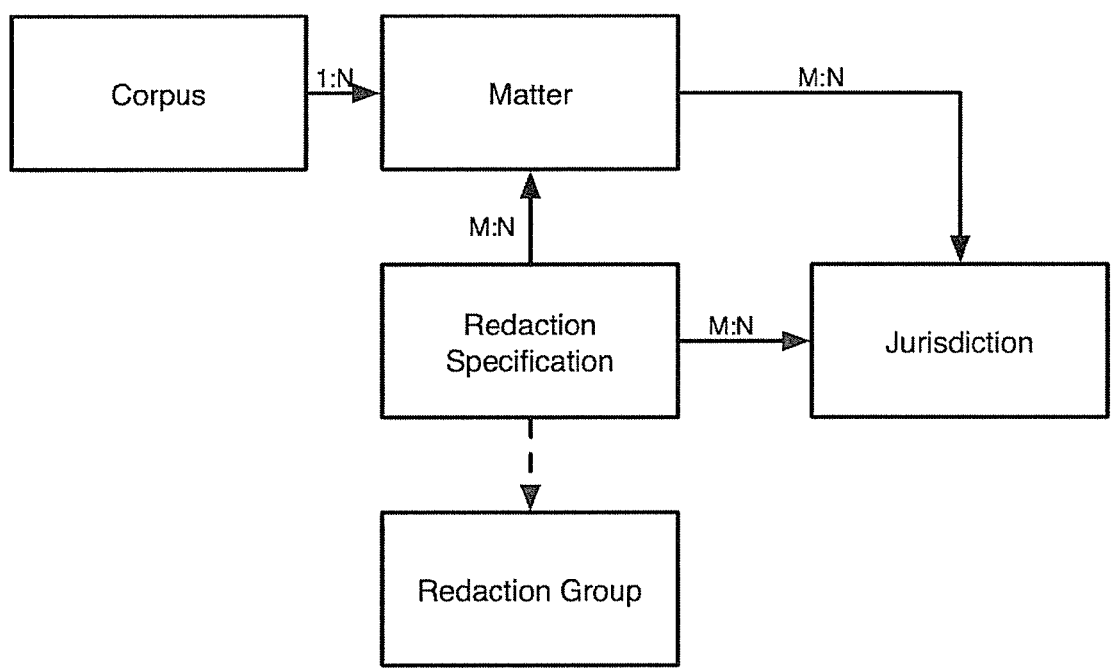
FIG. 38 is a diagram of one embodiment of handling migration of redactions between matters.

It is often the case that a corpus is relevant to more than one matter [220]. It is also often the case that the jurisdiction for one matter [220] is not the same as a second matter [220] and, further, that the governing jurisdictions often have differing rules concerning what are admissible redaction categories [510] and reasons [505] as shown in FIG. 38.

For this reason, the system supports the notion of jurisdiction-specific rules that may be reused again and again. In some embodiments, when the user enters a new matter into the system, she must specify a jurisdiction for it. In one embodiment, the appropriate jurisdiction-specific rules are automatically associated with the new matter.

When a user has more than one related matter [220] to deal with, and wishes to perform a full or partial migration [3905] of redactions [305] from one matter to the next, for the purposes of this application we will refer to the corpus for the matter [220] from which the redactions [305] are being migrated as the 'originating corpus', and the corpus for the matter [220] to which the redactions [305] are being migrated as the 'destination corpus'. (Note that since the exact same corpus can be needed even for two largely unrelated matters [220], the originating and destination corpus may be one and the same. Similarly, there may be multiple destination corpora.)

Figure 39:
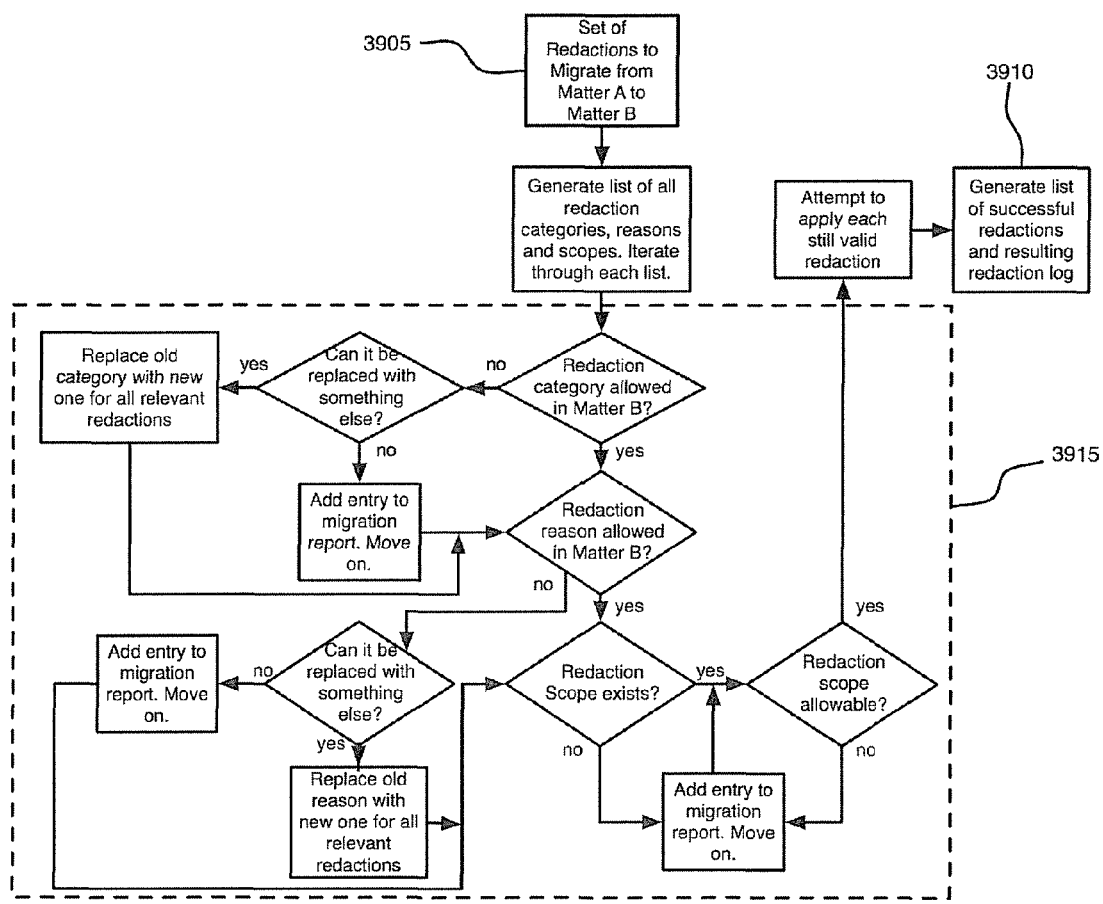
FIG. 39 is a flowchart of one embodiment of redaction migration rules.

The system is able to facilitate the migration [3905] of the redactions [305] from the originating corpus to the destination corpus by obeying a rule set [3915] as shown in FIG. 39. In some embodiments, the system is able to facilitate the migration [3905] of the redaction groups [3825] from the originating corpus. This rule set may in fact be a combination of numerous rule sets, for example one to do with the specific jurisdiction, and another to deal with the specific requirements of a particular matter [220], and so on. In the event of a conflict between these rule sets, the administrator(s) are notified of the issue when they try to merge the rule sets [3915]. (In one embodiment, the user can also explicitly request a conflict check.) In addition, redundant redaction specifications [205] will be automatically identified. These include but are not limited to redaction specifications [205] that were independently created for different matters [220], but which are logically identical to one another, or the case in which one specifies a logical subset of the other. Similarly, completely redundant definitions of redaction scope [210] will be detected, and the administrator will be asked to select the one to keep. This is important, since over time, the number of redaction-related specifications [205] defined in the system can become quite sizable. (Note that these same functionalities exist and may be utilized outside the context of migration [3905], however this use case adds enough complexity that these tools are likely to be of greater use.)

The rule set [3915] is defined by the user, and in one embodiment may be dynamically loaded. In one embodiment, the rule set itself is written in a scripting language, while in others canned templates for the rules are available in the user interface [110]; in still others, the rules may be expressible in natural language terms, for example "replace redaction category X with redaction category Y.

In one embodiment, redactions [305] which cannot be migrated at all because the rule set does not allow it, (for example because a redaction reason [505] which was allowed in the first matter is not allowed with the second matter) are flagged in a report and the user overseeing the migration [3905] is given the opportunity to make any modifications to either the rule set [3915] or the redaction [305] that they feel are appropriate.

In one embodiment, the system can be configured to alert specific users to all redactions from the originating corpus before they are applied to the destination corpus. Similarly, "what if" reports can be run to determine the effects of migrating a particular set of redactions [305]. In this fashion, the "receiving" administrator can individually approve or reject each redaction [305]. If the scope [210] associated with a supra-document redaction [305] in the originating corpus does not exist in the destination corpus, the user is alerted and no migration [3905] of such redactions [305] is allowed. In one embodiment, a report is available that flags any significant changes in the relative or absolute proportion of different redactions [305] by a large number of different possible attributes, including but not limited to: reason [515], category [510], document [225] type, document [225] content type, and actor [520].

Supra-Document Redaction Impact Modeling

Figure 40:
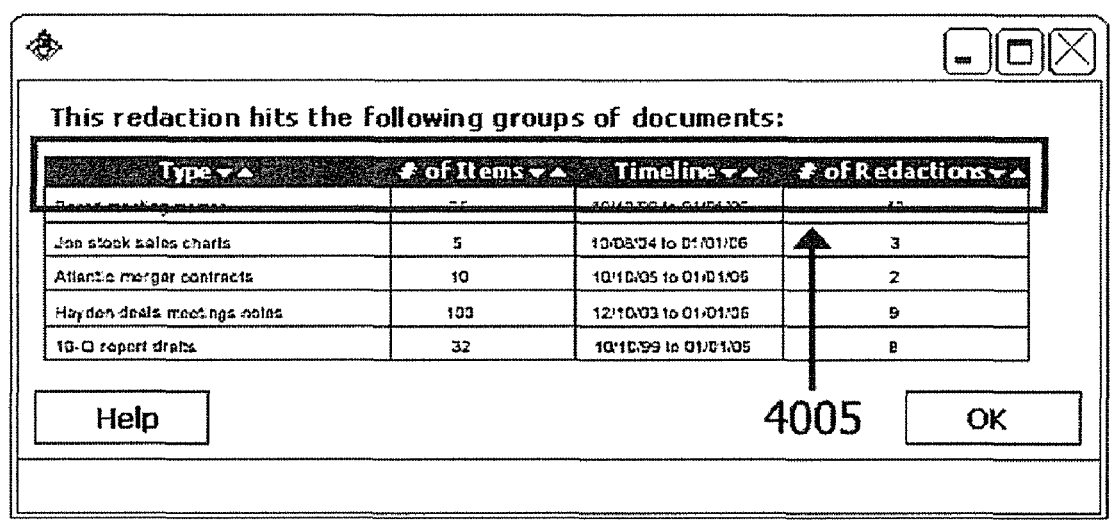
FIG. 40 is a screen shot of one embodiment of a report on documents affected by a hypothetical redaction.

It is often the case that users will want to pose a 'what if' or hypothetical question to the extent of what impact a supra-document redaction [850] will have on the corpus—for example how many documents [225] would be impacted, and how many of those documents [225] have already been produced as shown in FIG. 40.

The system provides the user with a user interface [110] which allows the hypothetical application of one or more supra-document redactions [305] on a selected corpus. After posing the query, the user is presented with a list of all documents [225] impacted by the hypothetical redaction [305]. In one embodiment, this list can be grouped and sorted by key attributes in order to help the user quickly get an idea of not just the number but also the kind of documents [225] affected, and the number of redactions [305] per document [225]. These may include, but are not limited to: actors involved, topics [720] contained in the document [225], and document type as shown in FIG. 40, block [4005]. In the event that the specification was an expression of some type, for example, a wildcard, the different actual text spans that were redacted as a result of the redaction [305] within the particular document [225].

Each document [225] listing displays information including but not limited to: whether that document [225] has been produced or not, how many times if it has been produced, and for which matters [220], or, if it is currently scheduled to be produced, when the planned date(s) and time(s) of production are. Additionally, other non-production-related attributes of the document [225] may be listed, including but not limited to: actors involved, topics [720] contained in the document [225], languages contained in the document [225], and document type [405].

Each document [225] listing displays the number of instances [215] of the redacted text span or other object within that document [225], and, depending on configuration, this may include their child documents [625].

In one embodiment, each document [225] listing features a UI widget [3005] whose action launches a viewer for that document [225], in order to facilitate the actual viewing of it In one embodiment, each document [225] listing features a UI widget [3005] whose action globally allows or disallows the application of the supra-document redaction [850] on that document [225].

Redaction Log

While in one embodiment the system can generate a traditional style redaction log in which there is no notion of anything other than individually executed redactions, there are also advantages to having a redaction log that does capture and illustrate information about supra-document scope redactions [615].

In one embodiment, the "internal" redaction log [3910] is divided into two sections: one for individually performed redactions [305], and one which covers all redactions [305] of broader scope [210]. For each of the latter, all instances of redactions [305] are presented underneath the basic description of the redaction [305] (what exactly appears here may be configured by the user,) grouped by document [225],—in the event that there is more than one redaction instance [215] within the same document [225]. Further sorting, for example, by custodian, or by whether the redaction [305] is enabled or disabled is user-configurable. In one embodiment, there is a production count displayed for both the redaction specification [205] and for each individual redaction instance [215]; in addition, the background color of the display can be used to indicate the primary distinction of whether or not the redaction [305] has been produced at least once.

Redaction specifications [205] which have been disabled will still appear with their associated redaction instances [215] (if any), but can be filtered from the display by the user, and if displayed, the disabled status will be clearly visually indicated through being grayed out, displayed in red, or via some other means. Deleted redactions [3615] may be treated likewise in one embodiment.

In one embodiment, instances in which the individual redaction instance [215] was either disallowed or overridden still appear, but may be filtered out of the display by the user. If they do appear, in one embodiment their status is indicated by either being grayed out, or portrayed in red, however other embodiments may handle this differently.

In one embodiment, the administrator can manage redactions [305] directly from the redaction log window [4005] as shown in FIG. 40. In many of these embodiments, clicking on a redaction instance [215] (or the header area allocated for the redaction specification [205]) will bring up a panel that allows all available actions to be performed on the redaction [305], including but not limited to: deletion, undeletion, disabling, enabling, or changing some attribute of it. In one embodiment there is a printer-friendly version available via button click that will print only the content and not the controls.

In addition, reports are available in one embodiment which provide a breakdown and comparison of redaction [305] statistics between the single redactions [215] and others of broader scope [210]. These statistics include but are not limited to: redaction category [510], redaction reason [505], document [225], type, document [225], content type, language, actors [520] or custodians related to the redacted document [225], redacted content type (i.e. image vs. text. vs. sound) and topics [720] present in the redacted documents [225].

Other Administrative Tools

In one embodiment, the administrator may specify that certain items are never to be redacted under any circumstances—or at least not without administrator approval. This is a very useful tool in "faux friend" situations, in which two actually distinct names or things may appear to be quite similar to one another, but in which one should be redacted, but the other should not (or must not) be. Things the administrator may choose to preclude redactions [305] on include, but are not limited to: specific text spans, specific images, specific document [225], instances, specific document [225] content types (for example, certain types of recognizable reports), specific categories of document [225], (however identified), or documents [225], that relate to certain actors [520] or custodians.

Figure 41:
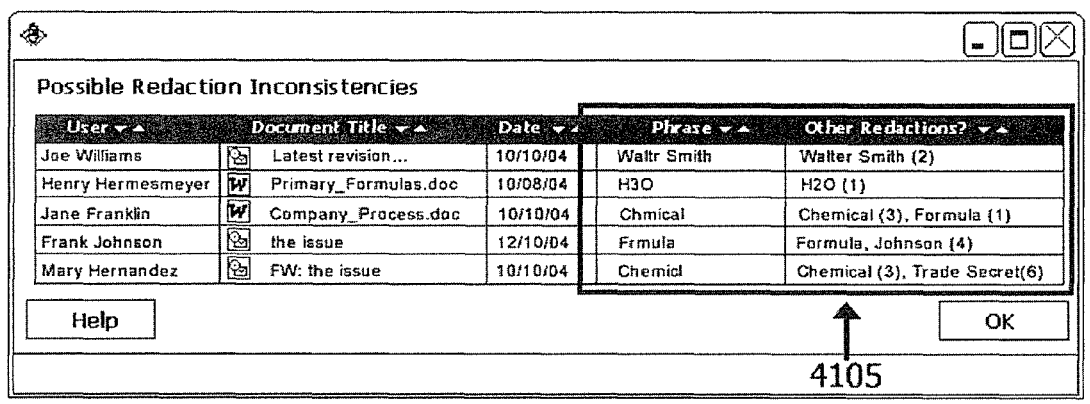
FIG. 41 is a screen shot of one embodiment of a report on possible redaction inconsistencies.

In scenarios in which at least some individual or manual redactions [305] are being performed, in one embodiment the administrator may request a report on items which have already been reviewed by a user who had the opportunity to redact them and did not but which have contents which are very similar to documents which have been redacted as shown in FIG. 41, [4105]. The administrator can specify both the measure of "similar" and whether there is some threshold number of times that a user must have manually redacted the item in question in order for it to appear on the report. Measures of "similar" include, but are not limited to: conformance to the same regular expression, match via any kind of fuzzy matching mechanism (often used to correct OCR errors) and match of a proper noun that appears in the same list or ontology as other proper nouns which have been redacted.

In order to better monitor the accuracy and consistency of the redactions [305] performed by users, the administrator can request reports from the system which list the number of redactions [305] of different scopes [210] by each user, as well as what percentage of all items that they reviewed they redacted, as well as any potential consistency issues as described above. These reports may also include information about any redaction [305] requests by this user that were overturned subsequently by another user or which were disallowed by the administrator.

Other available reports are more redaction-instance-centric in nature, and provide both overall statistics and detailed information including but not limited to: what percentage of the time specific text spans (or specific images) were redacted, which such items were redacted the most frequently, both manually and automatically via broader redaction scopes [210], which document [225] types, items belonging to which actors [520] or custodians, which document [225] content types (e.g. specific reports) and in which languages.

Production Component

The Effect of Editing Redactions on Production

Disabling a redaction [3615] means that future documents—or copies of already produced documents [225]—that would have been redacted are not redacted [3605]. In one embodiment, the redaction [305] still shows up in the system, though marked as disabled. The system further includes record of any documents [225] that have already been produced at least once with the redaction [305], as well as the accompanying context of the productions. Production context may include, but is not limited to: date, matter produced for, custodian produced for, and document author. In one embodiment, any documents already produced with the redaction [3610] may be automatically re-produced without it. In one embodiment, if possible the system will execute a transaction with a shared data repository to replace a document [225] with modified redaction statuses with the original, a sort of automated clawback. This enables someone who had inadvertently produced a completely privileged document or a document that is missing at least one redaction, to ensure that such documents are returned, or replaced with the correct one (in the latter case), by prior agreement. Increasingly, in complex cases all produced documents—regardless of who produced them—are put in a single large repository for purposes of reducing cost. In one embodiment, the system allows redactions [305] to be added to a document [225] that has already been produced. In one embodiment, a redaction [305] may be disabled in the context of one matter [3620], but left in effect for other matters [3620].

Production of Documents "To-Bitmap"

Text [420] and mixed documents [410] have the option of being produced as a bitmap image file. In one embodiment, the bitmap is a TIFF (Tagged Image File Format) file. Alternate file formats may be used. Redacted text spans viewed in this version of produced document will have rendered black pixel regions similar to those found in the produced redactions on image documents [425]. The method performed to achieve this task is a several step process, one embodiment of which is described below.

Figure 43:
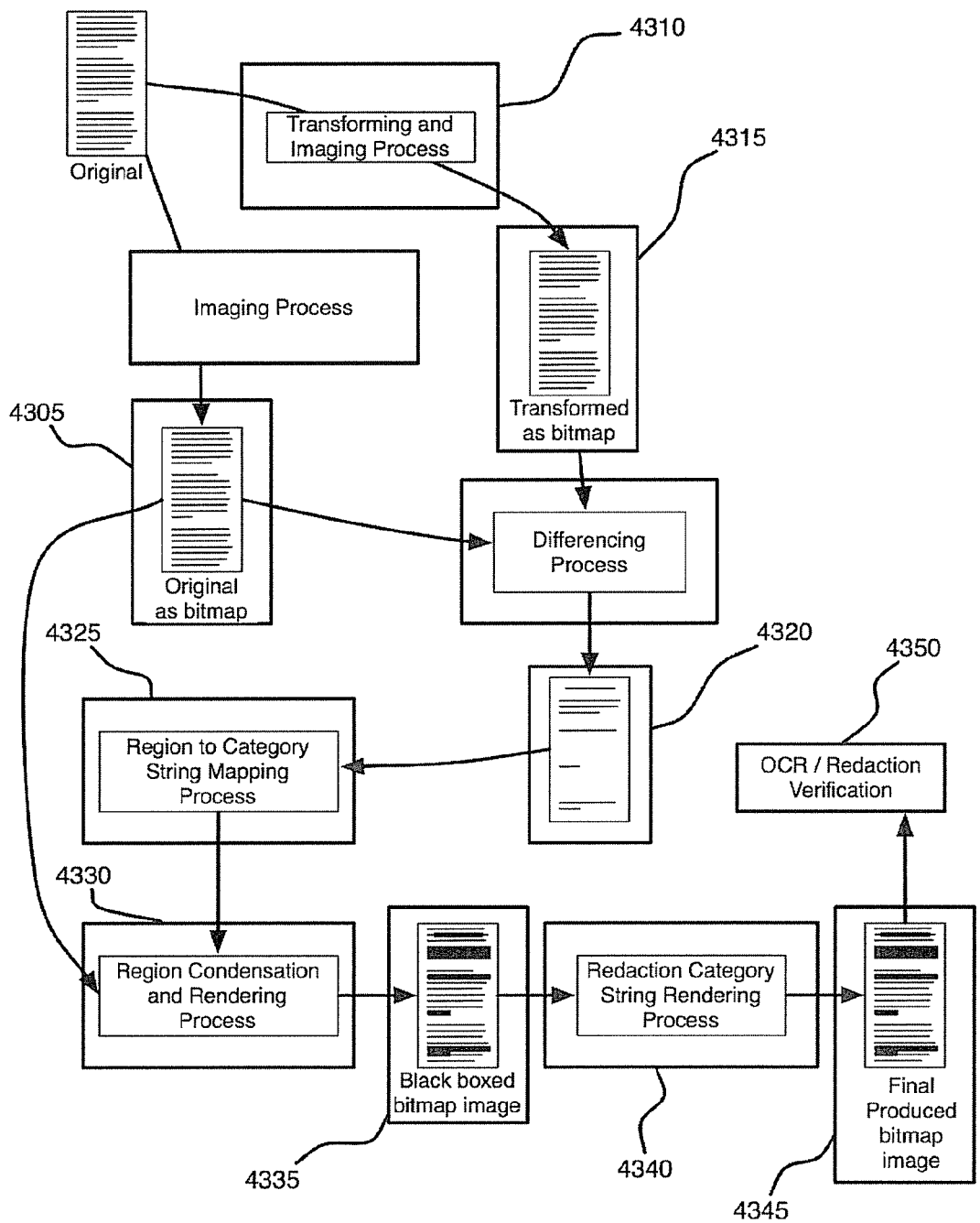
FIG. 43 is a flowchart of one embodiment of the Production to Bitmap process utilizing token boundary region detection.

In one embodiment, the process of producing the final redacted bitmap image file utilizes a custom font library; a diagram of this process can be seen in FIG. 43.

Figure 42:
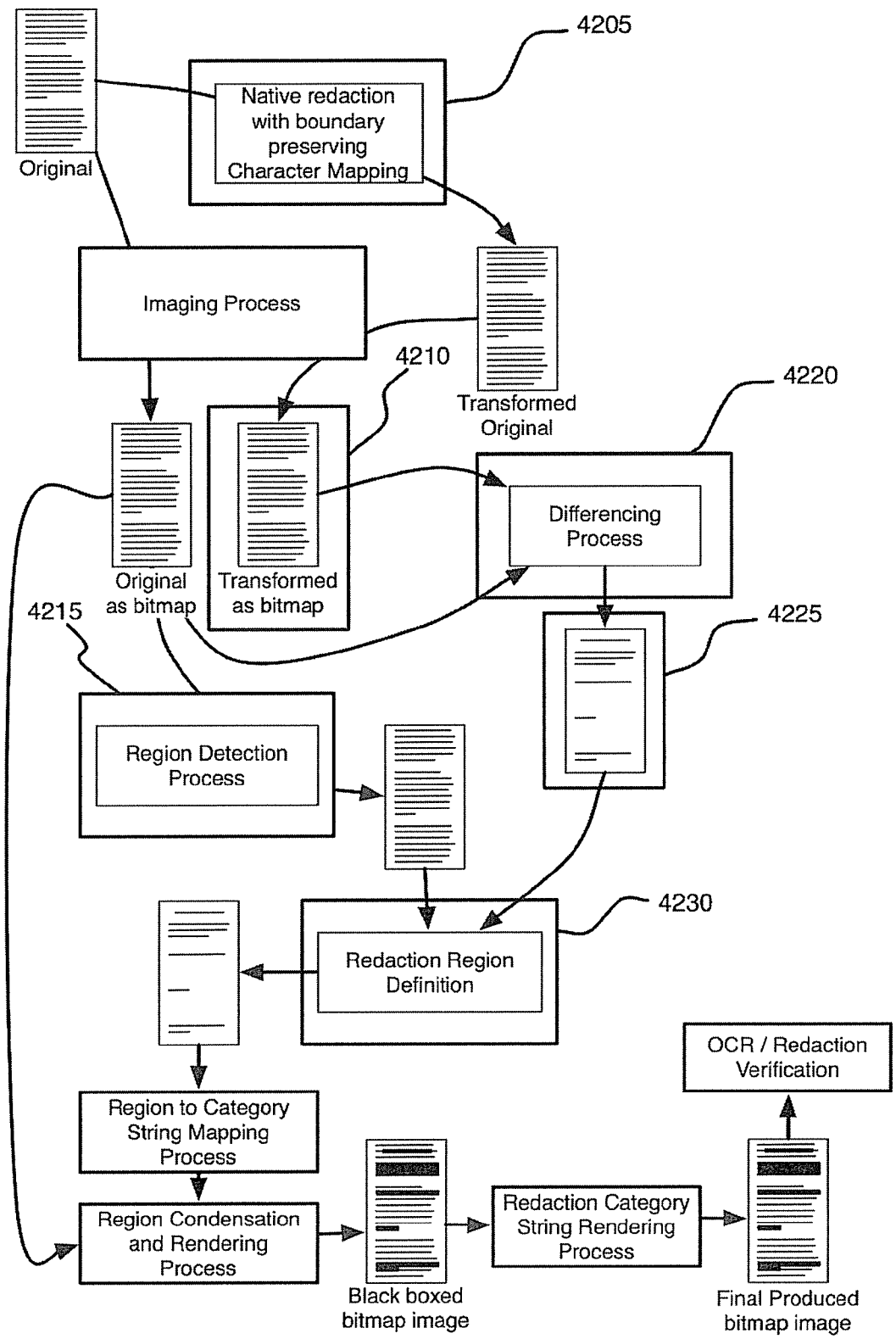
FIG. 42 is a flowchart of one embodiment of the Production to Bitmap process utilizing font library substitutions.

In one embodiment, the process of producing the final redacted bitmap image file utilizes word token region detection; a diagram of this process can be seen in FIG. 42.

A temporary image file representing the original document without redactions is created [4305]; we will refer to this as image document $I_1$, which will contain 1-P pages of images.

In one embodiment, a map is created between relative token number and redaction category; the semantic meaning of this map is to be able to say "the first three tokens encountered which have been redacted are of redaction category X; the next five are of category Y; . . . ". We will refer to this map as $M_{TRC}$ and discuss its usage in the "Region Condensation and Category String Rendering" section below.

Production Utilizing Custom Font Libraries

The system creates and maintains a library of common font families which are identical to the public standard of the font families with the one difference that the custom font switches the foreground and background colors.

In one embodiment, in the process of creating an image of the redacted form of the document [225], a transforming and imaging process [4310] is performed on a temporary copy of the original document [225]. In this process, for each token in a redacted range, the custom font associated to the document-specified font for the text in the token is used to render the characters of the token; the custom font is not used to render white space between tokens of a continuous redaction range so as to preserve token boundaries.

A temporary image document [4315] is produced using this method which we will refer to as $I_2$.

Figure 44:
FIG. 44 is an image of one embodiment of an example of a bitmap XOR operation on an example redaction using font library substitution.

For each of the P pages in the image documents [425], an image XOR operation is performed between each page of $I_1$ and the corresponding page of $I_2$, producing $I_x$ [4320]. This operation produces black pixel rectangular regions, $(\delta_1, \ldots, \delta_m)$, and is demonstrated in FIG. 44.

From $I_x$, a map is created of a one-to-one relationship between redacted token and pixel space bounds [4325]; we call this map $M_{TPS}$ and discuss its usage in the "Region Condensation and Category String Rendering" section below.

Production Utilizing Word Token Region Detection

Redaction Via Pixel Space Boundary Preserving Character Mapping

A native redaction [305] is performed on the original document [225] for all of its redacted text spans [4205]. In this native redaction, each redacted character is replaced based on a mapping function. An example of this mapping can be seen in FIG. 42.

This mapping function takes four arguments and can be written as:

$$\vartheta(c, c_b, c_a, F) = c'$$

where c is the character to be replaced, $c_b$ is the character immediately preceding c, $c_a$ is the character immediately following c, F is the font used to render that character in the document [225] and c' is the resulting character used to replace c in the redacted document [225].

This function performs, in essence, a minimization function. Let B be a function that produces a two dimensional bounds (width and height) in standard pixel space rendering a character k given font F, and any kerning concerns due to $c_b$ and $c_a$:

$$B(k, c_b, c_a, F) = (w, h), \{w, h \in \Re; w > 0, h > 0\}$$

and let D be a distance metric weighting more heavily on the first element of the pair (w,h):

$$D((w_1, h_1), (w_2, h_2)) = d$$

Lastly, let C be the set of all characters of the character space in which c sits and let C' be that set with the element c removed, and given that:

$$B(c, c_b, c_a, F) = (w_0, h_0)$$

In this case, c', produced by $\vartheta$, can be clarified as:

$$D(B)c', c_b, c_a, F), (w_0, h_0)) = d_{min} | \forall k, k \in C', k \neq c', D(B)k, c_b, c_a, F), (w_0, h_0)) > d_{min}$$

The greater purpose of this function is to ensure that a redacted document [225], contains the same paragraph layout as the original document [225] with respect to the bounding box location of each word in the rendered-to-image version of each document [225]; for example, if the layout for a given document's paragraph includes line justification, and there is not an attempt made to use a function similar in effect to this character mapping function, then it is entirely likely that a redacted word will be longer or shorter than the original to the extent that the justification results in pushing another word to the following line, or pulling a word to the current line from the following line.

Temporary image document [4210] is produced from this native character-mapping-redacted document, and we will refer to the image produced in this step as $I_2$.

Defining the Best Metric for Distance Between Points

First, let us consider the space generated by B. This is the positive valued space of $\Re^2$, specifically:

$$\forall b \in B, b = (w, h) | w \in \Re, w > 0, h \in \Re, h > 0$$

If we consider the metricized version of this space in which the metric is the common Euclidean metric, then for the rest of this section, when we speak of "Euclidean distances", we refer to the idea in which the distance between two points is the distance of those points in this specific metric space; for simplicity, we will write this metric as $D_E$.

In consideration of determining the exact class of metrics employed by $\vartheta$, we are concerned in developing metrics on the space generated by B such that the metric allows us an increasingly more precise examination of the space between two points $A_0$ and $A_1$ as the "Euclidean distance" between $A_0$ and $A_1$ approaches 0, and we are equally interested in the metric producing little difference in the space as the "Euclidean distance" between $A_0$ and $A_1$ goes to infinity. A less mathematical phrasing of this would be that given two points produced by B, if they are sufficiently different, we don't care about them and can be considered to be generally ignorable, while if they are sufficiently similar, we are highly interested in knowing very precisely how similar, and more importantly, being able to obviously order other similar points in relation.

Labeling any metric which belongs to the desired family of metrics as $D_D$, we can write this preceding statement in a more mathematically revealing fashion. Given points $A_0$ and $A_1$ in the space generated by B, we desire that $$D_D(A_0, A_1) \to \infty \text{ when } D_E(A_0, A_1) << 1$$

and that $$D_D(A_0, A_1) \to 0 \text{ when } D_E(A_0, A_1) \to \infty$$

While this gives a some what contrary depiction to a traditional metric space (in some sense: it is the inverse of a traditional metric space), it is otherwise clear that we are describing logarithmic behavior, and thusly that the class of metrics in which we are interested can be chiefly characterized as logarithmic metrics.

Text Reading Direction and Region Detection

For each of the P pages in the image document $I_1$, a region detection process [4215] is performed to detect the boundaries of words. This process relies on the reading direction information derived during the page rotation detection phase, and font information, if any exists, from the original document [225]; using this information as hints, the region detection process replicates in the rendered pixel space, the action of the corpus-wide text tokenizer in the character space.

Region detection acts by employing a character recognition process as is commonly understood in the field of Optical Character Recognition. The error rate, albeit low, is presented by this process in the form of misidentified characters and is therefore negligible in our usage; the reason for this is that we are not using the process to perfectly identify the characters in the text, for we already possess the original text, but rather to get accurate pixel space locations of token boundaries.

Given the known token content and token progression through the document [225], we are able to take the pixel-space-to-character relation produced by the region detection to create a pixel space map of each bounding box for all rendered tokens on a given page.

In the exception case in which region detection is unable to detect the runs of text contained in a given image page, the document [225] being produced is flagged for further human quality control and the production to bitmap process is halted for the document [225].

Calculating and Rendering Redacted Areas

For each of the P pages in the image documents [425], an image XOR operation [4220] is performed between each page of $I_1$ and the corresponding page of $I_2$ [4225].

Grouping the pixels produced in the XOR operation by the regions defined during the region detection phase, a set of redaction regions, $(\delta_1, \ldots, \delta_m)$, in pixel space are defined [4230], where m equals the number of tokens redacted on the current page of the document being processed. The pixels in all of the redaction regions, $(\delta_1, \ldots, \delta_m)$, are converted to black pixel data. We will refer to the image generated by this process as $I_x$ [4320].

A map is created of a one-to-one relationship between redacted region and pixel space bounds [4325]; we call this map $M_{TPS}$ and discuss its usage in the "Region Condensation and Category String Rendering" section below.

Region Condensation and Category String Rendering

Regardless of which embodiment has been utilized to reach this step, this process [4330] has at its disposal $I_1$, an image version of the original document [225] $I_x$, an image having the same page count as $I_1$ but containing only black pixel data in the exact redacted region rectangular bounds, and maps $M_{TRC}$ and $M_{TPS}$.

Using $M_{TRC}$ and $M_{TPS}$, we calculate a new map, which transforms between pixel space and redaction category [510] string; we refer to this map as $M_{PSRC}$.

For each of the P pages in the image document $I_x$, the contained redaction regions, $(\delta_1, \ldots, \delta_m)$, are examined.

Spatially neighboring elements of $(\delta_1, \ldots, \delta_m)$ with the same redaction category are condensed into regions, $(\delta'_1, \ldots, \delta'_p)$, with $M_{PSRC}$ being transformed to $M'_{PSRC}$ in order to maintain the correct mapping, and where $p \leq m$. Two regions, A and B, are considered to be 'spatially neighboring' if there is only white pixel data contained in the pixel space between them.

Altering the same page in the $I_1$ image document [425], all detected regions $(\delta'_1, \ldots, \delta'_p)$ are converted to black pixel data, to produce an image document $I_F$ [4335].

Rendering of Redaction Category String

Using $M'_{PSRC}$, each instance of a redaction category [510] string in the map is rendered [4340] to its associated pixel space location in the image document $I_F$.

The default font for the string is a sans serif font, sized at 14 point; a sans serif font is chosen because the less decorative nature (as compared to a serif font) of the font makes it more easily read in its scaled versions.

In one embodiment, if the bounds of the redaction category [510] string rendered in the default font will not fit within the bounds of its associated redacted region, a proportion maintaining scaling transform will be performed on the string rendering such that the rendering fits entirely within the associated redacted region.

In another embodiment, if the scaling is such that the resulting font size is less than 6 point, the redaction category string will be modified to feature a trailing ellipsis, truncating the string as necessary so that it is able to be rendered within the redacted region while not having its font size become less than 6 point.

At the completion of the rendering of every instance contained in $M'_{PSRC}$, the image document, $I_F$ [4345], is considered to be completely produced and ready for verification [4350].

Verification of Non-To-Bitmap Produced Documents

For text documents [420], or mixed type documents [410], in which all instances of a given text span (and variations, depending on the redaction [305] definition) were scheduled to be redacted, most embodiments will perform a verification involving OCR.

In such embodiments, the produced document [225] is imaged by standard means. The image document [425] created is then subjected to standard methods of optical character recognition to produce a text representation of the document [225]; the resulting text representation is then indexed.

A search for the text span which was to have been redacted is then performed against the resultant index to assure that it does not exist—or at least does not exist within any scope [210] where it no longer should. In addition to the case of catching any erred redaction of spans of text within the original document [225], this also will catch cases in which a user manually missed a redaction [305], for example, an embedded image object or subdocument [430] contains the text span but was not noticed by the user during their review of the document [225]. Some embodiments may also look for partial matches or redacted text, in order to try to trap any cases in which a redaction [305] was somehow displaced, and hence part of the text that should have been redacted was not.

Verification of To-Bitmap Documents

Text detection is performed using standard methods of optical character recognition on the image, $I_F$; the derived text is cleansed of all paragraph breaks and tab formatting resulting in one continuous text run.

The original document [225] text is then redacted in a text only realm; the redacted text spans are simply deleted, as opposed to being transformed into masking characters. This redacted text document [420] is then also cleansed of all paragraph breaks and tab formatting resulting in one continuous text run.

The validity of the To-Bitmap produced document [225] is then verified by comparing the two continuous text runs to assure that there is no text in the produced image that does not also occur in the text-only-realm redacted document [225].

Watermarking Produced Images

Produced images, whether images because that was their format on intake, or because the production component was specified to run 'To-Bitmap', have the option of being watermarked prior to the completion of the production process. Common watermarking text includes but is not limited to Bates numbering, as well as descriptions of privilege.

CONCLUSION

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
   enabling a user to define a redaction of a part of a document in a corpus of documents, the redaction definition including a scope defining a range of documents in the corpus to which the redaction applies, wherein the document is produced as a bitmap image file in which a redacted region appears as a region of black pixel data;
   creating a temporary image file representing an unredacted version of the document;
   creating a temporary image file representing a redacted version of the document utilizing custom fonts in rendering which result in foreground and background colors of redaction regions being an inverse of the foreground and the background colors of fonts used for non-redaction regions;
   performing XOR operations between corresponding sections in the temporary image files of the unredacted and the redacted documents; and
   creating a mapping between a redacted token and pixel space bounds of the redacted token, thereby creating the region of black pixel data.

2. The method of claim 1, wherein a document is any type of information that has been committed to a permanent electronic medium.

3. The method of claim 2, wherein each document has a document type, and document types include one or more of the following: text documents, image documents, motion documents, and mixed type documents.

4. The method of claim 3, wherein a document may include metadata, and the metadata is available for redaction.

5. The method of claim 2, wherein a document is data extracted from a database, the method further comprising: defining boundaries of one or more documents from the data extracted from the database; and defining-any potential subsections of the one or more documents.

6. The method of claim 1, wherein the redaction scope is a defined subset of the corpus.

7. The method of claim 1, wherein the redaction has a category associated with it, the category defining a reason for the redaction.

8. The method of claim 7, further comprising: automatically assigning a reason to a redaction based on a set of rules.

9. The method of claim 1, wherein the redaction has a content associated with it, the content specifying what was redacted.

10. The method of claim 9, further comprising: automatically generating a redaction description.

11. The method of claim 9, wherein the content comprises, for a supra-document image specification a hash value to represent an image or image portion redacted.

12. The method of claim 9, wherein the content comprises, for an image document, a page number, a layer number, and a closed path defining a polygonal region.

13. The method of claim 9, wherein the content comprises, for a motion document, a starting and ending time stamp of an interval to be redacted.

14. The method of claim 1, further comprising: adding each non-ephemeral interaction with the redaction to an audit trail.

15. The method of claim 1, further comprising: performing de-duplication on the corpus of documents, prior to applying the redactions.

16. The method of claim 15, further comprising: de-duplicating content on a text block by text block basis for no-boundary documents.

17. The method of claim 15, further comprising: propagating the redaction to copies of a redacted document.

18. The method of claim 1, further comprising: identifying items having linked documents; and attempting to acquire and cache copies of embedded documents, to ensure that any referenced embedded documents can also be produced and redacted.

19. The method of claim 18, further comprising: enabling a user to freeze the document, so that during production the cached copy of the embedded documents are produced by preference.

20. The method of claim 1, further comprising: identifying a document including variable data; and classifying the document as having variable data.

21. The method of claim 20, further comprising: enabling the user to freeze the variable data at intake, so that during production, values of the variable data will be made static at the moment of intake.

22. The method of claim 1, further comprising: providing a single user interface for redaction, the single user interface capable of handling documents of two or more of the following types: text documents, image documents, motion documents, and mixed-type documents.

23. The method of claim 1, further comprising: for a spreadsheet document, enabling redaction of part of a cell.

24. The method of claim 23, further comprising: enabling the user to select a plurality of cells for redaction.

25. The method of claim 24, wherein the selection is based on one or more of the following: manual selection of cells, cell attributes.

26. The method of claim 1, wherein redaction comprises one or more of the following: removal of data, removal of data and insertion of segment of alternative data of a same length, and removal of data and insertion of empty data of the same length.

27. The method of claim 1, further comprising: upon receiving a redaction edit, determining whether the document being redacted has been produced; and alerting a user that the document has been previously produced.

28. The method of claim 27, further comprising: when an agreement regarding clawback exists, replacing the previously produced document with an incorrect redaction with a newly, correctly redacted document.

29. The method of claim 1, further comprising: enabling a migration of redactions from an originally redacted corpus to a destination corpus.

30. The method of claim 29, further comprising: flagging any redactions that were selected for migration and which cannot be migrated, based on a set of rules.

31. The method of claim 1, further comprising: presenting a user interface to enable what-if modeling of redactions, to indicate without actually saving the redactions.

32. The method of claim 31, further comprising: identifying groups of documents within a particular set that are indicated as affected by the what-if modeling.

33. The method of claim 1, further comprising: maintaining a redaction log, the redaction log configurable to enable a user to view redaction history in various ways.

34. The method of claim 33, wherein the redaction log enables a user to correct mistakes, alter redactions, and track reviewer performance.

35. The method of claim 1, further comprising: watermarking image documents after redaction.

36. The method of claim 1, further comprising: providing an option to disable a redaction, after the redaction has been made, with respect to one or more matters.

37. The method of claim 1, further comprising: utilizing redundant verification to verifying that text content was successfully redacted.

38. The method of claim 37, wherein the redundant verification comprises performing optical character recognition (OCR) on the redacted text content; and verifying that none of the redacted text is present.

39. The method of claim 1, further comprising: permitting a user-configurable display of redactions to indicate different attributes of the redaction.

40. The method of claim 39, further comprising: displaying redacted data with a transparency setting, wherein the transparency setting is completely opaque for certain redactions.

41. The method of claim 1, further comprising: performing analysis on items being displayed to determine content that should likely be redacted, whether or not a user has redacted it.

42. The method of claim 41, further comprising: providing a redaction hint when the analysis indicates that content on the items should be redacted.

43. The method of claim 41, further comprising: comparing the analysis to actual reduction decisions by a reviewer, to check for reviewer consistency.

44. The method of claim 1, further comprising: providing controls to redact an entire document section when the document section contains any redactions, with a single selection.

45. The method of claim 44, wherein a document section comprises one of the following: phrase, sentence, paragraph, document section, entire document.

46. The method of claim 1, further comprising: dividing no-boundary content, including instant message transcripts, into sessions to enable redaction.

47. The method of claim 1, further comprising: providing a first view and a timeline view to display a motion document, to enable tracking along a timeline; and providing a model-view-controller so when a user navigates to a particular point in time in one of the views, all of the other views reset to the particular point.

48. The method of claim 47, further comprising: providing an audio-to-text transcript view, when audio data is part of the motion document.

49. The method of claim 1, further comprising: for mixed type documents, displaying a root document, and custom UI widgets to represent a sub-document.

50. The method of claim 49, wherein the custom UI widget to represent a sub-document comprises a button which contains a thumbnail image associated with the sub-document.

51. The method of claim 49, further comprising: providing a tiling option, which displays the root document and at least one sub-document simultaneously.

52. The method of claim 1, further comprising: providing a tool enabling an administrator to specify that certain items cannot be redacted without approval from the administrator.

53. The method of claim 1, further comprising: requesting a jurisdiction identification for a newly created matter including one or more documents; and automatically applying a rule set associated with the jurisdiction for the analysis.

54. The method of claim 1, further comprising:
creating a mapping between the redacted token and a redaction category;
using the created mapping to render a name of the redaction category on the black pixel data region representing the associated redacted token.

55. The method of claim 1, further comprising: condensing neighboring regions of black pixel data to create larger contiguous regions of black pixel data.

56. A method comprising:
enabling a user to define a redaction of a part of a document in a corpus of documents, the redaction definition including a scope defining a range of documents in the corpus to which the redaction applies, wherein the document is produced as a bitmap image file in which a redacted text appears as a region of black pixel data;
creating a temporary image file representing an unredacted version of the document;
creating a temporary image file representing a redacted version of the document utilizing a character transposition on the redacted text that is calculated to match rendered bounds of the unredacted version of the text;
using a region detection process which accounts for page orientation and text reading direction to produce a pixel space representation of relevant text tokens on any given page of the document;
performing XOR operations between each corresponding section in the image files of the unredacted and redacted versions of the document;
grouping differences produced by the XOR operations into the detected token regions;
filling the affected token regions with black pixel data; and
creating a mapping between a redacted token and pixel space bounds of the redacted token.

57. The method of claim 56, further comprising: condensing neighboring regions of black pixel data to create larger contiguous regions of black pixel data.

58. The method of claim 56, further comprising:
creating a mapping between redacted token and a redaction category;
using the created mappings to render a name of the redaction category on the black pixel data region representing the associated redacted token.

* * * * *